United States Patent [19]

Tsushima et al.

[11] Patent Number: 5,500,756
[45] Date of Patent: Mar. 19, 1996

[54] OPTICAL FIBER TRANSMISSION SYSTEM AND SUPERVISION METHOD OF THE SAME

[75] Inventors: Hideaki Tsushima, Wakou; Shinya Sasaki, Kodaira; Yukio Nakano, Zama; Hiroyuki Nakano, Asaka; Ryoji Tateyari, Koganei; Hironari Matsuda; Kenji Tomooka, both of Yokohama; Naohiro Sakakida, Kawasaki; Shin Nishimura; Yoshihiro Yano, both of Yokohama; Youichi Igarashi, Yokosuka; Satoshi Aoki, Chigasaki; Masahiro Takatori, Hachiouji; Tohru Kazawa, Kokubunji; Yoshihiro Ashi, Yokohama, all of Japan

[73] Assignee: Hitachi, Ltd., Tokyo, Japan

[21] Appl. No.: 23,546

[22] Filed: Feb. 26, 1993

[30] Foreign Application Priority Data

Feb. 28, 1992 [JP] Japan .................................... 4-042835
Apr. 7, 1992 [JP] Japan .................................... 4-085314
Apr. 8, 1992 [JP] Japan .................................... 4-087247
Apr. 8, 1992 [JP] Japan .................................... 4-087361

[51] Int. Cl.[6] ............................................. H04B 10/02
[52] U.S. Cl. .......................... 359/174; 359/177; 359/160; 359/110
[58] Field of Search ....................... 359/174, 175, 359/176, 177, 179, 160, 333, 341, 345, 348

[56] References Cited

U.S. PATENT DOCUMENTS 5,115,338  5/1992  Digiovanni .......................... 359/337
5,229,876  7/1993  Fatehi et al. ........................ 359/160
5,274,496  12/1993  Fujiwara et al. ................... 359/177
5,299,048  3/1994  Suyama ............................... 359/174

FOREIGN PATENT DOCUMENTS 3214936A  9/1991  Japan .......................... H04B 10/16

OTHER PUBLICATIONS

Shinji Matsuoka, et al., "Supervisory Signal Transmission Method for Optical Amplifier Repeater System", IEEE, 1990, pp. 1846–1850.

*Primary Examiner*—Jose L. Couso
*Assistant Examiner*—Rafael Bacares
*Attorney, Agent, or Firm*—Kenyon & Kenyon

[57] ABSTRACT

An optical repeater for realizing transmission of supervisory information of an optical fiber transmission system without the output power of an optical fiber amplifier being reduced, wherein a supervisory optical transmitter and optical receiver with a wavelength which is similar to the wavelength of the pumping light source of the optical fiber amplifier are mounted, and on the input side of the optical repeater, pumping light is multiplexed in the forward direction and a supervisory optical signal, which is multiplexed in wavelength and transmitted, is demultiplexed simultaneously by the first wavelength multi- and demultiplexer and they are received by the supervisory optical receiver, and on the output side of the optical repeater, pumping light is muitiplexed in the reverse direction and a supervisory optical signal outputted from the supervisory optical transmitter is multiplexed by the second wavelength multi- and demultiplexer.

13 Claims, 43 Drawing Sheets

FIG. 43

| | INFORMATION FIELD | | | | | | | |
|---|---|---|---|---|---|---|---|---|
| | BIT 1 | BIT 2 | BIT 3 | BIT 4 | BIT 5 | BIT 6 | BIT 7 | BIT 8 |
| FIRST BYTE | FIBER CUT | SUPERVISORY AND CONTROL SIGNAL LOF | SUPERVISORY AND CONTROL SIGNAL FCS ERROR DETECTION | LOSS OF SIGNAL | LOSS OF SUPERVISORY AND CONTROL SIGNAL | — | — | — |
| SECOND BYTE | OUTPUT CONNECTION OPEN | SIGNAL OUTPUT SHUTDOWN | SUPERVISORY AND CONTROL SIGNAL OUTPUT SHUTDOWN | POWERFAILURE | — | — | — | — |
| THIRD BYTE | EQUIPMENT FAILURE OF OPTICAL AMPLIFIER UNIT | FAILED POINT | | | | | | |
| FOURTH BYTE | — | — | — | — | — | — | — | — |
| FIFTH BYTE | LOOP BACK-ON INDICATION | LOOP BACK-OFF INDICATION | — | — | — | — | — | — |
| SIXTH BYTE | OUTPUT POWER LEVEL INDICATION FOR STM-1 | OUTPUT POWER LEVEL INDICATION FOR STM-4 | OUTPUT POWER LEVEL INDICATION FOR STM-16 | OUTPUT POWER LEVEL INDICATION FOR STM-64 | — | — | — | — |
| SEVENTH BYTE | SWITCH INDICATION | SWITCH BACK INDICATION | — | — | — | — | — | — |
| EIGHTH BYTE | OUTPUT-OFF INDICATION | OUTPUT-ON INDICATION | — | — | — | — | — | — |

1: ALARMED OR INDICATED
0: UNALARMED OR UNINDICATED
LOF: LOSS OF FRAME
FCS: FRAME CHECK SEQUENCE

 UNDEFINED

OPTICAL FIBER TRANSMISSION SYSTEM AND SUPERVISION METHOD OF THE SAME

BACKGROUND OF THE INVENTION

The present invention relates to optical transmitting equipment, an optical repeater, optical receiving equipment, and an optical fiber transmission system using an optical fiber amplifier and more particularly to supervision and a supervisory information transmission method for them.

The optical fiber amplifier has possibility of use in a future optical fiber transmission system. This system requires a means for supervising optical transmitting equipment (a data optical transmitter for converting data to data optical signals and an optical fiber amplifier are included), an optical repeater (an optical fiber amplifier is included), optical receiving equipment (an optical fiber amplifier and a data optical receiver for regenerating data from data optical signals are included), and an optical transmission line for connecting the above units and for transmitting the obtained supervisory information to the optical line terminal. The conventional supervisory information transmission art is indicated, for example, in Japanese Patent Application Laid-Open No. 3-214936. The above conventional supervisory information transmission art uses one of the methods that (1) a data optical signal and a supervisory optical signal which is multiplexed with the above data optical signal are amplified simultaneously by an optical fiber amplifier in each optical repeater and (2) a pumping light source is divided into two parts and one of them is used as a supervisory optical signal.

When an optical fiber amplifier having output in the saturated state is assumed, according to the above prior art (1), the supervisory optical signal is also inputted to the optical fiber amplifier simultaneously, so that the gain reduces and the output power of the data optical signal lowers in comparison with the case that only a data optical signal is inputted to the optical fiber amplifier. According to the above prior art (2), since the pumping light is divided for the supervisory optical signal, the pumping light power reduces and the gain also reduces, so that the output power of the optical fiber amplifier also reduces. The built-in optical fiber amplifier of the optical repeater is often used in the output saturated state. This is because it is necessary to increase the output power of the data optical signal as high as possible. However, there is a problem imposed that the use of the above prior art reduces the output power.

SUMMARY OF THE INVENTION

An object of the present invention is to solve the above problem, that is, to realize supervisory information transmission of an optical fiber transmission system using an optical fiber amplifier without the output power of the optical fiber amplifier being reduced and to realize supervision of the above system. The optical fiber amplifier is required to have at least an optical fiber (doped fiber) which is doped with an additive and a pumping light source for outputting light (pumping light) with a wavelength of $\lambda p$ for pumping the above doped fiber.

The above problem can be solved by executing the following items 1 and 2.

1. Supervisory information transmission can be realized by composing optical transmitting equipment, an optical repeater (at least one), and optical receiving equipment constituting the optical fiber transmission system as shown below. (1) Supervisory information transmission from the optical transmitting equipment can be realized by installing a supervisory optical transmitter for converting a supervisory electric signal including supervisory information (hereinafter abbreviated to supervisory electric signal) to an optical signal (with a wavelength of about $\lambda p$, hereinafter abbreviated to output supervisory optical signal) and a wavelength multi- and demultiplexer, which is mounted behind the doped fiber, for multiplexing pumping light in the opposite direction to that of the amplified data optical signal and multiplexing the above output supervisory optical signal in the same direction as that of the above data optical signal simultaneously inside the above optical transmitting equipment. (2) Supervisory information transmission by the optical repeater can be realized by installing a first wavelength multi- and demultiplexer, which is mounted before the doped fiber, for demultiplexing a supervisory optical signal 1 (with a wavelength of about $\lambda p$, hereinafter abbreviated to input supervisory optical signal), which is multiplexed with the data optical signal and transmitted, and multiplexing first pumping light (with a wavelength of $\lambda p$, outputted from the first pumping light source) in the same direction as that of the above data optical signal simultaneously, a supervisory optical receiver for converting the above input supervisory optical signal to an input supervisory electric signal, a controller for outputting an output supervisory optical signal by adding supervisory information on the optical repeater to the above input supervisory electric signal, a supervisory optical transmitter for converting the above output supervisory electric signal to a supervisory optical signal 2 (with a wavelength of about $\lambda p$, hereinafter abbreviated to output supervisory optical signal), and a wavelength multi- and demultiplexer, which is mounted behind the doped fiber, for multiplexing second pumping light (with a wavelength of $\lambda p$, outputted from the second pumping light source) in the opposite direction to that of the above amplified data optical signal and multiplexing the above output supervisory optical signal in the same direction as that of the above data optical signal simultaneously inside the optical repeater. Furthermore, (3) supervisory information receiving by the optical receiving equipment can be realized by installing a wavelength multi- and demultiplexer, which is mounted before the doped fiber, for demultiplexing a supervisory optical signal (with a wavelength of $\lambda p$, hereinafter abbreviated to input supervisory optical signal), which is multiplexed with the data optical signal and transmitted, and multiplexing pumping light in the same direction as that of the above data optical signal simultaneously and a supervisory optical receiver for converting the above input supervisory optical signal to an input supervisory electric signal inside the optical receiving equipment.

2. Supervision of optical transmitting equipment, an optical repeater (at least one), and optical receiving equipment constituting the optical fiber transmission system and a transmission line connecting them can be realized as shown below. (1) Supervision of the optical transmitting equipment can be realized by installing a power splitter for dividing a part of output light of the above equipment, an optical filter for extracting only a data optical signal from one of the two output lights from the above power splitter, and a power monitor for detecting power Pd of the above extracted data optical signal inside the optical transmitting equipment and by allowing the controller to observe the power Pd, to judge that the optical transmitting equipment is failure when the Pd value is different from the normal value, and to output an alarm signal (hereinafter the observed value of Pd and the above alarm signal are called supervisory information of the optical transmitting equipment). (2) Supervision of the transmission line and optical repeater which is connected behind the above transmission line can be realized by detecting power Pw of the demultiplexed input supervisory optical signal by the supervisory optical receiver, by installing a power splitter for dividing a part of output light of the above repeater, an optical filter for extracting only a data optical signal from one of the two output lights from the above power splitter, and a power monitor for detecting power Pd of the above extracted data optical signal inside the optical repeater, and by allowing the controller to observe Pw and Pd, to judge that the optical fiber amplifier of the optical repeater is failure when only the Pd value is different from the normal value, to judge that the supervisory optical receiver or the supervisory optical transmitter (with a wavelength of about $\lambda p$) of the optical repeater located at the upper stream of the transmission line (hereinafter abbreviated to "pre-stage optical repeater") (or optical transmitting equipment) is failure when only the Pw value is different from the normal value, and to judge that the transmission line is failure when both the Pd and Pw values are different from the normal values and to output an alarm signal in each case (hereinafter the observed values of Pd and Pw and the above alarm signal are called supervisory information of the optical repeater). Furthermore, (3) supervision of the transmission line and optical receiving equipment which is connected behind the above transmission line can be realized by detecting power Pw of the input supervisory optical signal which is demultiplexed by the supervisory optical receiver, by detecting power Pd of the received data optical signal by the data optical receiver, and by allowing the controller to observe Pw and Pd, to judge that the optical fiber amplifier of the optical receiving equipment is failure when only the Pd value is different from the normal value, to judge that the supervisory optical receiver or the supervisory optical transmitter (with a wavelength of about $\lambda p$) of the pre-stage optical repeater is failure when only the Pw value is different from the normal value, and to judge that the transmission line is failure when both the Pd and Pw values are different from the normal values and to output an alarm signal in each case (hereinafter the observed values of Pd and Pw and the above alarm signal are called supervisory information of the optical receiving equipment).

According to the above means 1, the supervisory optical signal transmitted from the optical transmitting equipment is received by each optical repeater, transmitted as a supervisory optical signal again after supervisory information is added, reaches the optical receiving equipment finally, and is received by it. Therefore, a supervisory optical signal added with supervisory information on the optical transmitting equipment, optical repeaters, and transmission line can be transmitted to the optical receiving equipment. In this case, each optical fiber amplifier amplifies only a data optical signal, so that an output power reduction which occurs when the prior art is used does not occur. Furthermore, according to the above means 2, (1) since the optical transmitting equipment can detect power Pd of a data signal which is outputted by itself, it can supervise an own error by observing the value, and (2) since the optical repeater can detect power Pd of a data optical signal outputted by itself (passing through the transmission line and optical fiber amplifier of the optical repeater) and also power Pw of a transmitted supervisory optical signal (outputted from the supervisory optical transmitter included in the optical repeater or in the optical transmitting equipment located at the upper stream of the transmission line (hereinafter abbreviated to "pre-stage supervisory optical transmitter), passing through the transmission line, and detected by the supervisory optical receiver), it can supervise errors in the transmission line, optical fiber amplifier, and supervisory optical receiver or pre-stage supervisory optical transmitter by observing those power values, and furthermore, (3) since the optical receiving equipment can detect power Pd of a data optical signal received by itself (passing through the transmission line and optical fiber amplifier of the optical receiving equipment) and also power Pw of a transmitted supervisory optical signal (outputted from the supervisory optical pretransmitter, passing through the transmission line, and detected by the supervisory optical receiver), it can supervise errors in the transmission line, optical fiber amplifier, and supervisory optical receiver or pre-stage supervisory optical transmitter by observing those power values. Therefore, supervision of the optical transmitting equipment, optical repeater, optical receiving equipment, and transmission line can be realized.

The operation of the wavelength multi- and demultiplexer used in the present invention will be explained hereunder. For explanation, a typical structure of a repeater which can be realized by using an optical fiber amplifier is shown in FIG. 2. An input signal into this repeater is a weak data optical signal (with a wavelength of $\lambda d$) and an output signal is an amplified data optical signal. The repeater has optical fibers 1-1 and 1-2 which are doped with erbium (Er) (hereinafter abbreviated to doped fibers), pumping light sources (with a wavelength of $\lambda p$) 2-1 and 2-2 for outputting pumping light for giving gains to the doped fibers, wavelength multiplexers (with three terminals) 3-1 and 3-2 for multiplexing the aforementioned data optical signal and pumping light, and isolators 4-1 to 4-3 for preventing the optical fiber amplifier from oscillation. The above units are connected as shown in FIG. 2. The aforementioned wavelength multiplexers can be realized by using (a) an optical filter having a dielectric multifilm filter, whose reflectivity depends on the wavelength, formed on the surface thereof and (b) a directional coupler using two optical fibers and are put on the market. FIGS. 3A and 3B show structural examples of the wavelength multiplexer 3-1 which is realized by using a dielectric multi-film filter. The above dielectric multi-film filter in the wavelength multiplexer is set so that the reflectivity is almost 0 for light with a wavelength of $\lambda d$ and the reflectivity is almost 100% for light with a wavelength of $\lambda p$. Therefore, when a data optical signal with a wavelength of $\lambda d$ is inputted from the first port, the optical signal passes through the above filter and is outputted to the third port. When pumping light with a wavelength of $\lambda p$ is inputted from the second port, the pumping light is reflected off of the above filter and outputted to the third port. As a result, multiplexed light wherein the optical signals of different wavelengths are multiplexed is obtained from the third port as shown in FIG. 3A. Therefore, by using this wavelength multiplexer, a data optical signal and pumping light can be multiplexed. When multiplexed light including a data optical signal with a wavelength of λd and a supervisory optical signal with a wavelength of λp is inputted to the first port, the data optical signal passes through the above filter and is outputted to the third port and the supervisory optical signal is reflected as shown in FIG. 3B on the same principle. Therefore, multiplexed light can be demultiplexed. When this wavelength multiplexer is newly added with a fourth port so as to form a wavelength multi and demultiplexer with four terminals as shown in FIG. 4A, one wavelength multi- and demultiplexer can demultiplex a supervisory optical signal from input multiplexed light including a data optical signal and the above supervisory optical signal and output it to the fourth port and simultaneously can multiplex a data optical signal and pumping light and output the multiplexed light from the third port. According to the structure shown in FIG. 4A, when pumping light with a wavelength of λp is inputted from the fourth port and a supervisory optical signal with a wavelength of λp is inputted from the second port, the wavelength multi- and demultiplexer can output the pumping light, which is multiplexed in the opposite direction to that of the data optical signal, from the first port and simultaneously can output the data optical signal, which is multiplexed with the supervisory optical signal, from the third port (see FIG. 4B).

Therefore, when the wavelength multiplexer 3-1 shown in FIG. 2 is replaced with a wavelength multi- and demultiplexer (input-side wavelength multi- and demultiplexer) having the structure shown in FIG. 4A and the wavelength multiplexer 32 is replaced with a wavelength multi- and demultiplexer having the structure shown in FIG. 4B, from an optical signal (multiplexed light of a data optical signal and supervisory optical signal) which is inputted to the repeater, the supervisory optical signal can be demultiplexed by the input-side wavelength multi- and demultiplexer and the data optical signal which is multiplexed with the supervisory optical signal can be outputted from the repeater. Therefore, supervisory information, which is transmitted from the pre-stage optical repeater (or optical line terminal) can be transmitted to the next-stage optical repeater (or optical line terminal) using an optical fiber for data optical signal transmission.

As mentioned above, according to the present invention, a supervisory optical signal is multiplexed or demultiplexed by a wavelength multi- and demultiplexer for multiplexing pumping light with a doped fiber, so that supervision and supervisory information transmission of optical transmitting equipment, an optical repeater, optical receiving equipment, and an optical transmission line for connecting them can be realized without reduction of the output power of each optical fiber amplifier.

BRIEF DESCRIPTION OF THE DRAWINGS

FIG. 43 is a drawing showing details of an alarm information field.

DESCRIPTION OF THE PREFERRED EMBODIMENTS

Figure 1:
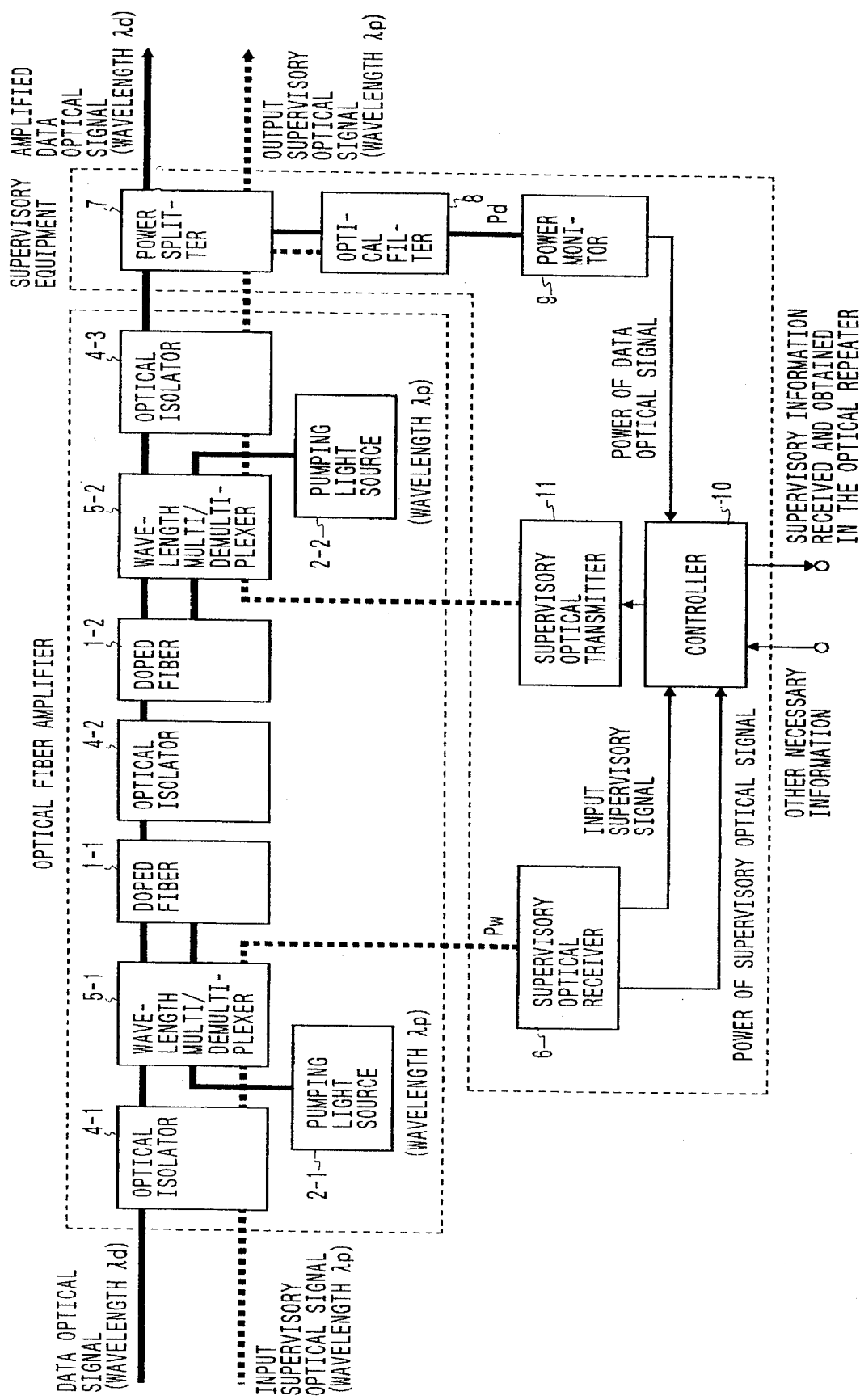
FIG. 1 is a drawing showing the first embodiment of an optical repeater.
Figure 2:
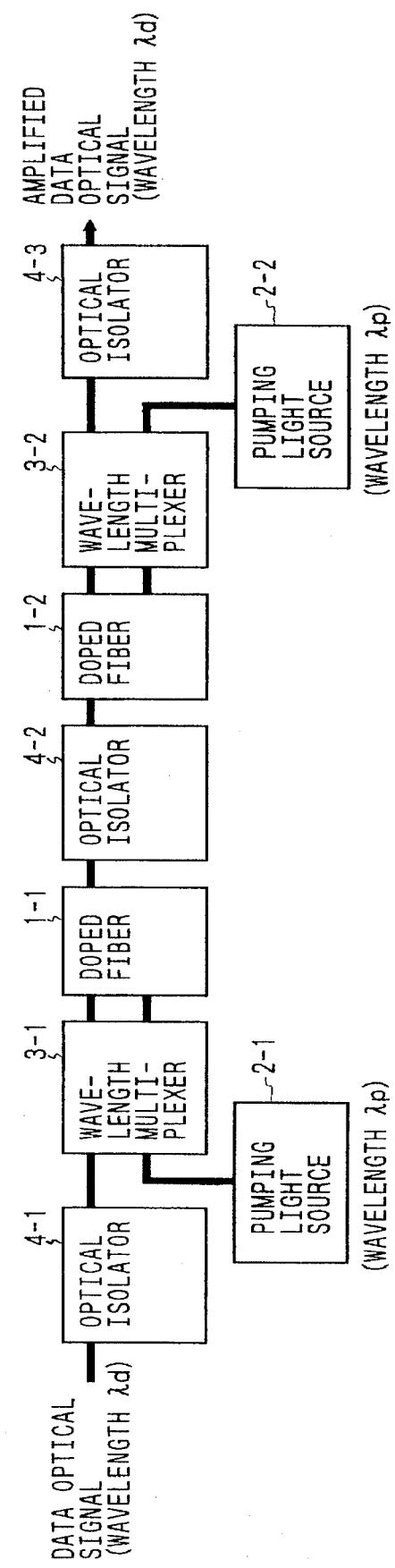
FIG. 2 is a basic block diagram of an optical fiber amplifier repeater using an optical fiber amplifier.
Figure 4A:
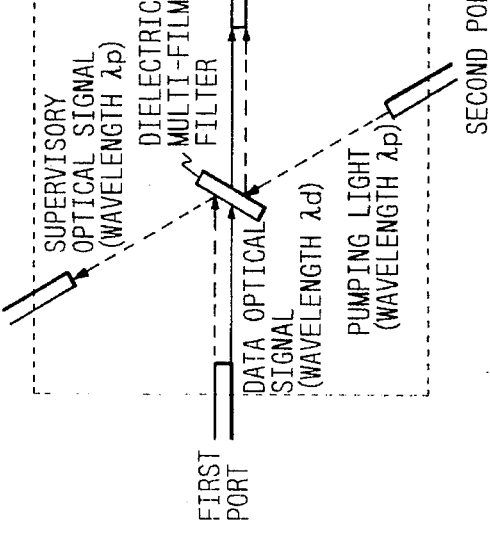
FIG. 4 is a drawing showing the operation of a wavelength multi- and demultiplexer.

FIG. 1 shows the first embodiment of the optical repeater of the present invention. The repeater includes an optical fiber amplifier and supervisory equipment. The optical fiber amplifier has a wavelength multi- and demultiplexer shown in FIG. 4A instead of a wavelength multiplexer 3-1 or 3-2 according to the structure shown in FIG. 2. An inputside wavelength multi- and demultiplexer 5-1 demultiplexes an input supervisory optical signal from an optical signal (including a data optical signal and input supervisory optical signal) which is inputted to the optical repeater and simultaneously multiplexes pumping light. The data optical signal is amplified by the doped fibers and inputted to an output-side wavelength multi- and demultiplexer 5-2 and the input supervisory optical signal is inputted to the supervisory equipment. The output-side wavelength multi- and demultiplexer 5-2 multiplexes an output supervisory optical signal outputted from a supervisory optical transmitter with the amplified data optical signal and outputs it and simultaneously multiplexes pumping light in the opposite direction. The supervisory equipment has a supervisory optical receiver 6 for converting the above demultiplexed input supervisory optical signal to an input supervisory electric signal and simultaneously detecting power Pw of the input supervisory optical signal, a power splitter 7 for dividing a part of output light of the optical repeater, an optical filter 8 for passing only a data optical signal among the above divided light beams, a power monitor 9 for detecting power Pd of the above data optical signal passing through the optical filter (hereinafter abbreviated to data optical signal power), a controller 10 for inputting the above input supervisory electric signal, above input supervisory optical signal power, and above data optical signal power, and a supervisory optical transmitter 11 for converting an output supervisory electric signal outputted from the above controller 10 to the above output supervisory optical signal. The above detection of the power Pw of the input supervisory optical signal by the supervisory optical receiver 6 can be realized, for example, by measuring a direct current flowing through a photodiode (an element for converting an input supervisory optical signal to electricity) which is built in the above supervisory optical receiver.

When light with a band of, for example, 1.55 μm is used as a data optical signal with a wavelength of λd and an optical fiber which is doped with erbium as an additive is used as a doped fiber, the doped fiber can have a gain by using pumping light with a wavelength of about 1.48 μm (=λp). The optical fiber which is used as a transmission line has a transmission loss at a wavelength of about 1.48 μm which is similar to that at a wavelength of 1.55 μm, so that an output supervisory optical signal with a wavelength of about 1.48 μm which is multiplexed with the data optical signal and outputted can reach the next-stage optical repeater (or optical receiving equipment) in the same way as the data optical signal. However, there is no need to restrict the wavelengths λd and λp to the above value.

The controller 10 judges whether the optical transmission line, optical fiber amplifier, and supervisory equipment are normal from the observed values of the input supervisory optical signal power and data optical signal power, adds the judgment result to the input supervisory electric signal, and outputs them as an output supervisory electric signal. Concretely, the controller 10 observes Pw and Pd, judges that the optical fiber amplifier in the optical repeater is failure when only the Pd value is different from the normal value, judges that the supervisory optical receiver or the supervisory optical transmitter (the wavelength is about λp) of the pre-stage optical repeater (or optical transmitting equipment) is failure when only the Pw value is different from the normal value, and judges that the transmission line is failure when both the Pd and Pw values are different from the normal values. This is because although the data optical signal passes through both the transmission line and optical fiber amplifier in the optical repeater, the transmitted input supervisory optical signal passes through only the transmission line, so that the transmission line can be judged to be failure only when the two values are different form the normal values, and when one of them is different from the normal value, the remaining part can be judged to be failure. The controller 10 can properly input necessary information (a signal necessary for supervising the optical repeater, information on another unit in the optical line terminal, a control signal for controlling each post-stage optical repeater, a control signal for controlling the optical receiving equipment, a control signal for controlling each optical repeater or the optical fiber amplifier built in the optical receiving equipment, etc.), adds it to the input supervisory electric signal, and outputs them as an output supervisory electric signal. Furthermore, from the controller 10, the received input supervisory electric signal and supervisory information obtained by this optical repeater can be read. The controller 10 also can control the operations of the optical repeater and built-in optical fiber amplifier according to control information which is added to the received input supervisory electric signal and transmitted. Detection of the input supervisory optical power (or a voltage signal in proportion to this power) by the supervisory optical receiver can be realized, for example, by dividing a part of the received input supervisory electric signal and by measuring the power value or peak value. Also by detecting a direct current (or a voltage in proportion to the direct current) flowing through the photodiode built in the supervisory optical receiver, the input supervisory optical signal power can be detected.

As mentioned above, according to the present invention, the optical transmission line and optical repeater (optical fiber amplifier and supervisory equipment) are supervised by a simple structure, and supervisory information of the optical repeater is added to supervisory information from the pre-stage optical repeater (and optical line terminal), and they can be transmitted to the next-stage optical repeater (and optical line terminal). The operation thereof also can be controlled by the transmitted control information.

The above effects of the present invention are not restricted to the structure of this embodiment. For example, when the wavelength multi- and demultiplexer can multiplex and demultiplex both wavelengths λd and λp, the aforementioned effects can be obtained regardless of the internal actual structure. As to the optical isolators, the aforementioned effects can be obtained regardless of the installation location and the number of isolators to be used and even if no optical isolator is used. The pumping method for the doped fibers may be different from that shown in FIG. 1. Even when the pumping light travels in the traveling direction of the data optical signal, or in the opposite direction, or in both directions, the aforementioned effects can be obtained. Even when the number of pumping light sources is larger than that shown in FIG. 1, the aforementioned effects can be obtained. Even when the number of doped fibers is different from that shown in FIG. 1, the aforementioned effects can be obtained. Even when the above power splitter 7, optical filter 8, and power monitor 9 are not used, supervision of the optical transmission line (or supervisory optical receiver, controller, and supervisory optical transmitter of the optical prerepeater) and supervisory information transmission are possible, and these functions themselves are useful in the optical fiber amplifier transmission system using an optical fiber amplifier. Even when optical parts such as an optical filter are inserted, the aforementioned effects can be obtained. Even when the input supervisory electric signal is used as an output supervisory electric signal as it is, the aforementioned effects can be obtained.

Figure 3A:
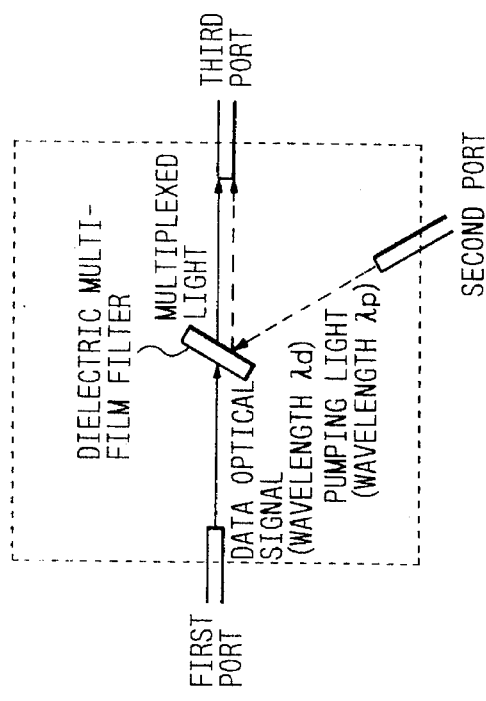
FIG. 3 is a drawing showing the operation of a wavelength multiplexer.
Figure 3B:
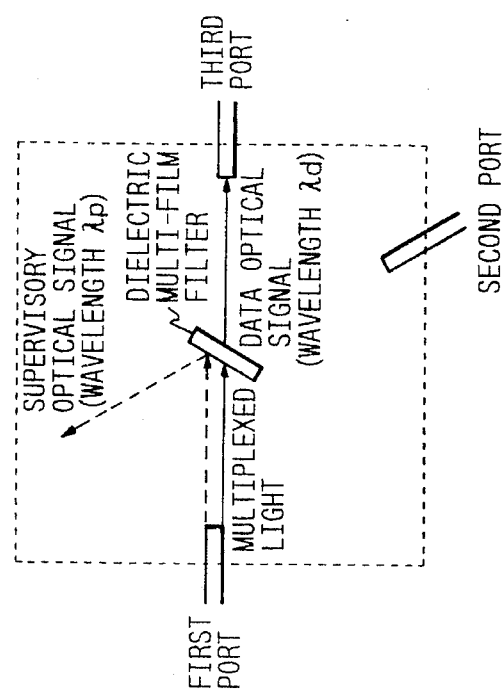
Figure 4B:
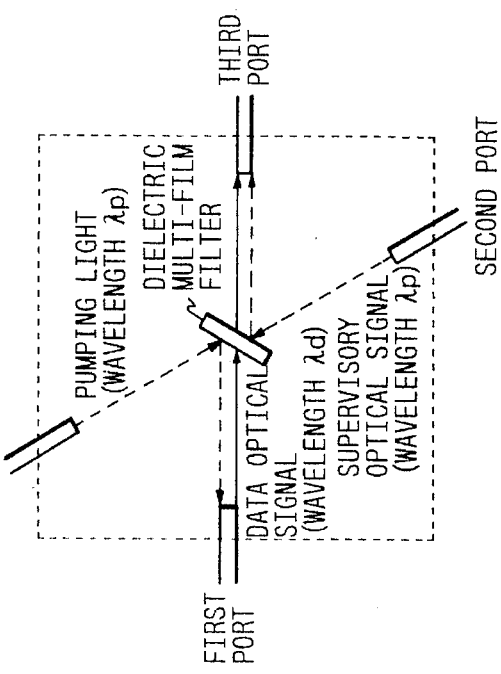
Figure 5:
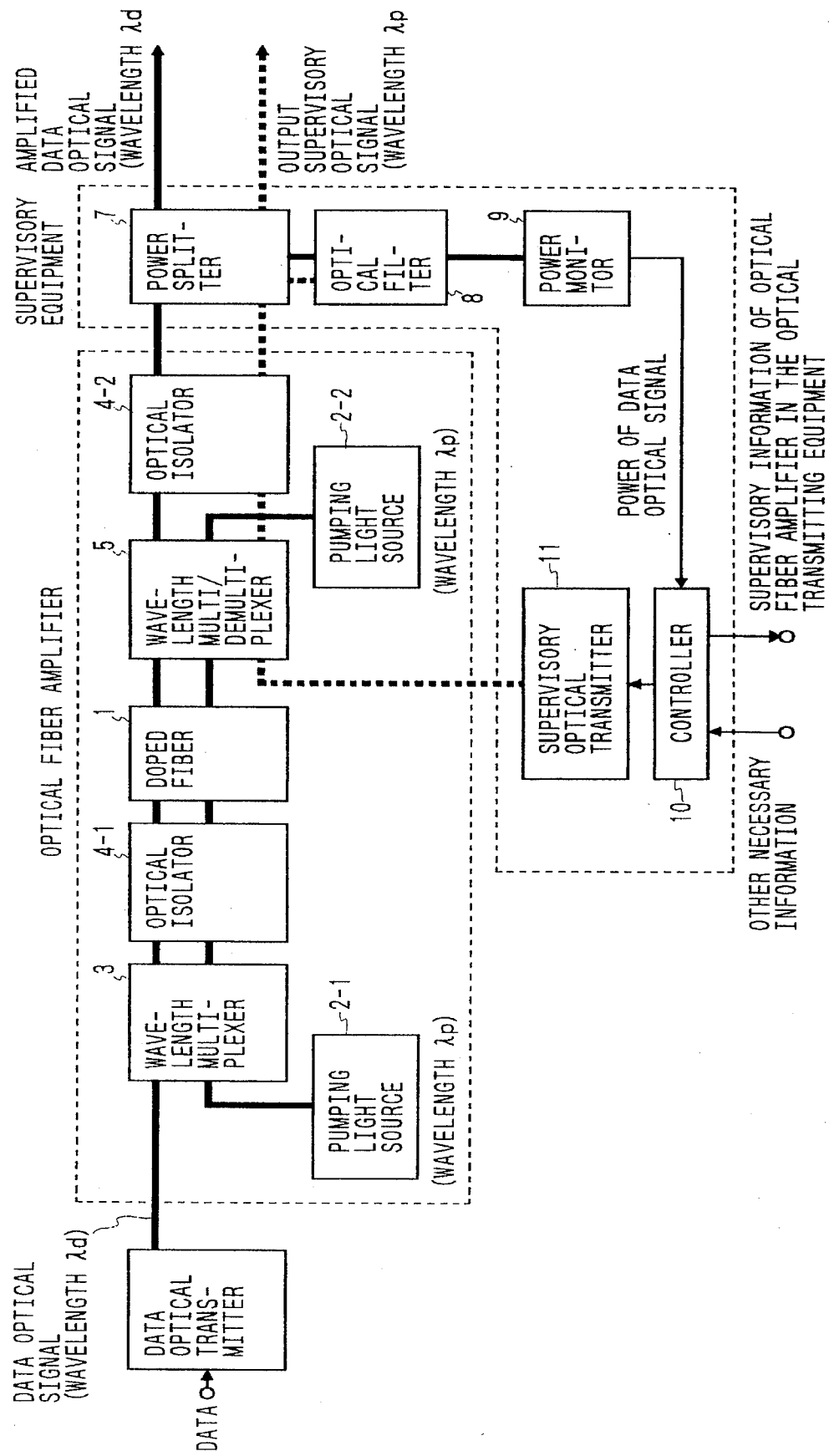
FIG. 5 is a drawing showing an embodiment of optical transmitting equipment.

FIG. 5 shows an embodiment of optical transmitting equipment in an optical line terminal in which an optical fiber amplifier used as the optical booster amplifier is supervised and the obtained supervisory information is transmitted to the next-stage optical repeater. The optical transmitting equipment has a data optical transmitter for converting data to a data optical signal with a wavelength of λd, an optical fiber amplifier for amplifying the data optical signal, and supervisory equipment. The optical fiber amplifier has a doped fiber 1, pumping light sources 2-1 and 2-2, a wavelength multiplexer 3 for multiplexing pumping light from the pumping light source 2-1 and a data optical signal, a wavelength multi- and demultiplexer 5 for multiplexing pumping light from the pumping light source 2-2 and a data optical signal in the opposite direction and multiplexing an output supervisory optical signal, and optical isolators 4-1 and 4-2. Therefore, according to this structure, an output supervisory optical signal is multiplexed with a data optical signal, transmitted from the optical transmitting equipment, and transmitted to the next-stage optical repeater. The wavelength multiplexer 3 has, for example, the structure shown in FIG. 3A and the wavelength multi- and demultiplexer 5 has, for example, the structure shown in FIG. 4B. The supervisory equipment has a power splitter 7 for dividing a part of output light of the optical booster amplifier, an optical filter 8 for passing only a data optical signal among the above divided light beams, a power monitor 9 for detecting data optical signal power of the above data optical signal passing through the optical filter, a controller 10 for inputting the above data optical signal power and other necessary information (a parity check signal, other signals necessary for supervising the optical repeater, a control signal for controlling each optical repeater, a control signal for controlling the optical receiving equipment, a control signal for controlling each optical repeater or the optical fiber amplifier built in the optical receiving equipment, etc.), and a supervisory optical transmitter 11 for converting an output supervisory electric signal outputted from the above controller 10 to the above output supervisory optical signal. The controller 10 judges whether the transmitter or optical fiber amplifier is normal by supervising whether the above data optical signal power is a normal value. The supervisory optical transmitter adds the above necessary information to the obtained judgment result (supervisory information) and converts them as an output supervisory optical signal.

According to this embodiment, supervisory information of the optical fiber amplifier which is used as an optical booster amplifier can be transmitted to the next-stage optical repeater and other information than the supervisory information also can be transmitted. For example, when a control signal for controlling the optical fiber amplifier built in each optical repeater is transmitted as mentioned above, the operation of each optical fiber amplifier can be controlled from the above optical line terminal where the above optical transmitting equipment is built in.

The above effects of the present invention are not restricted to the structure of this embodiment. For example, when the wavelength multi- and demultiplexer can multiplex and demultiplex both wavelengths λd and λp, the aforementioned effects can be obtained regardless of the internal actual structure. As to the optical isolators, the aforementioned effects can be obtained regardless of the installation location and the number of isolators to be used and even if no optical isolator is used. The pumping method for the doped fiber may be different from that shown in FIG. 5. Even when the pumping light travels in the traveling direction of the data optical signal, or in the opposite direction, or in both directions, the aforementioned effects can be obtained. Even when the number of pumping light sources is larger than that shown in FIG. 5, the aforementioned effects can be obtained. Even when the number of doped fibers is different from that shown in FIG. 5, the aforementioned effects can be obtained. The above power splitter 7, optical filter 8, and power monitor 9 may not be used. Even if an output supervisory optical signal with a wavelength of λp includes no supervisory information on the optical booster amplifier, by supervising the above supervisory optical signal power with a wavelength of λp by the next-stage optical repeater, the next-stage optical repeater can supervise an error in the optical transmission line. Even when optical parts such as an optical filter are inserted, the aforementioned effects can be obtained.

Figure 6:
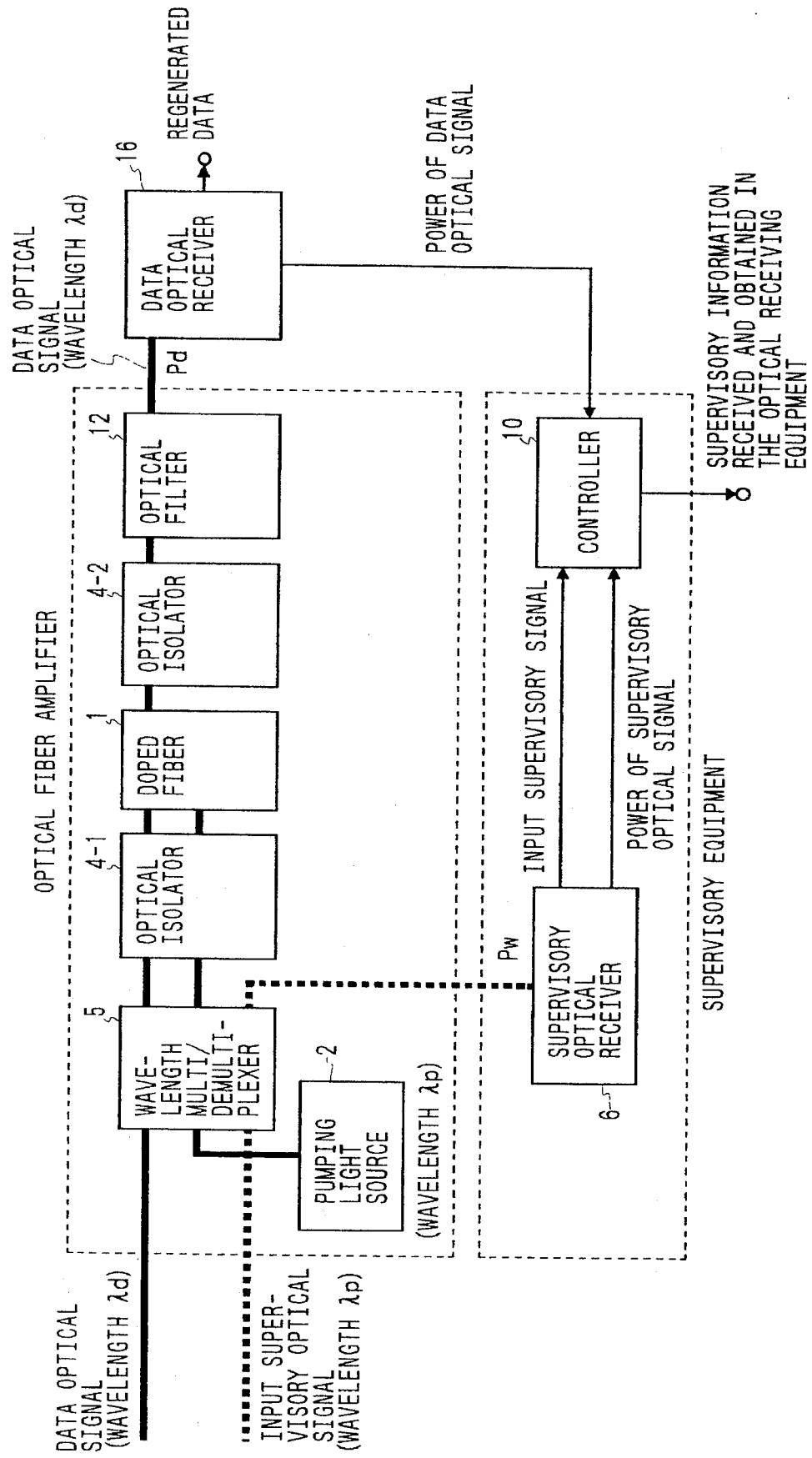
FIG. 6 is a drawing showing an embodiment of optical receiving equipment.

FIG. 6 shows an embodiment of optical receiving equipment for receiving supervisory information from the previous stage when an optical fiber amplifier of the optical receiving equipment in an optical line terminal is used as an optical preamplifier and for supervising the optical transmission line and optical preamplifier. The optical receiving equipment has at least an optical fiber amplifier for amplifying a data optical signal, supervisory equipment, and a data optical receiver 16 for regenerating the data from the amplified data optical signal and detecting data optical signal power Pd. The optical fiber amplifier has a doped fiber 1, a pumping light source 2, a wavelength multiand demultiplexer 5 for demultiplexing an input supervisory optical signal and multiplexing pumping light from the pumping light source 2 and a data optical signal, optical isolators 4-1 and 4-2, and an optional filter 12 for removing optical noise. The wavelength multi- and demultiplexer 5 has, for example, the structure shown in FIG. 4A. The supervisory equipment has a supervisory optical receiver 6 for converting the above demultiplexed input supervisory optical signal to an input supervisory electric signal and simultaneously detecting the input supervisory optical signal power and a controller 10 for inputting the above input supervisory electric signal, above input supervisory optical signal power, and above data optical signal power and outputting the supervisory information of this entire optical transmission system. Detection of the data optical signal power by the optical receiver can be realized, for example, by dividing a part of the received data signal and measuring the power value or peak value or by detecting a direct current flowing through the photodiode (an element for converting the data optical signal to an electric signal) which is built in the above data optical receiver.

The controller 10 judges whether the optical transmission line, optical fiber amplifier, and supervisory equipment are normal or not from the observed values of the input supervisory optical signal power and data optical signal power, adds the judgment result to the input supervisory electric signal, and outputs them. Concretely, the controller 10 observes Pw and Pd, judges that the optical fiber amplifier in the optical receiving equipment is failure when only the Pd value is different from the normal value, judges that the supervisory optical receiver or the supervisory optical transmitter (the wavelength is about $\lambda p$) of the pre-stage optical repeater is failure when only the Pw value is different from the normal value, and judges that the transmission line is failure when both the Pd and Pw values are different from the normal values. The reason for this judgment is the same as that for the optical repeater. The controller can control the operation of the built-in optical fiber amplifier on the basis of the control signal which is added to the received input supervisory electric signal.

According to this embodiment, the supervisory information of this entire optical transmission system can be obtained.

The above effects of the present invention are not restricted to the structure of this embodiment. For example, when the wavelength multi- and demultiplexer can multiplex and demultiplex both wavelengths $\lambda d$ and p, the aforementioned effects can be obtained regardless of the internal actual structure. As to the optical isolator, the aforementioned effects can be obtained regardless of the installation location and the number of isolators to be used and even if no optical isolator is used. The pumping method for the doped fiber may be different from that shown in FIG. 6. Even when the pumping light travels in the traveling direction of the data optical signal, or in the opposite direction, or in both directions, the aforementioned effects can be obtained. Even when the number of pumping light sources is larger than that shown in FIG. 6, the aforementioned effects can be obtained. Even when the number of doped fibers is different from that shown in FIG. 6, the aforementioned effects can be obtained. Even when optical parts such as an optical filter are inserted, the aforementioned effects can be obtained.

Figure 7:
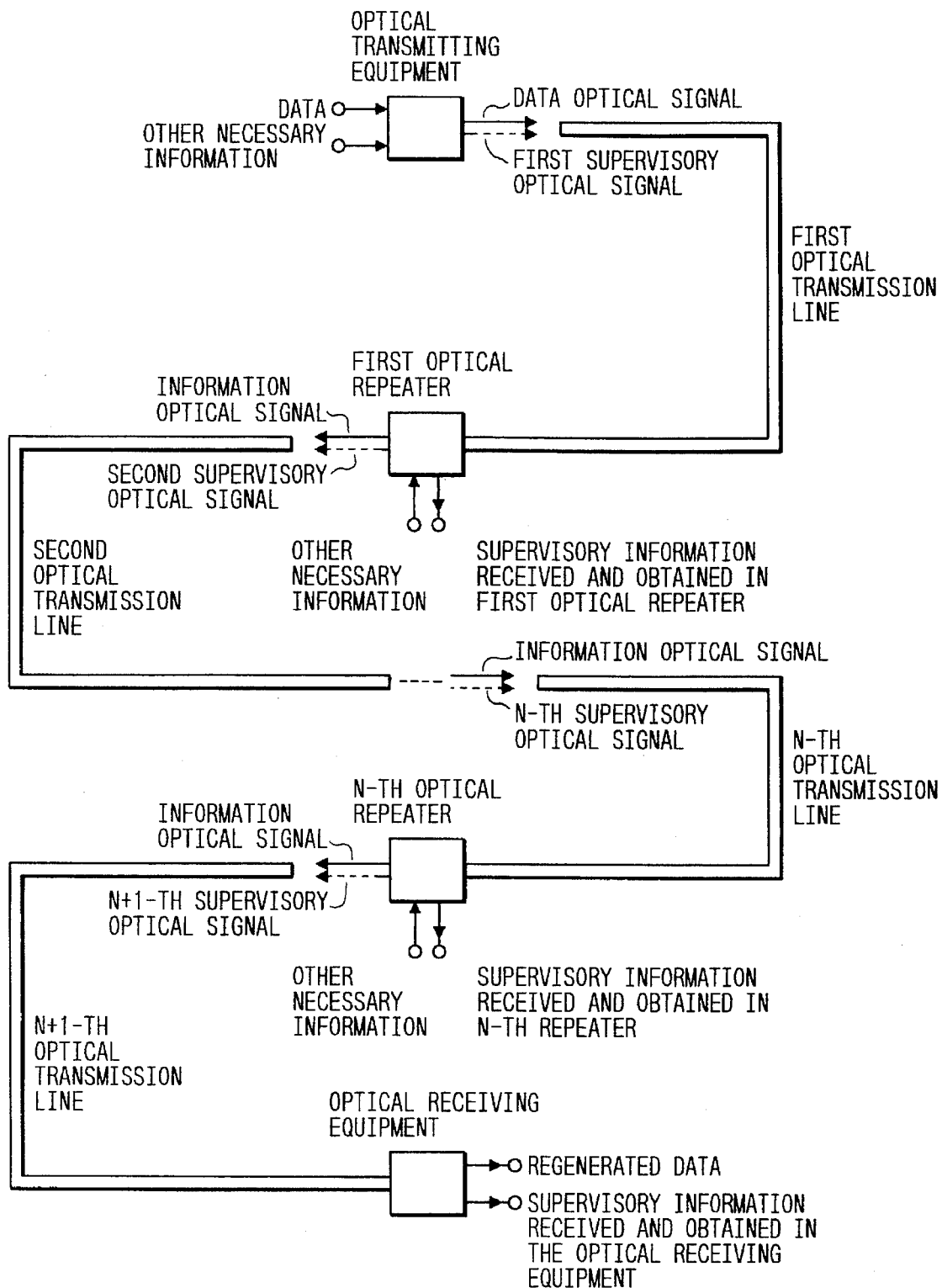
FIG. 7 is a drawing showing an embodiment of an optical transmission system.

FIG. 7 shows an embodiment of an optical transmission system using the supervision method and supervisory information transmission method of the present invention. This system has optical transmitting equipment of the present invention for converting data to a data optical signal and then amplifying and outputting it, optical transmission lines (first optical transmission line to "N+1"th optical transmission line; N is an integer of at least 1) for transmitting data optical signals, optical repeaters (first optical repeater to "N+1"th optical repeater) of the present invention for amplifying attenuated data optical signals, and optical receiving equipment of the present invention for amplifying a data optical signal and then regenerating the data. The above optical transmitting equipment can input data as well as properly necessary information (a parity check signal, other signals necessary for supervising the optical repeater, information on other units in the optical line terminal, a control signal for controlling each optical repeater, a control signal for controlling the optical receiving equipment, a control signal for controlling each optical repeater or the optical fiber amplifier built in the optical receiving equipment, control information on other units, etc.) and outputs light wherein a data optical signal and first supervisory optical signal are multiplexed. The first optical repeater amplifies a transmitted data optical signal, adds new supervisory information and other necessary information to a transmitted first supervisory optical signal as a second supervisory optical signal, and multiplexes and outputs it with the above amplified data optical signal. The second to "N"th optical repeats perform an operation which is the same as that of the first optical repeater. The above optical receiving equipment receives a transmitted data optical signal after it is amplified, regenerates the data, adds supervisory information of the optical fiber amplifier in this optical receiving equipment to the "N+1" supervisory optical signal, and outputs them.

According to this embodiment, the supervisory information of the entire optical transmission system can be obtained by a simple structure and the operation of each unit can be controlled simultaneously on the basis of a control signal added to a supervisory signal. The structure of this optical transmission system is not restricted to the above embodiment. For example, even if the optical transmitting equipment contains no optical fiber amplifier, by installing a supervisory optical transmitter and a wavelength multiplexer for multiplexing a supervisory optical signal and a data optical signal, the aforementioned effects on supervision can be obtained. The same may be said with the optical receiving equipment. Even if the optical receiving equipment contains no optical fiber amplifier, by installing a wavelength multiplexer for demultiplexing the "N+1"th supervisory optical signal from the data optical signal, the aforementioned effects on supervision can be obtained.

Figure 8:
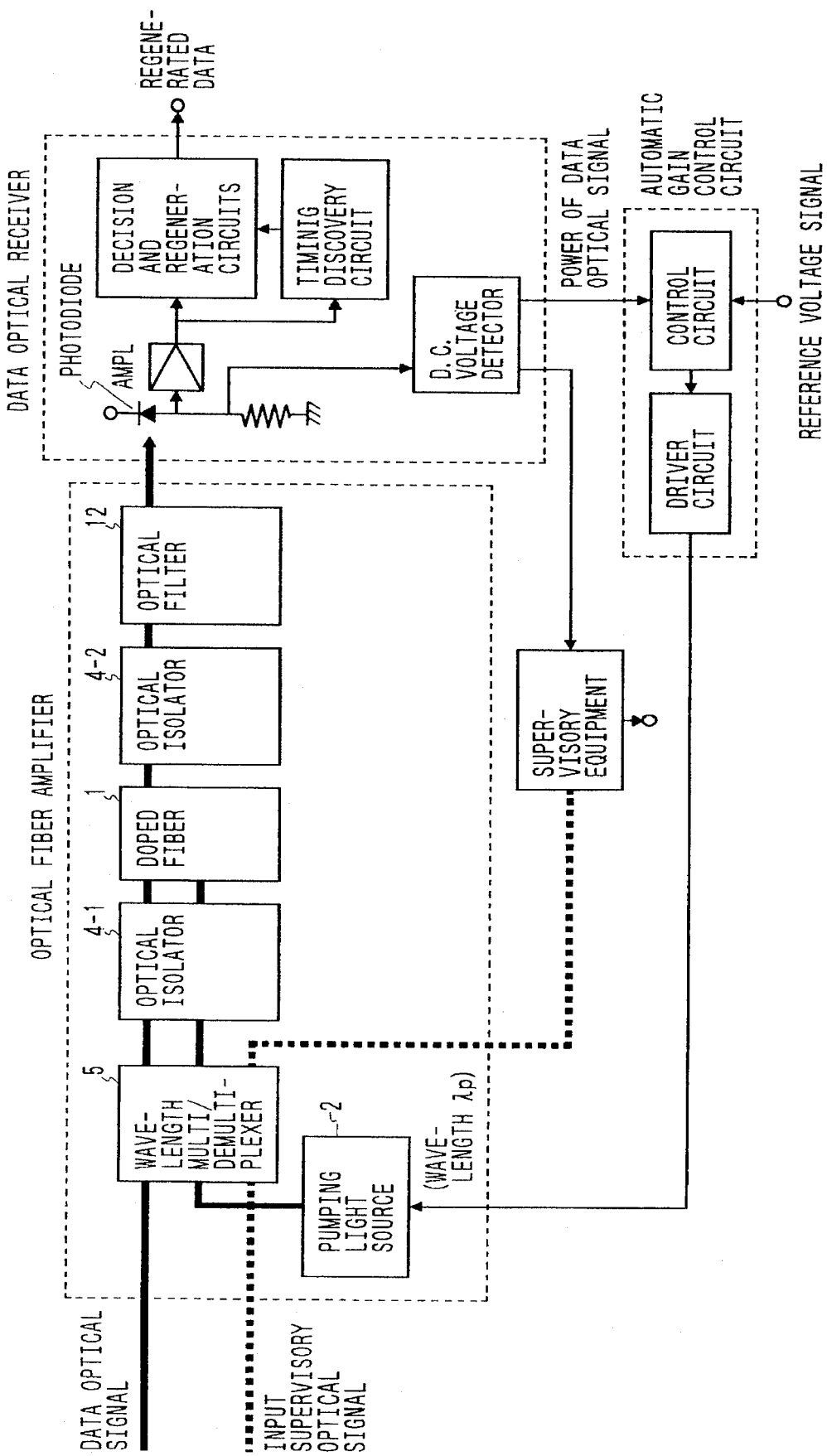
FIG. 8 is a drawing showing an embodiment of optical receiving equipment having an automatic gain control circuit.

FIG. 8 shows an embodiment when an automatic gain control circuit for controlling the gain of the optical fiber amplifier by adjusting the drive current of the pumping light source 2 so that the data optical signal power, which is inputted to the data optical receiver, is made almost constant is installed in the optical receiving equipment shown in FIG. 6. In the drawing, the data optical receiver has a photodiode, a resistor connected to the photodiode in series, an amplifier circuit for amplifying received data, a circuit for discovering timing from a signal from the amplifier circuit, a decision and regeneration circuit, and a DC voltage detector for detecting a DC voltage generated in the above resistor. The output of the above decision and regeneration circuit is regenerated data and the output of the above DC voltage detector is a voltage signal in proportion to the data optical signal power. Therefore, when the voltage signal in proportion to the above data optical signal power is controlled to a fixed value, the data optical signal power which is inputted to the above photodiode becomes constant. To exercise such control, the automatic gain control circuit has a control circuit for outputting a control signal by detecting the difference between a signal in proportion to the above data optical signal power and the reference signal and a driver circuit for controlling a current flowing through the pumping light source by the above control signal. The value of the control signal is set so that the above difference is 0. When the above difference is 0, a signal in proportion to the above data optical signal power is always constant (equal to the reference signal) and as a result, the power of a data optical signal which is inputted to the above photodiode also becomes constant. When it is added to this optical receiving equipment, the input data optical signal power to the data optical receiver can be set to a most suitable value regardless of changing of the data optical signal power which is inputted to this optical receiving equipment. When the optical receiving equipment shown in FIG. 8 is applied to the optical transmission system shown in FIG. 7, the performance of the optical transmission system can be improved furthermore.

Figure 9:
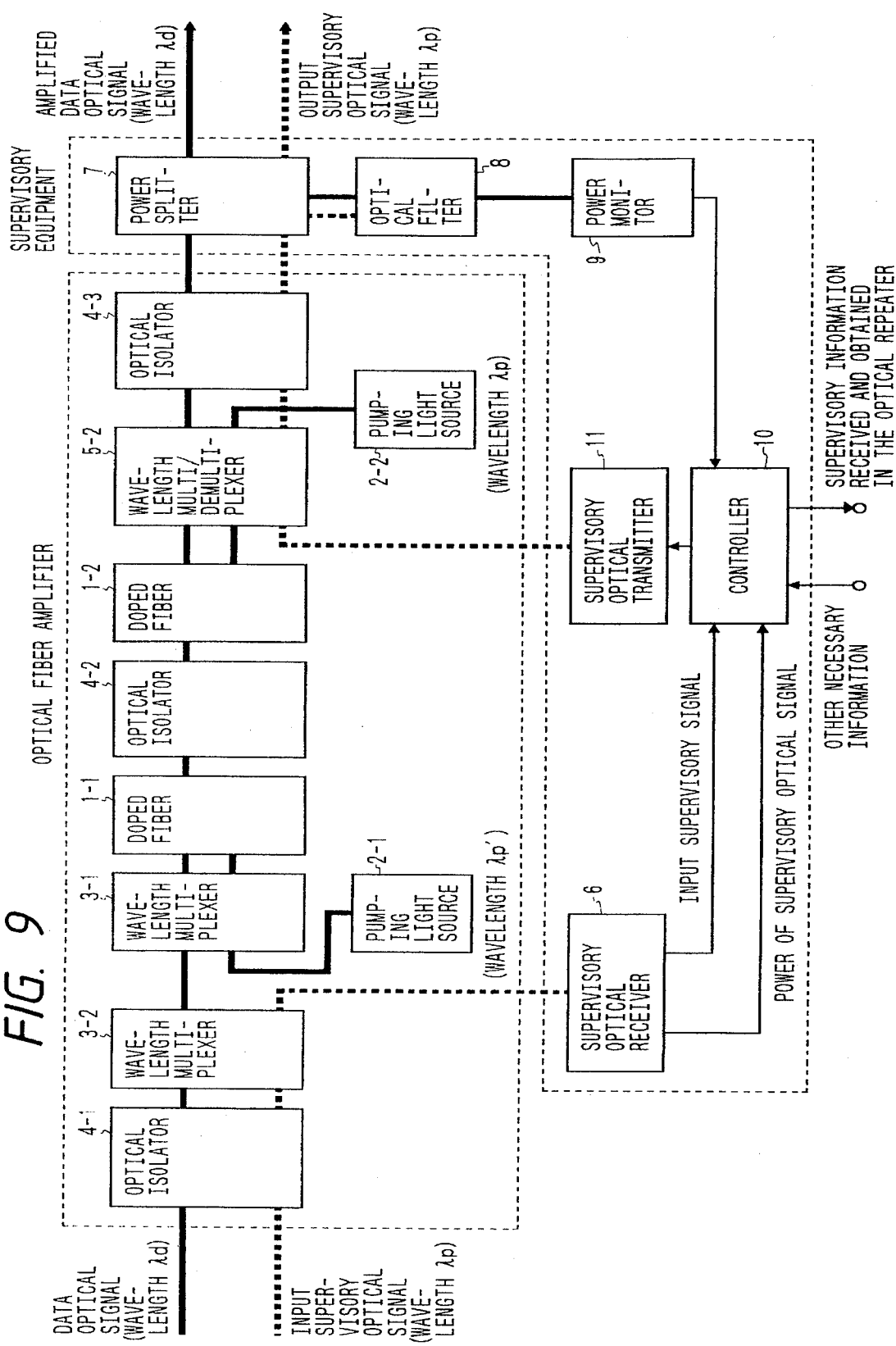
FIG. 9 is a drawing showing the second embodiment of the optical repeater.

FIG. 9 shows the second embodiment of the optical repeater of the present invention. According to this embodiment, the input-side wavelength multi- and demultiplexer 5-1 of the first embodiment shown in FIG. 1 is replaced with the wavelength multiplexers 3-2 and 3-1 (the structure is equal to the wavelength multiplexers 3-1 and 3-2 shown in FIG. 2), and an input supervisory optical signal is demultiplexed (the wavelength multiplexer 3-2 is used as a wavelength demultiplexer) from an optical signal (having a data optical signal and input supervisory optical signal) by the wavelength multiplexer 3-2, and a data optical signal and pumping light (outputted from the pumping light source 2-1) are multiplexed by the wavelength multiplexer 3-1. The other units are the same as those shown in FIG. 1. According to this embodiment, the wavelength $\lambda p'$ of pumping light outputted from the pumping light source 2-1 is not always equal to $\lambda p$. For example, p may be about 1.48 µm and $\lambda p'$ may be about 0.98 µm. It is known that when the wavelength of pumping light is about 0.98 µm, the noise figure of the optical fiber amplifier can be made smaller than that when the wavelength of pumping light is about 1.48 µm. Therefore, according to this embodiment, effects which are the same as those in the first embodiment of the optical repeater can be obtained and simultaneously the noise figure of the optical repeater can be reduced. Even when the wavelength multi- and demultiplexer 5 of the optical receiving equipment shown in FIG. 6 is also replaced with the wavelength multiplexers 3-2 and 3-1, the same effects can be obtained. In other words, the noise figure of the optical fiber amplifier can be reduced, so that the receiving sensitivity of the optical receiving equipment can be improved. When the optical repeater and optical receiving equipment described here are applied to the optical transmission system shown in FIG. 7, the interval between the optical repeaters and the interval between the optical repeater and optical receiving equipment can be made wider.

Figure 10:
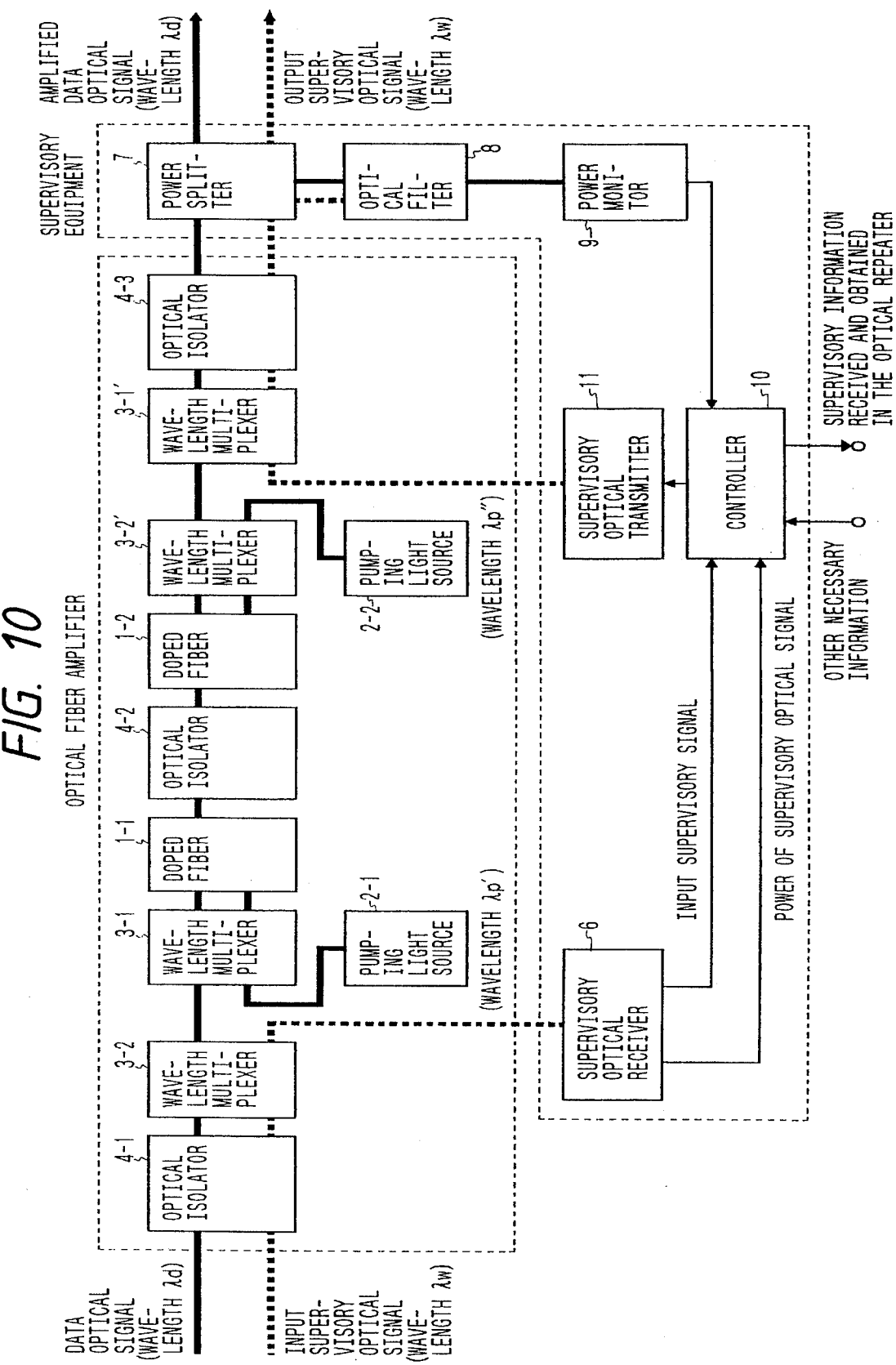
FIG. 10 is a drawing showing the third embodiment of the optical repeater.

FIG. 10 shows the third embodiment of the optical repeater of the present invention. According to this embodiment, the output-side wavelength multi- and demultiplexer 5-2 of the second embodiment shown in FIG. 9 is replaced with the wavelength multiplexers 3-2' and 3-1' (the structure is equal to the wavelength multiplexers 3-1 and 3-2 shown in FIG. 9), and the pumping light source 2-2 is multiplexed in the opposite direction to that of a data optical signal by the wavelength multiplexer 3-2', and a data optical signal and output supervisory optical signal are multiplexed by the wavelength multiplexer 3-1'. The other units are the same as those shown in FIG. 9. According to this embodiment, the wavelength of pumping light outputted from the pumping light source 2-1 (with a wavelength of $\lambda p'$) and the pumping light source 2-2 (with a wavelength of $\lambda p''$) is not always equal to the wavelength w of the supervisory optical signal. For example, $\lambda p'$ and $\lambda p''$ may be about 0.98 µm and $\lambda w$ may be about 1.48 µm or about 1.60 µm. Needless to say, $\lambda w$ may be equal to $\lambda p'$ or $\lambda p''$ (for example, about 1.48 µm), and $\lambda w$ may be equal to $\lambda p''$ (for example, about 1.48 µm), and $\lambda p'$ may be about 0.98 µm. As mentioned above, it is known that when the wavelength of pumping light is about 0.98 µm, the noise figure of the optical fiber amplifier can be made smaller than that when the wavelength of pumping light is about 1.48 µm. For example, another wavelength which is off the band (wavelength band with no gain or with a low gain) of the optical fiber amplifier and wherein the transmission loss of the transmission optical fiber is sufficiently low may be selected. Therefore, according to this embodiment, an optical repeater whose noise figure is furthermore smaller than that of the second embodiment of the optical repeater. When the optical repeater of this embodiment is applied to the optical transmission system shown in FIG. 7, the interval between the optical repeaters can be made wider furthermore. In this case, to standardize the wavelength $\lambda w$ of supervisory optical signals in the optical transmission system, it is necessary to replace the wavelength multi- and demultiplexer 5 of the optical transmitting equipment shown in FIG. 5 with the wavelength multiplexers 3-2' and 3-1' and to replace the wavelength multi- and demultiplexer 5 of the optical transmitting equipment shown in FIG. 6 with the wavelength multiplexers 3-2 and 3-1. When the optical transmitting equipment, optical repeater, and optical receiving equipment described here are applied to the optical transmission system shown in FIG. 7, the repeating interval and the total transmission distance (the total transmission distance from the optical transmitting equipment to the optical receiving equipment) can be made wider.

Figure 11:
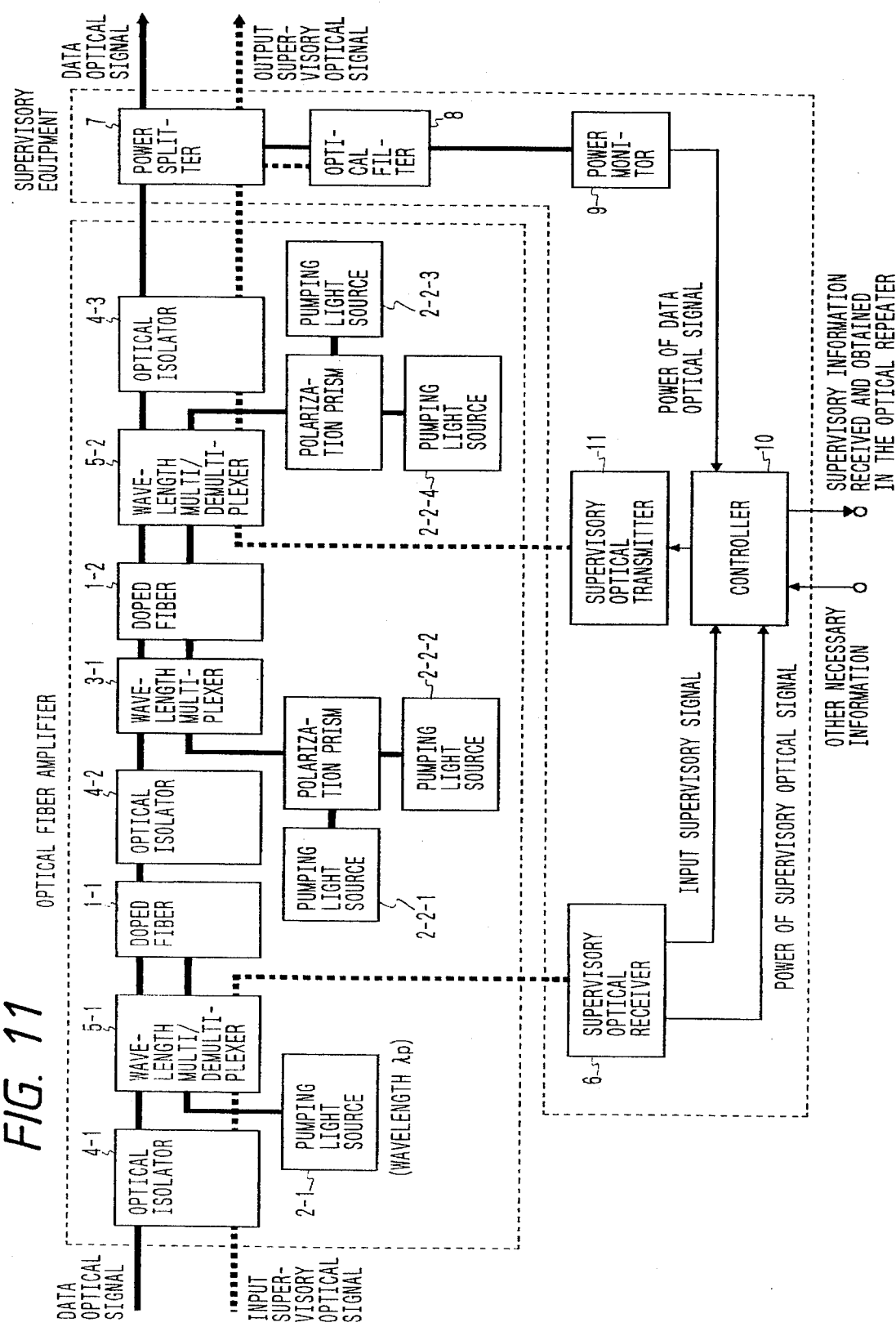
FIG. 11 is a drawing showing the fourth embodiment of the optical repeater.

FIG. 11 shows the fourth embodiment of the optical repeater of the present invention. According to this embodiment, to increase the output power of the optical repeater of the first embodiment, the power of pumping light for supplying to the output-side doped fiber 1-2 is increased by bidirectional pumping. To increase the power of pumping light, four pumping light sources are used. Two (pumping light sources 2-2-1 and 2-2-2) out of the four pumping light sources are light sources for pumping the doped fiber 1-2 in the forward direction, and each output light is composed in the orthogonally polarized state by a polarization prism and inputted to the doped fiber 1-2 via the wavelength multiplexer 3-1. The pumping light sources 2-2-3 and 2-2-4 are light sources for pumping the doped fiber 1-2 in the reverse direction and each output light is composed in the orthogonally polarized state by a polarization prism and inputted to the doped fiber 1-2 via the wavelength multiplexer 5-2. Therefore, according to this embodiment, effects which are the same as those in the first embodiment of the optical repeater can be obtained and simultaneously the output power of the optical repeater can be increased. The same effects can be obtained by pumping the doped fiber 1 of the optical transmitting equipment shown in FIG. 5 in both directions in the same way. Therefore, the output power of the optical fiber amplifier can be increased. When the optical transmitting equipment and optical repeater described here are applied to the optical transmission system shown in FIG. 7, the interval between the optical repeaters and the interval between the optical transmitting equipment and optical repeater can be made wider. When the number of pumping light sources is at least 2 even if it is less than 4, the output power can be increased and the repeating interval can be made wider. The wavelengths of the pumping light sources 2-2-1, 2-2-2, 2-2-3, and 2-2-4 may be about 0.98 µm, about 1.48 µm, or a combination of the two.

Figure 12:
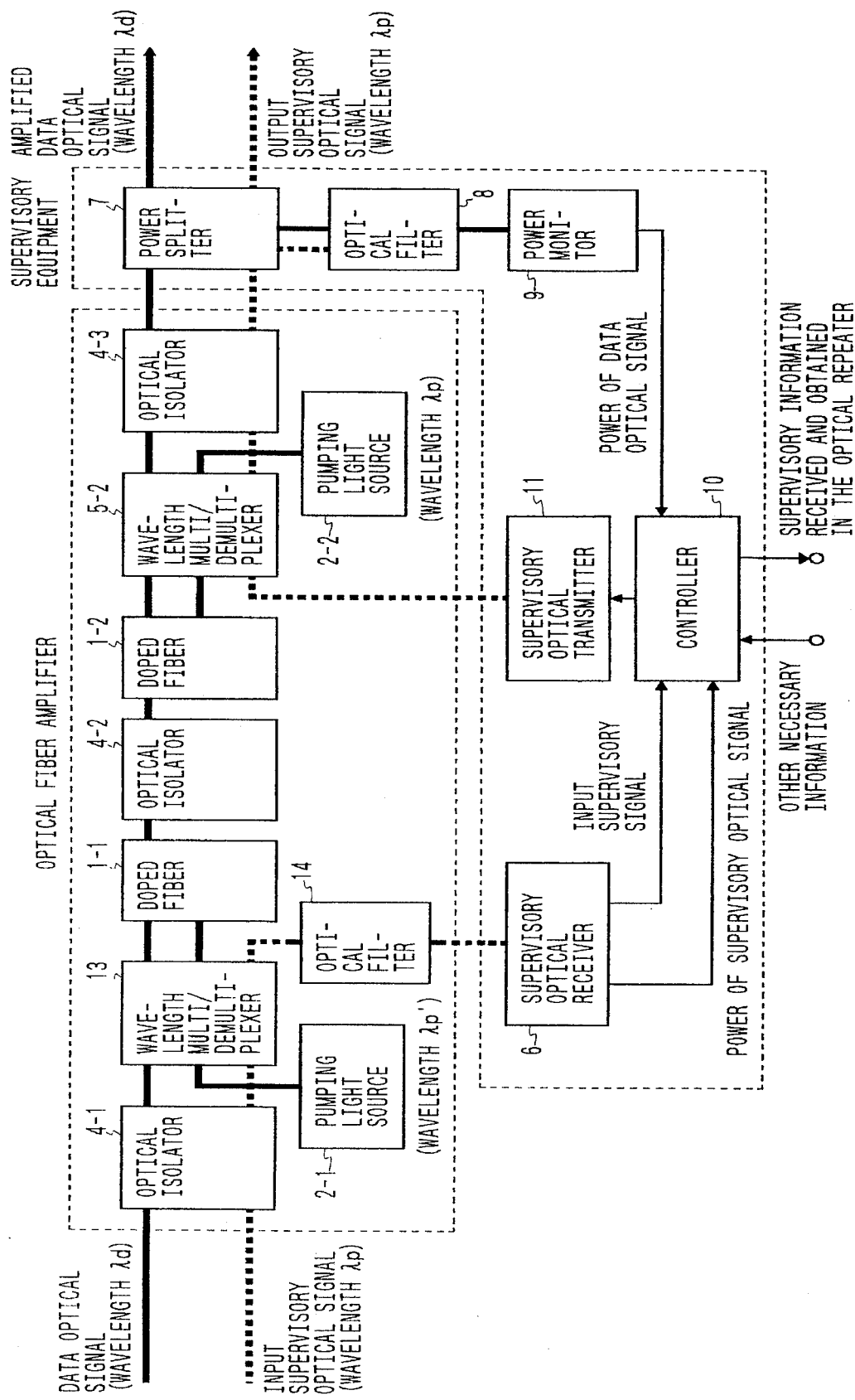
FIG. 12 is a drawing showing the fifth embodiment of the optical repeater.
Figure 13:
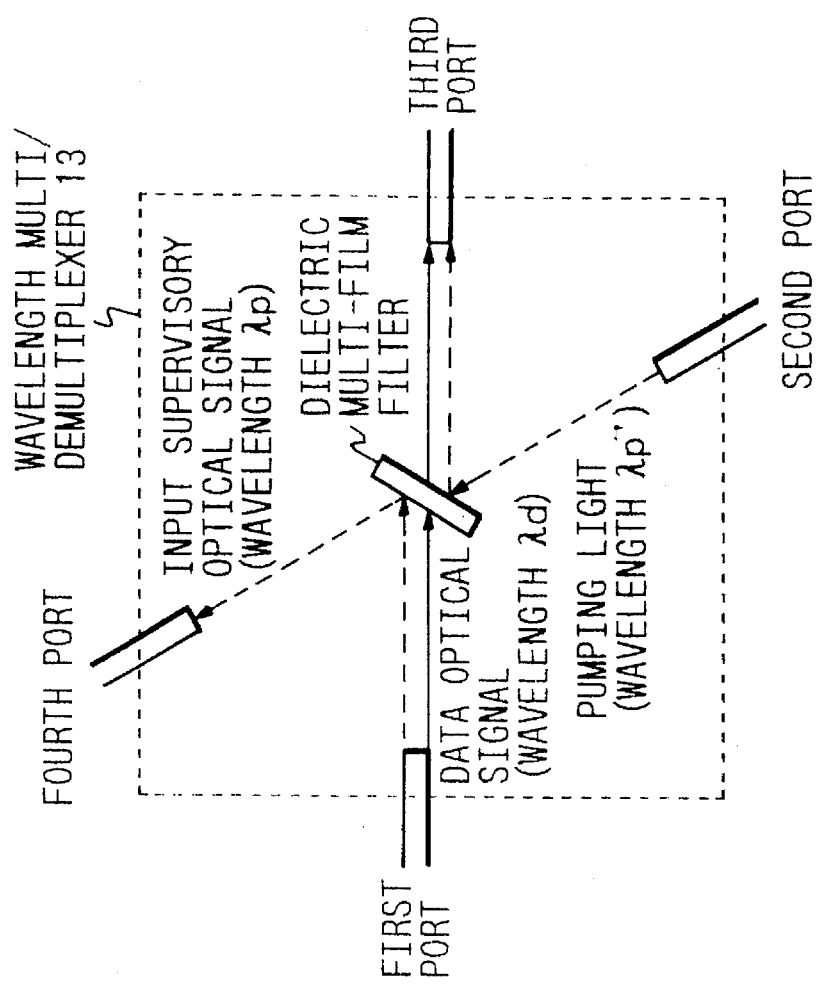
FIG. 13 is a drawing showing the structure of the wavelength multi- and demultiplexer and the optical input and output relation.
Figure 14A:
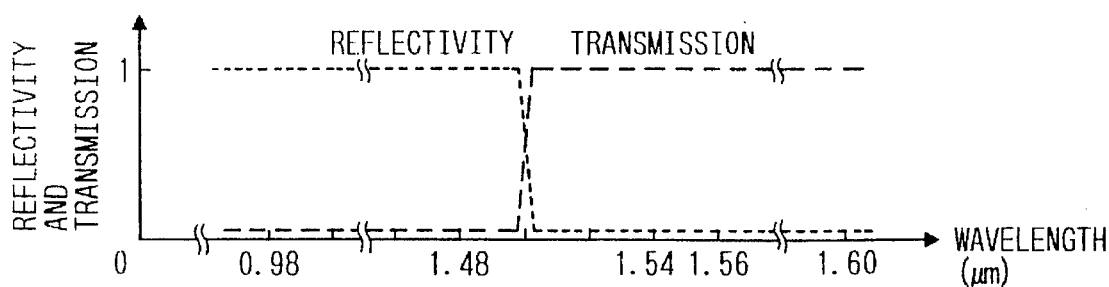
FIG. 14 is a drawing showing the wavelength dependency of reflectivity and transmission of each filter.
Figure 14B:
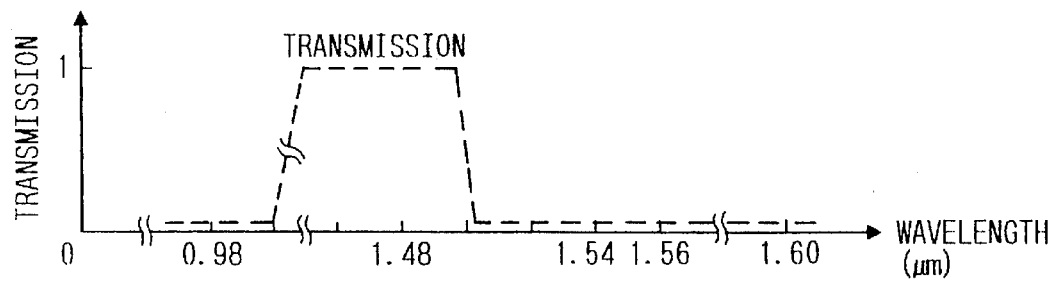
Figure 14C:
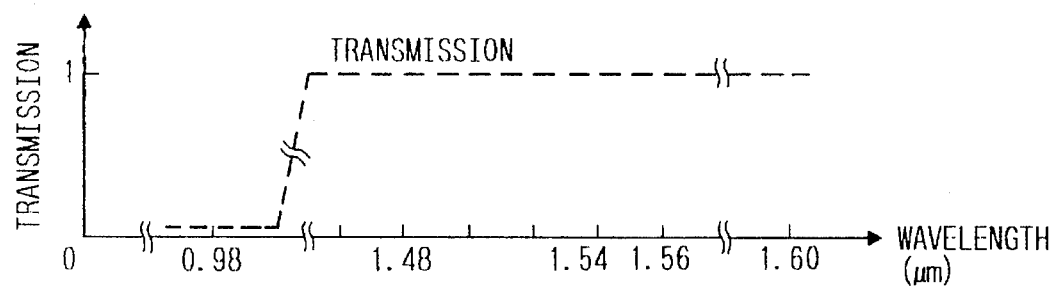

FIG. 12 shows the fifth embodiment of the optical repeater of the present invention. Two differences between the first embodiment of the optical repeater and this embodiment are (1) the wavelength of the pumping light source 2-1 is to $\lambda p'$ (=p) and (2) the wavelength multi- and demultiplexer 13 demultiplexes an input supervisory optical signal (with a wavelength of $\lambda p$) which is multiplexed with a data optical signal (with a wavelength of d) and transmitted and multiplexes pumping light outputted from the above pumping light source 2-1. Appropriate settings of the wavelengths $\lambda d$, $\lambda p$, and $\lambda p'$ are, for example, about 1.5 μm, about 1.48 μm. and about 0.98 μm. The wavelength $\lambda p$ may be another value. For example, it may be another wavelength off the band of the optical fiber amplifier. FIG. 13 shows the structure of the wavelength multi- and demultiplexer 13 using a dielectric multi-film filter and the optical input and output relation as an example. Among a data optical signal and input supervisory optical signal which are inputted from the first port, the former transmits through the dielectric multi-film filter and the latter is reflected off of the filter. The reflected input supervisory optical signal is outputted from the fourth port and inputted to the supervisory optical receiver. On the other hand, pumping light is inputted from the second port and reflected off of the above dielectric multi-film filter and then multiplexed with the above transmitted data optical signal and outputted from the third port. In other words, the dielectric multifilm filter transmits the wavelength $\lambda d$ and reflects the wavelengths $\lambda p$ and $\lambda p'$. This input and output relation can be realized by making the reflectivity and transmission of the dielectric multi-film filter dependent on the wavelength, for example, as shown in FIG. 14A. Therefore, it is desirable that the dielectric multi-film filter has reflection characteristics (the reflectivity is about 1 and the transmission is about 0) for a wavelength of about 1.5 μm at most and transmission characteristics (the transmission is about 1 and the reflectivity is about 0) for a wavelength of about 1.5 μm at least. However, when the dielectric multi-film filter transmits the wavelength $\lambda d$ and reflects the wavelengths $\lambda p$ and $\lambda p'$, the reflectivity and transmission characteristics may be other than those shown in FIG. 14A. A filter other than the dielectric multi-film filter may be used. When the above wavelength multiplexing and demultiplexing are realized for the wavelength $\lambda d$ and the wavelengths $\lambda p$ and $\lambda p'$, the relation between reflection and transmission may be reverse. FIGS. 14B and 14C show transmission characteristics of the optical filter 14 shown in FIG. 12. The optical filter 14 is installed so as to prevent a part of pumping light with a wavelength of $\lambda p'$ from transmitting the dielectric multi-film filter, outputting from the fourth port shown in FIG. 13, and inputting to the supervisory optical receiver when the reflectivity and transmission characteristics of the above optical multi- and demultiplexer 13 are not perfect. When the optical filter 14 has transmission characteristics, for example, as shown in FIG. 14B or 14C, the wavelength $\lambda p'$ can be removed. Needless to say, when the transmission near the wavelength $\lambda p$ is high, other transmission characteristics may be used. When the above incompleteness of the wavelength multi- and demultiplexer 13 is removed and the input and output relation shown in FIG. 13 is almost realized, there is no need to use the optical filter 14. Furthermore, also when the supervisory optical receiver does not respond to the wavelength $\lambda p'$ (the photodetection sensitivity is almost 0), there is no need to use the optical filter 14. According to this embodiment, effects which are the same as those of the first embodiment of the optical repeater can be obtained and simultaneously a pumping light wavelength of about 0.98 μm can be used, so that the noise factor of the optical repeater can be reduced. Furthermore, a wavelength multi- and demultiplexer can demultiplex an input supervisory optical signal and multiplex pumping light with a wavelength of about 0.98 μm, so that the number of optical parts can be reduced compared with that of the second embodiment (FIG. 9) of the optical repeater and simultaneously the attenuation of a data optical signal can be minimized. When the optical repeater shown in FIG. 12 is applied to the optical transmission system shown in FIG. 7, the interval between the optical repeaters can be made wider because the noise factor of the optical repeater is reduced and the performance of the optical transmission system can be improved furthermore. The optical fiber amplifier in the optical repeater of this embodiment may be pumped in both directions. By doing this, the noise figure can be reduced furthermore and the gain can be increased furthermore.

Figure 15:
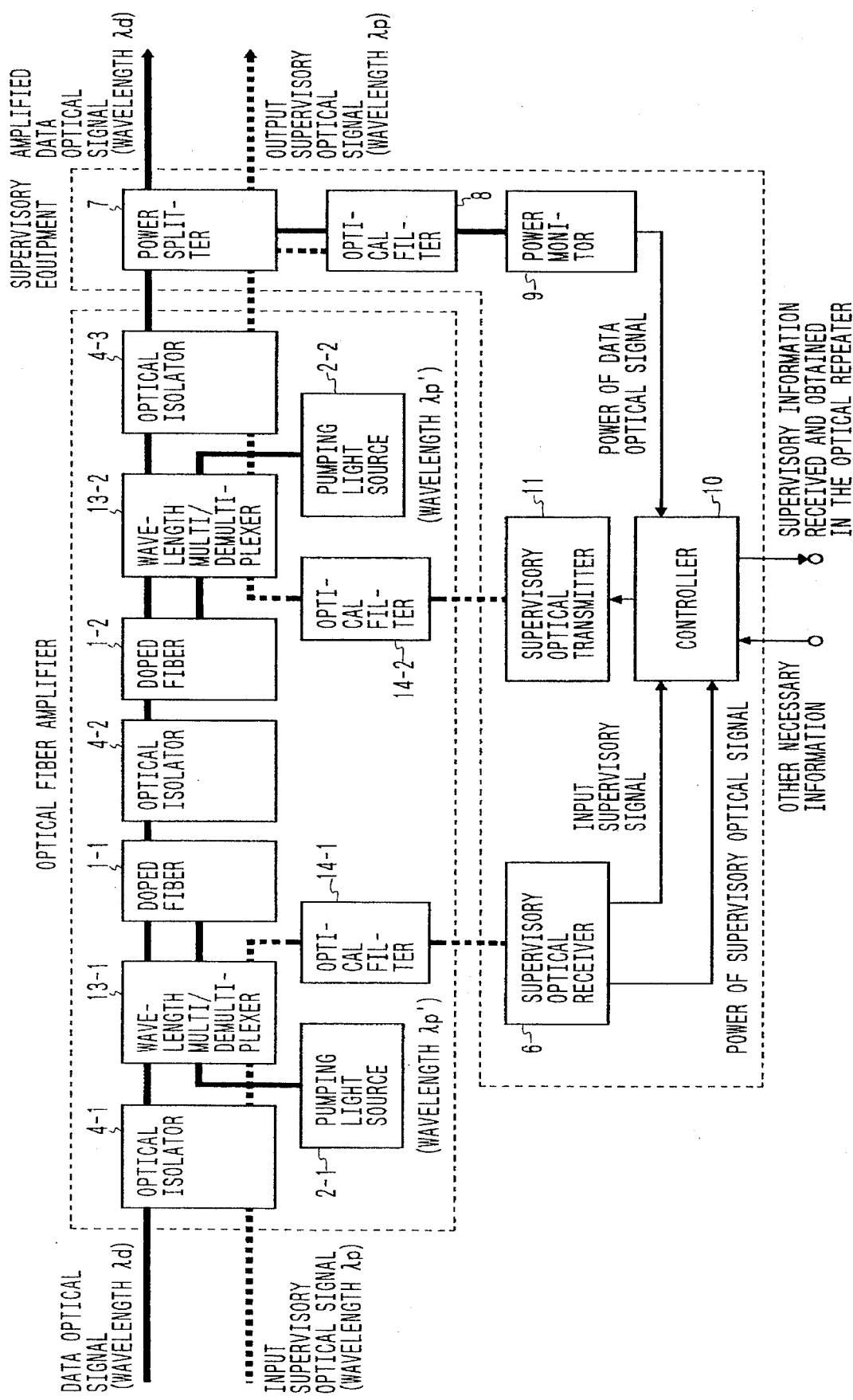
FIG. 15 is a drawing showing the sixth embodiment of the optical repeater.
Figure 16:
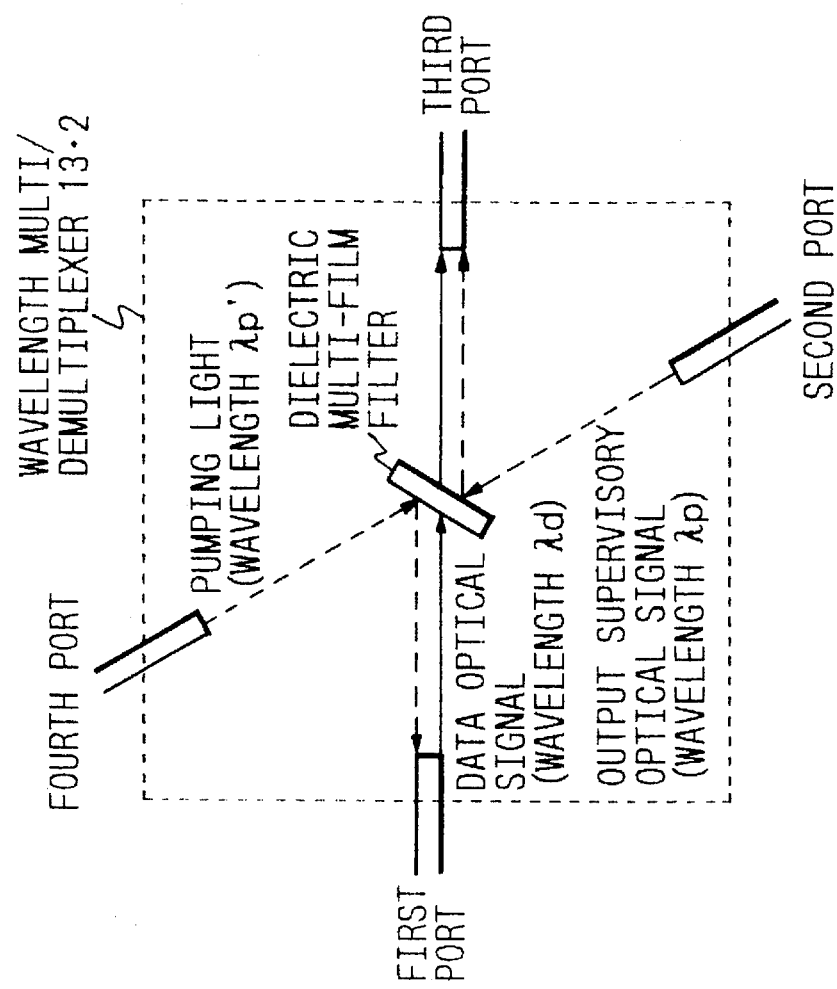
FIG. 16 is a drawing showing the structure of the wavelength multi- and demultiplexer and the optical input and output relation.
Figure 17:
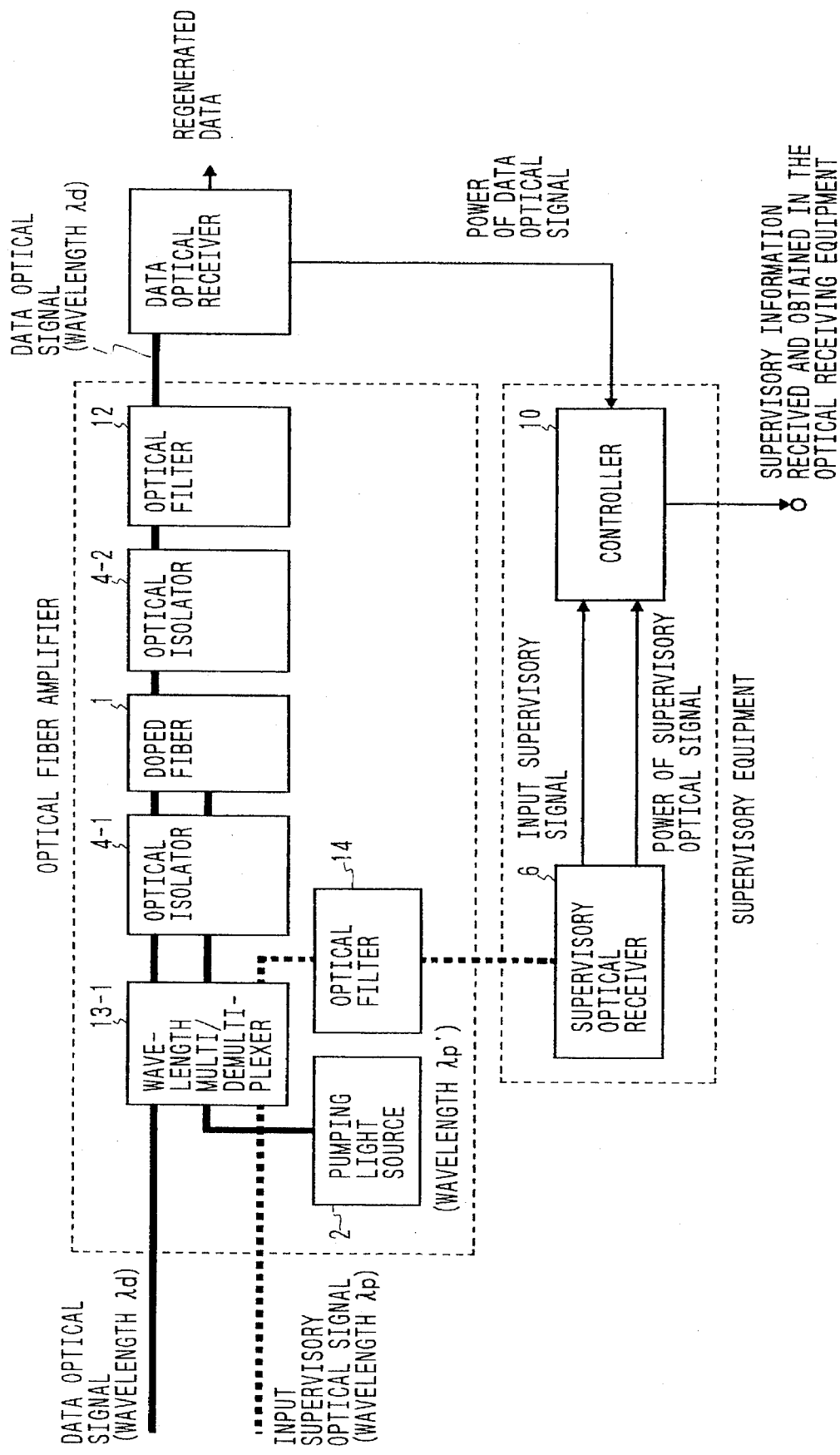
FIG. 17 is a drawing showing another embodiment of the optical receiving equipment.
Figure 18:
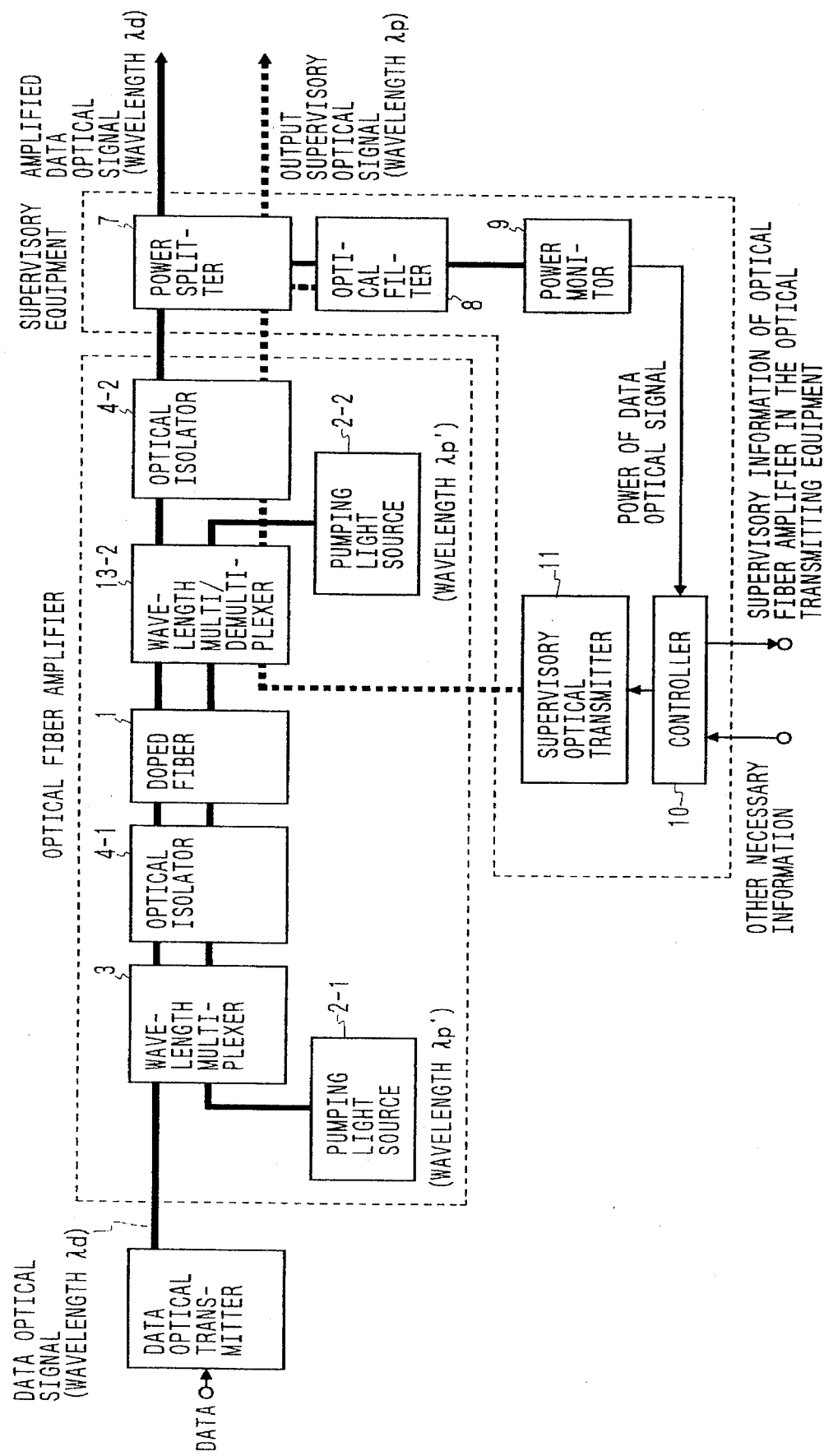
FIG. 18 is a drawing showing another embodiment of the optical transmitting equipment.

FIG. 15 shows the sixth embodiment of the optical repeater of the present invention. Two differences between the fifth embodiment of the optical repeater and this embodiment are (1) the wavelength of the pumping light source 2-2 is also set to $\lambda p'$ (=p) and (2) the wavelength multi- and demultiplexer 13-2 multiplexes an output supervisory optical signal (with a wavelength of $\lambda p$) and pumping light outputted from the above pumping light source 2-2 with a data optical signal (with a wavelength of $\lambda d$). The wavelength multi- and demultiplexer 13-1 shown in the drawing is the same as the wavelength multi- and demultiplexer 13 shown in FIG. 12. The realization method and structure of the wavelength multi- and demultiplexer 13-2 are the same as those of the fifth embodiment, though the optical input and output relation is as shown in FIG. 16. A data optical signal is inputted from the first port, transmits the dielectric multi-film filter, and is outputted to the third port. Pumping light is inputted from the fourth port, reflected off of the dielectric multi-film filter, and outputted to the first port. An output supervisory optical signal is inputted from the second port, reflected off of the dielectric multi-film filter, and outputted to the third port. The optical filter 14-1 is used for the reason described in the fifth embodiment, though it may not be used in some case. The optical filter 14-2 is installed so as to prevent a part of pumping light with a wavelength of $\lambda p'$ from transmitting the dielectric multi-film filter and inputting to the supervisory optical transmitter and it may not be used when it is not necessary. According to this embodiment, effects which are the same as those of the fifth embodiment of the optical repeater can be obtained and simultaneously an output-side pumping light wavelength of about 0.98 μm is used, so that the noise figure of the optical repeater can be reduced furthermore. Furthermore, a wavelength multi- and demultiplexer can multiplex an output supervisory optical signal and pumping light with a data optical signal, so that the number of optical parts can be reduced compared with that of the third embodiment (FIG. 10) of the optical repeater and simultaneously the attenuation of the data optical signal can be minimized. When the optical repeater shown in FIG. 15 is applied to the optical transmission system shown in FIG. 7, the interval between the optical repeaters can be made wider because the noise factor of the optical repeater is reduced and the performance of the optical transmission system can be improved furthermore. The optical fiber amplifier in the optical repeater of this embodiment may be pumped in both directions. By doing this, the noise figure can be reduced and the gain can be increased. FIG. 17 shows another embodiment of the optical receiving equipment. Two differences between the embodiment of the optical receiving equipment shown in FIG. 6 and this embodiment are (1) the wavelength of the pumping light source 2 is set to $\lambda p'$ ($\neq \lambda p$) and (2) the wavelength multi- and demultiplexer 13-1 demultiplexes an input supervisory optical signal (with a wavelength of $\lambda p$) which is multiplexed with a data optical signal (with a wavelength of $\lambda d$) and transmitted and multiplexes pumping light outputted from the above pumping light source 2. The settings of the wavelengths $\lambda d$, p, and $\lambda p'$ are the same as those of the fifth embodiment of the optical repeater and the same may be said with the realization method of the wavelength multi- and demultiplexer 13-1. The optical filter 14 which is the same as that shown in FIG. 12 is used for the same reason. According to this embodiment, effects which are the same as those of the embodiment of the optical receiving equipment shown in FIG. 6, that is, the effect that the supervisory information of the entire optical transmission system can be obtained and simultaneously the effect that the noise factor of the optical fiber amplifier in the optical receiving equipment can be reduced because a pumping light wavelength of about 0.98 μm can be used. When the optical receiving equipment shown in FIG. 17 is applied to the optical transmission system shown in FIG. 7, the interval between the optical repeater and optical receiving equipment can be made wider because the noise figure of the optical receiving equipment is reduced and the performance of the optical transmission system can be improved furthermore. The optical fiber amplifier in the optical receiving equipment of this embodiment may be pumped in both directions. By doing this, the noise figure can be reduced furthermore and the gain can be increased furthermore. FIG. 18 shows another embodiment of the optical transmitting equipment. Two differences between the embodiment of the optical transmitting equipment shown in FIG. 5 and this embodiment are (1) the wavelength of the pumping light source 2-2 is set to $\lambda p'$ ($\neq \lambda p$) and (2) the wavelength multi- and demultiplexer 13-2 multiplexes an output supervisory optical signal (with a wavelength of $\lambda p$) and pumping light outputted from the above pumping light source 2-2 with a data optical signal (with a wavelength of $\lambda d$). The settings of the wavelengths $\lambda d$, $\lambda p$, and $\lambda p'$ are the same as those of the fifth embodiment of the optical repeater. The realization method of the wavelength multi- and demultiplexer 13-2 is the same as that of the sixth embodiment of the optical repeater. According to this embodiment, effects which are the same as those of the embodiment of the optical transmitting equipment shown in FIG. 5 can be obtained and simultaneously a pumping light wavelength of about 0.98 μm can be used, so that the noise figure of the optical fiber amplifier in the optical receiving equipment can be reduced. The wavelength of the pumping light source 2-1 may be any one of $\lambda p'$ and $\lambda p$ However, when the wavelength is $\lambda p'$, the noise figure of the optical fiber amplifier can be reduced much more. When the optical transmitting equipment shown in FIG. 18 is applied to the optical transmission system shown in FIG. 7, the interval between the optical transmitting equipment and optical repeater can be made wider because the noise figure of the optical transmitting equipment is reduced and the performance of the optical transmission system can be improved. The optical fiber amplifier in the optical transmitting equipment of this embodiment may be pumped in both directions. By doing this, the noise figure can be reduced and the gain and output power can be increased. The structure of the present invention is not restricted to the above embodiment. Even when the optical transmission line is divided and a data optical signal (multiplexed with a supervisory optical signal) is distributed to a plurality of optical receiving equipment, the aforementioned effects can be obtained. Even when the traveling direction of the supervisory optical signal is opposite to the traveling direction of the data optical signal, the aforementioned effects can be obtained. In this case, it is necessary to interchange the supervisory optical transmitter in each optical repeater with the supervisory optical transmitter, to replace the supervisory optical transmitter in the optical transmitting equipment with the supervisory optical receiver, and to replace the supervisory optical receiver in the optical receiving equipment with the supervisory optical transmitter. Even when error judgment, which is carried out by the controller of the optical transmitting equipment, optical repeaters, and optical receiving equipment, is carried out by the optical receiving equipment in a batch, the aforementioned effects can be obtained. In this case, the optical transmitting equipment and each optical repeater need add and transmit only observed power values as supervisory information. As to a combination of the wavelengths of a data optical signal, pumping light, and supervisory optical signal, the wavelengths of the above embodiment may be properly combined. Even when a plurality of wavelengths are used for a supervisory optical signal in the optical fiber transmission system, the effects of the present invention can be obtained. The wavelength of pumping light may vary with each optical repeater. The wavelength of a data optical signal may be about 1.3 μm. In this case, by setting $\lambda p$ to, for example, about 1 μm and using neodymium as an additive to the doped fiber, the doped fiber can have a gain. Furthermore, the operations of the optical receiving equipment shown in FIG. 8 or 17 and the optical repeater shown in FIG. 9, 10, 11, 12, or 15 can be controlled by control signals which are added to supervisory information and transmitted. An optical transmission system may be structured by properly combining the optical transmitting equipment, optical repeater, and optical receiving equipment of the above embodiment. If the optical filter built in the wavelength multiplexer, wavelength demultiplexer, or wavelength multi- and demultiplexer used in each embodiment fulfills a function of wavelength multiplexing, wavelength demultiplexing, or wavelength multiplexing and demultiplexing, the same effects can be obtained even when it operates on a principle which is different from the one explained in each embodiment. For example, when the optical filter is a dielectric multi-film filter, the relation between transmission and reflection for each wavelength may be reverse. When the optical filter is of a directional coupler type, the wavelength relation between coupling and non-coupling may be reverse. Even when the wavelength of a supervisory optical signal is about 1.3 μm, the same effects can be obtained. A plurality of wavelengths may exist for a supervisory optical signal in the optical transmission system.

Figure 19:
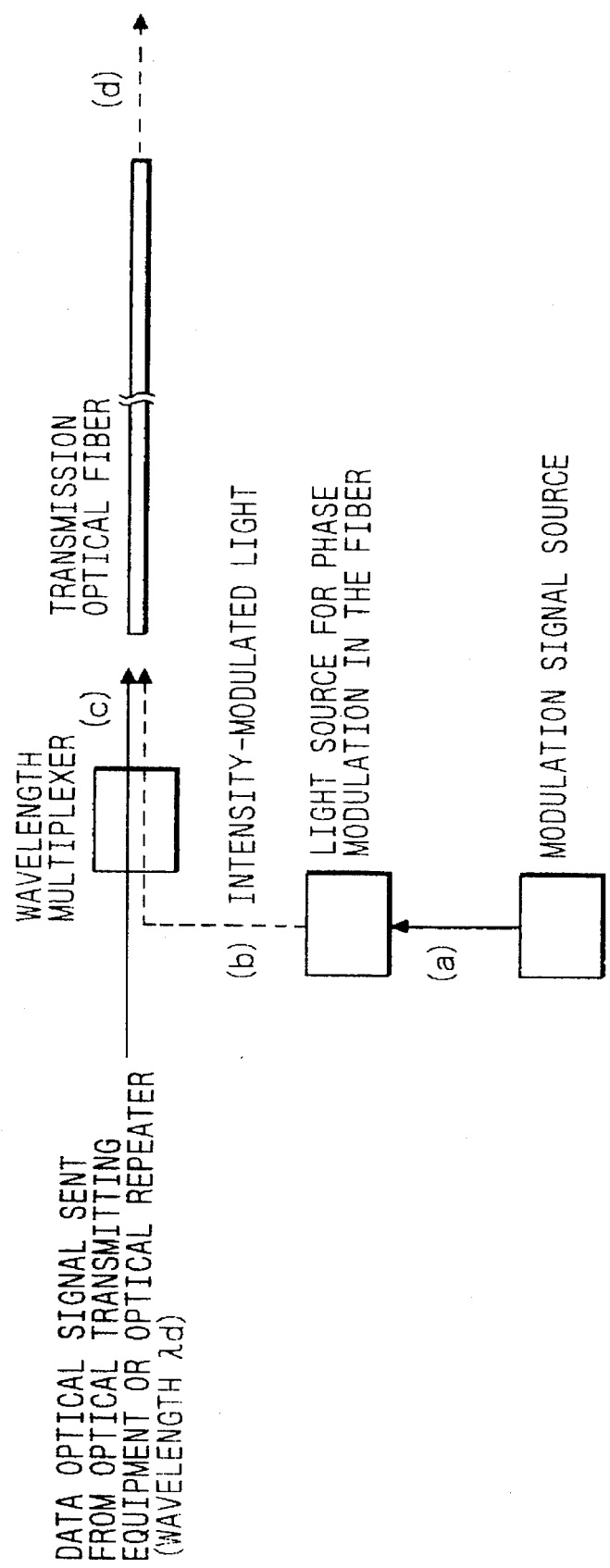
FIG. 19 is a drawing showing an embodiment of equipment for suppression of stimulated Brillouin scattering (SBS).
Figure 20A:
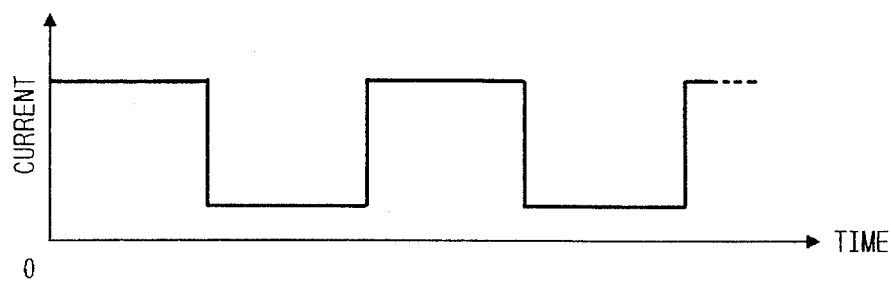
FIG. 20 is a drawing showing the signal waveform at each unit shown in FIG. 19.
Figure 20B:
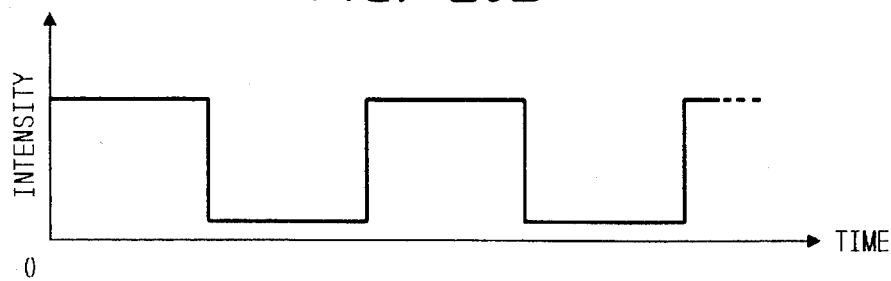
Figure 20C:
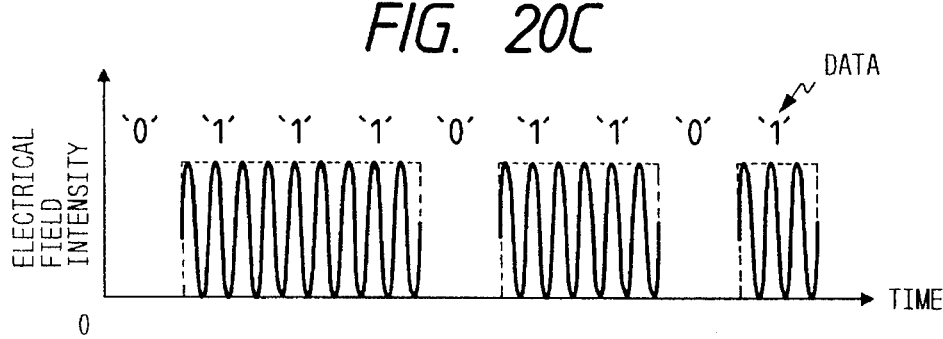
Figure 20D:
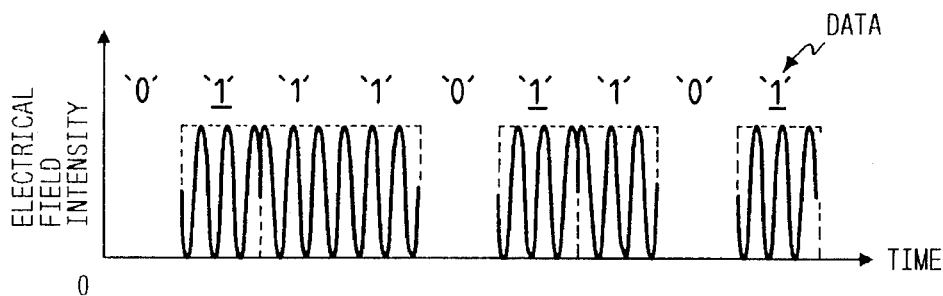

According to an optical fiber transmission system using the aforementioned optical fiber amplifier, the power of a data optical signal which is inputted to the transmission optical fiber is high (at least several milliwatts). Therefore, there may be a problem imposed that a stimulated Brillouin scattering (SBS) phenomenon is generated in the optical fiber and the data optical signal is reflected and returned to the input end. The SBS phenomenon appears when the power of an optical frequency exceeds the intrinsic SBS threshold value of the optical fiber and it is known that when, for example, the above power is scattered to a plurality of optical frequencies and the power of each optical frequency is controlled below the above SBS threshold value, no SBS phenomenon is generated. Therefore, the above problem can be solved, for example, by connecting equipment for suppression of SBS having the structure shown in FIG. 19 to the output terminal of the optical transmitting equipment or optical repeater and by inputting the output light to the transmission optical fiber. The equipment for suppression of SBS shown in FIG. 19 has at least a light source for phase modulation in the fiber, a modulation signal source for modulating the intensity of the light source, and a wavelength multiplexer for multiplexing the intensitymodulated pumping light with a data optical signal. According to this structure, by changing the intensity of light outputted from the light source for phase modulation in the fiber, a reflectivity change using a non-linear optical phenomenon is generated in the optical fiber. When the reflectivity is changed, the data optical signal is modulated in phase and the signal spectrum spreads. When the spectrum spreads, the power can be scattered to a plurality of optical frequencies. Therefore, even when the power of an optical frequency in the data optical signal exceeds the SBS threshold value, the power of the above optical frequency can be scattered to a plurality of frequencies and each power can be lowered than the SBS threshold value by using this equipment, so that an occurrence of SBS can be prevented. FIG. 20 shows a waveform example of a signal of each unit. FIG. 20A shows a modulation current of the light source for phase modulation in the fiber which is outputted from the modulation signal source and the current varies up and down periodically. The most suitable period is determined by the spectrum and intensity of the data optical signal and characteristics of the optical fiber. In this case, the lower current may be 0. FIG. 20B shows intensity-modulated light and the intensity changes in correspondence with the signal shown in FIG. 20A. In this case, the lower light intensity may be 0. It is known that the variation of the reflectivity which is caused by a non-linear optical phenomenon in the optical fiber depends on the variation of the light intensity. Therefore, by increasing the difference in light intensity between the maximum and minimum values, the variation of the light intensity can be increased. FIG. 20C is a drawing showing a data optical signal inputted to the transmission optical fiber which is expressed by an electrical field amplitude. When the data is 0, the amplitude is almost 0 and when the data is 1, the phase is not changed suddenly. FIG. 20D shows the electrical field amplitude of a data optical signal outputted from the optical fiber. The phase is modulated in the optical fiber in correspondence with the intensity change shown in FIG. 20B. At the position of each underlined "1" among data of "1" in the drawing, the phase is modulated. The phase change in the drawing is about 180°. As a result, the signal spectrum of the data optical signal is spread and an occurrence of SBS is suppressed. Therefore, by using equipment with this structure, the power of a data optical signal which can be inputted to the transmission optical fiber can be increased. As mentioned above, as the variation of the light intensity shown in FIG. 20B increases, the phase modulation of the data optical signal increases. Although the necessary variation depends on the spectrum and intensity of the data optical signal and characteristics of the optical fiber, a variation of at least about 10 milliwatts is necessary as a guideline. The wavelength of pumping light may be set to, for example, about 1.48 μm.

Figure 21:
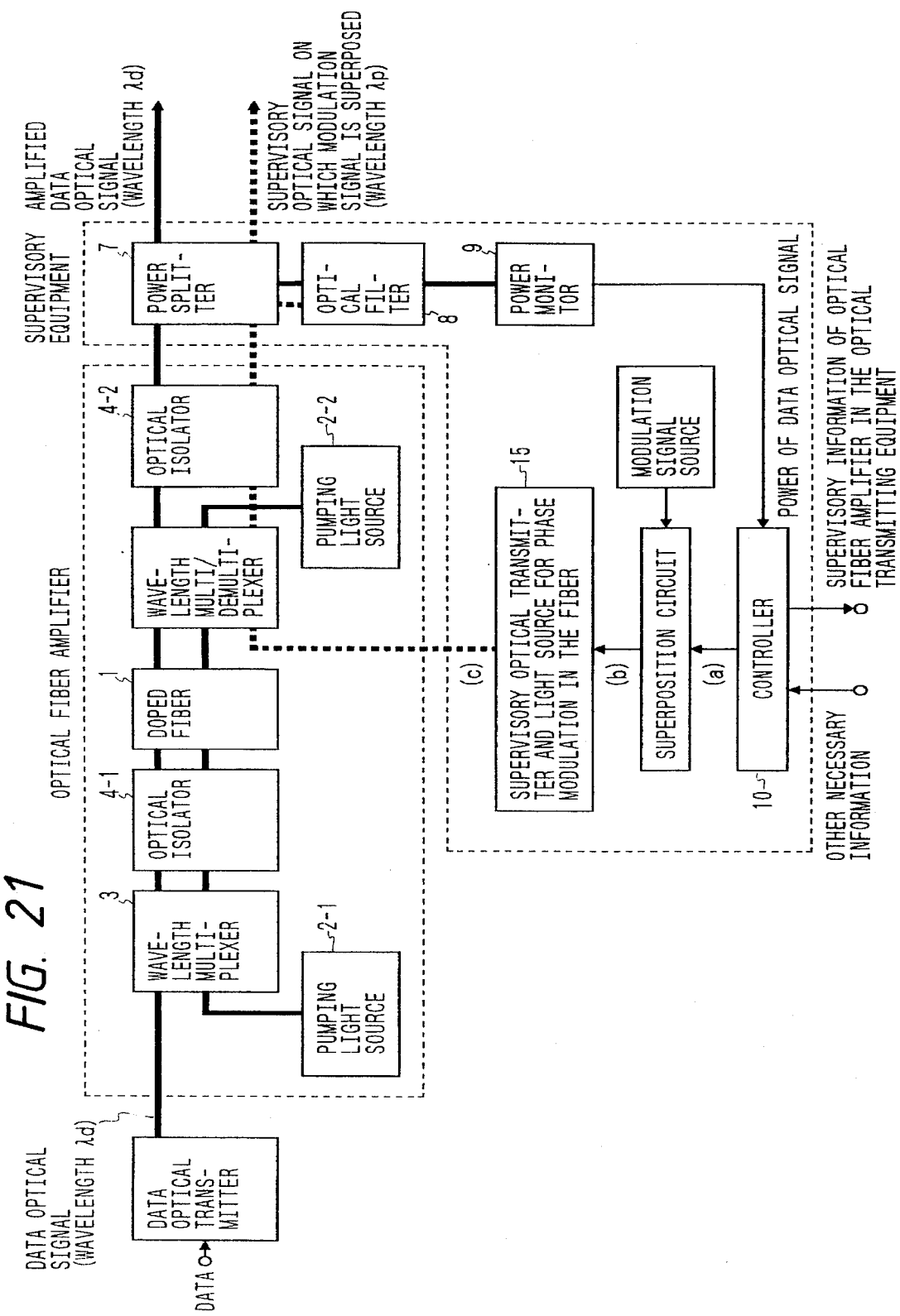
FIG. 21 is a drawing showing an embodiment of optical transmitting equipment having the SBS suppression function.
Figure 22A:
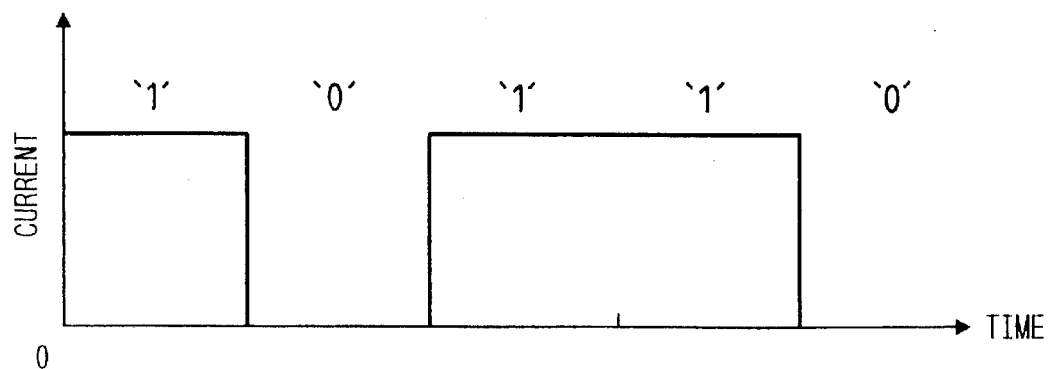
FIG. 22 is a drawing showing the signal waveform at each unit shown in FIG. 21.
Figure 22B:
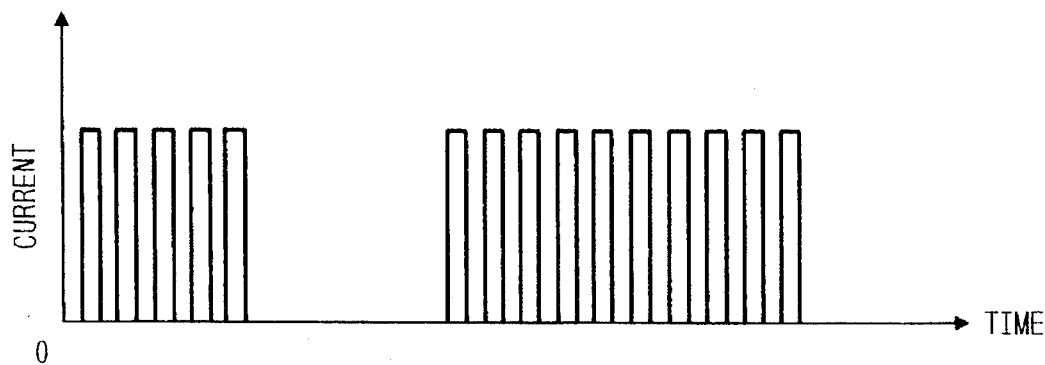
Figure 22C:
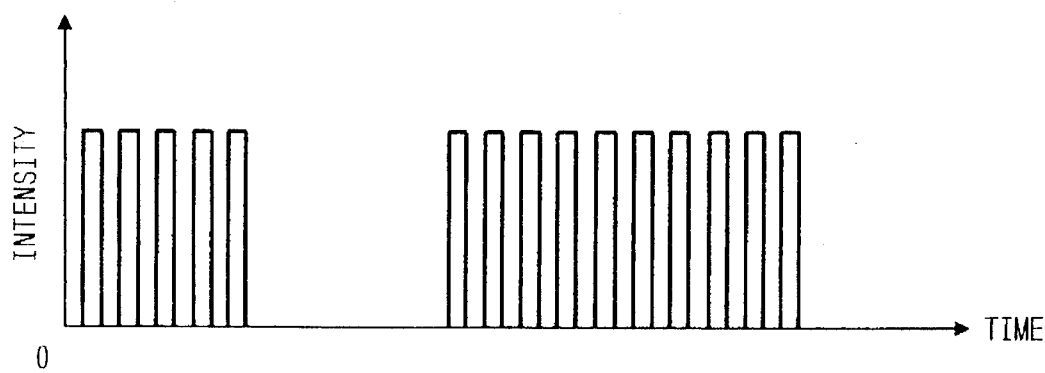

FIG. 21 shows an embodiment when the above SBS suppression function is added to the optical transmitting equipment shown in FIG. 5. According to this embodiment, the supervisory optical transmitter shown in FIG. 5 is used also as a light source for phase modulation in the fiber for SBS suppression and optical transmitting equipment with a simple structure having both the effect on supervision shown in FIG. 5 and the effect on SBS suppression shown in FIG. 19 is realized. The difference in structure from the transmitting equipment shown in FIG. 5 is that a modulation signal source and a circuit for superposing a modulation signal from the above signal source on a supervisory electric signal are added. Furthermore, the supervisory optical transmitter serves as a light source for phase modulation in the field and numeral 15 in this embodiment indicates it. FIG. 22 shows a signal waveform example of each unit. FIG. 22A shows a supervisory electric signal outputted from the controller, which is a low-speed digital signal (it may be an analog signal). FIG. 22B shows a supervisory electric signal on which a modulation signal from the modulation signal source is superposed. It is necessary to set the frequency of a modulation signal for superposing to a sufficiently high value compared with the transmission speed of the supervisory electric signal and the band of the supervisory optical receiver. FIG. 22C shows a supervisory optical signal outputted from the supervisory optical transmitter 15 and the modulation signal is superposed on it. Since the light intensity is changed by the superposed modulation signal, the data optical signal can be modulated in phase and the SBS can be suppressed. Furthermore, the band of the supervisory optical receiver of the optical post-repeater (or optical receiving equipment) does not depend on the frequency of the modulation signal, so that the supervisory optical receiver can extract and receive only low-speed supervisory information from the supervisory optical signal. Therefore, according to this embodiment, optical transmitting equipment with a simple structure having both the effect on supervision shown in FIG. 5 and the effect on SBS suppression shown in FIG. 19 can be realized.

Figure 23:
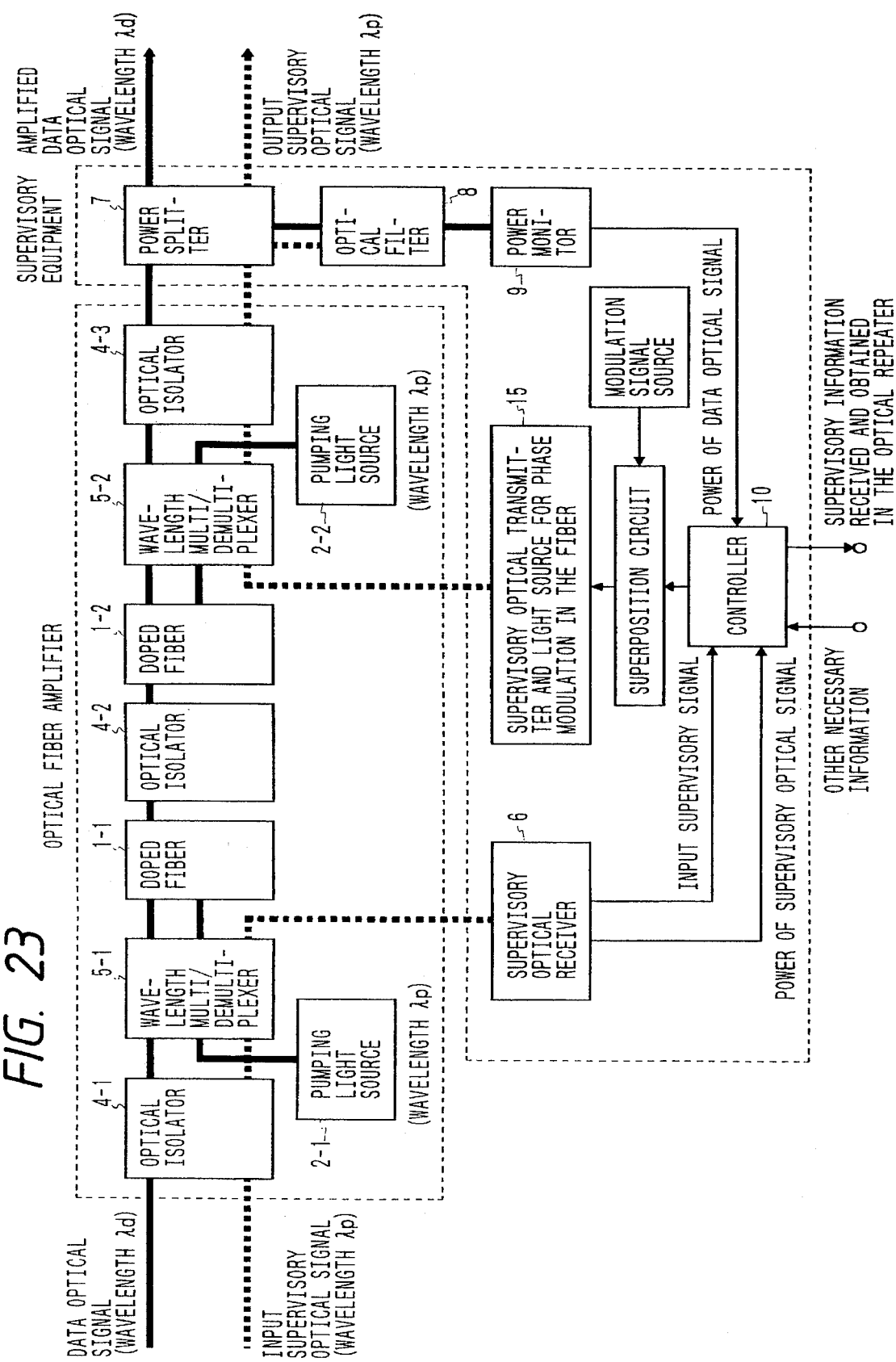
FIG. 23 is a drawing showing an embodiment of an optical repeater having the SBS suppression function.

FIG. 23 shows an embodiment when the above SBS suppression function is added to the optical repeater shown in FIG. 1. According to this embodiment, the supervisory optical transmitter shown in FIG. 1 is used also as a light source for phase modulation in the fiber for SBS suppression and optical transmitting equipment with a simple structure having both the effect on supervision shown in FIG. 1 and the effect on SBS suppression shown in FIG. 19 is realized. The difference in structure from the transmitting equipment shown in FIG. 1 is that a modulation signal source and a circuit for superposing a modulation signal from the above signal source on a supervisory electric signal are added. Furthermore, the supervisory optical transmitter serves as a light source for phase modulation in the field and also numeral 15 in this embodiment indicates it. In the same way as with FIG. 21, a modulation signal from the modulation signal source is superposed on the supervisory electric signal and as a result, the modulation signal is superposed also on an output supervisory optical signal from the supervisory optical transmitter 15. The SBS can be suppressed on the principle used in FIG. 21. Furthermore, the band of the supervisory optical receiver of the optical post-repeater (or optical receiving equipment) does not depend on the frequency of the modulation signal, so that the supervisory optical receiver can extract and receive only low-speed supervisory information from the supervisory optical signal. Therefore, according to this embodiment, an optical repeater with a simple structure having both the effect on supervision shown in FIG. 1 and the effect on SBS suppression shown in FIG. 19 can realized.

When the equipment shown in FIG. 21 or 23 is applied to the system shown in FIG. 7, an occurrence of SBS can be suppressed, so that the input power of a data optical signal to the optical fiber can be increased and as a result, the transmission distance can be lengthened.

Therefore, according to the present invention, supervision and supervisory information transmission of optical transmitting equipment, an optical repeater, optical receiving equipment, and an optical transmission line for connecting them can be realized unless the output power of each optical fiber amplifier is reduced.

Figure 24:
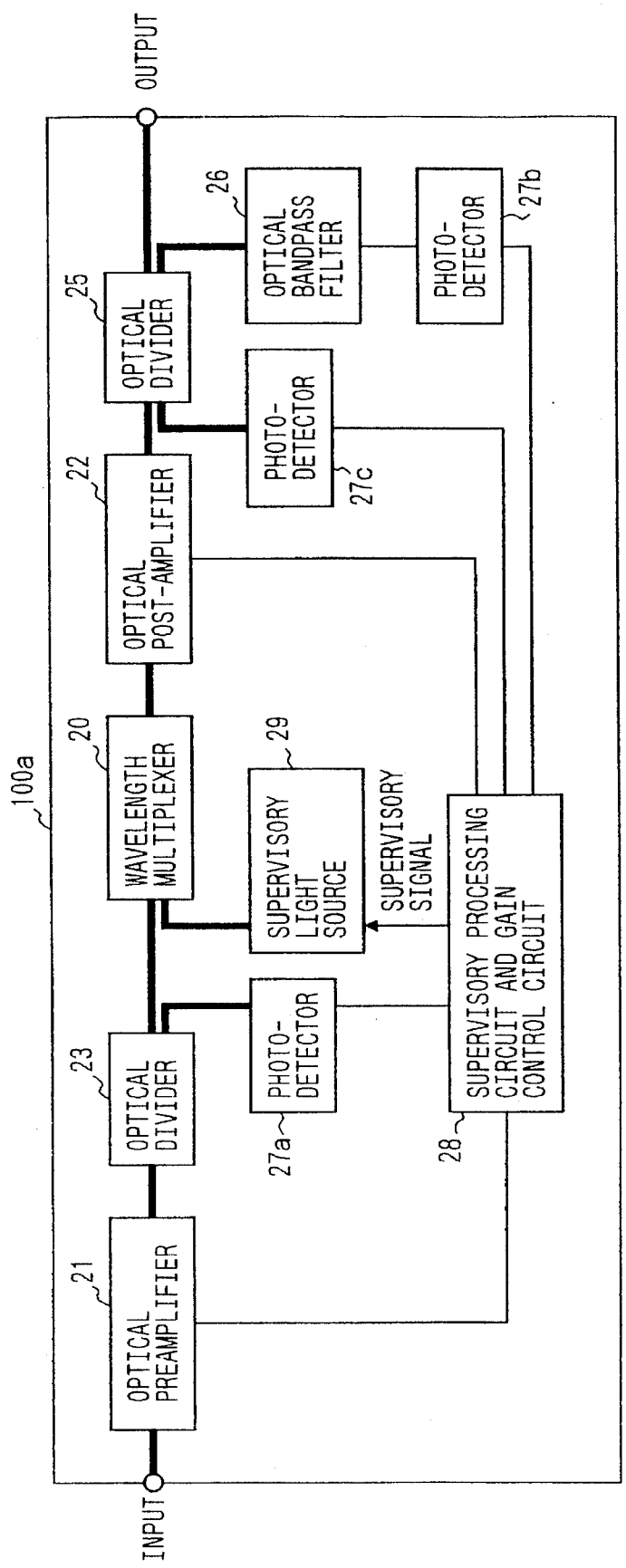
FIG. 24 is a block diagram of an embodiment of an optical repeater.
Figure 25A:
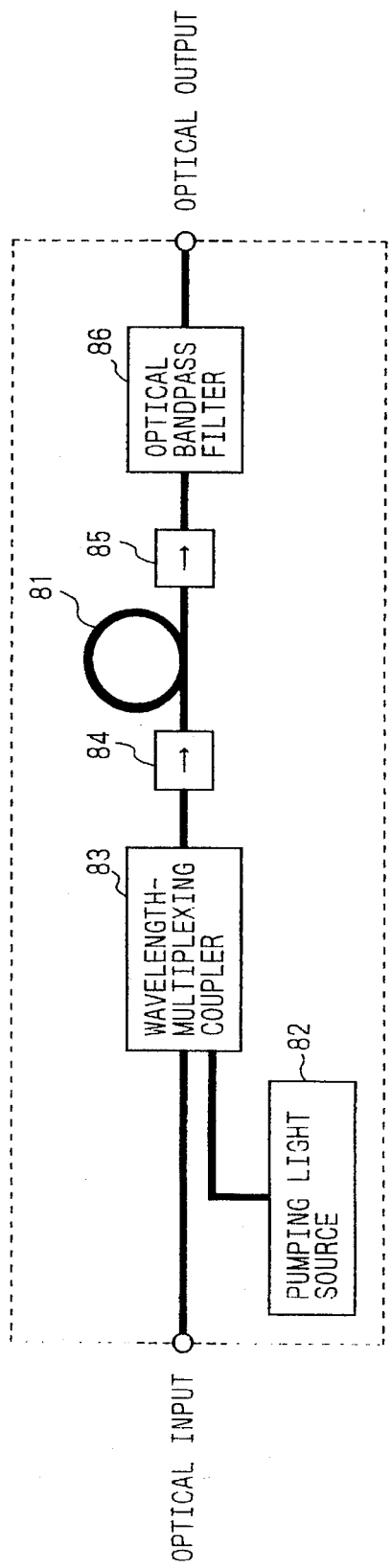
FIG. 25 shows structure examples of an optical fiber amplifier.
Figure 25B:
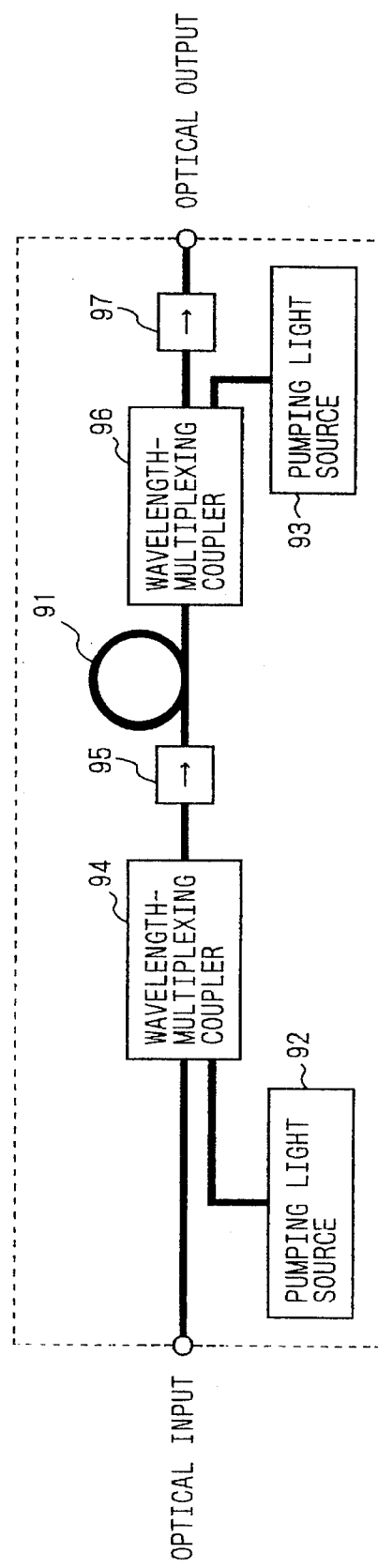

FIG. 24 is a block diagram of another embodiment of the optical repeater of the present invention. An optical repeater 100a is divided into two parts, an optical preamplifier 21 and optical post-amplifier 22. Structure examples of the optical amplifiers 21 and 22 are optical fiber amplifiers shown in FIGS. 25A and 25B. The optical amplifiers of this embodiment are rare-earth element doped optical fiber amplifiers. However, another optical amplifier, for example, a semiconductor optical amplifier may be used. The optical preamplifier has, as shown in FIG. 25A, a rare-earth element doped fiber 81, pumping light source 82, wavelength-multiplexing coupler 83, optical isolators 84 and 85, and optical bandpass filter 86. The optical post-amplifier has, as shown in FIG. 25B, a rare-earth element doped fiber 91, pumping light sources 92 and 93, wavelength-multiplexing couplers 94 and 96, and optical isolators 95 and 97. In FIG. 24, the optical preamplifier 21 is pumped by fixed sufficient pumping light so as to maintain the low noise characteristic. In the optical postamplifier 22, to stabilize the optical output power, the pumping light power of the optical post-amplifier 22 is controlled so as to stabilize a part of the light output by a photodetector 27b via an optical divider 25 and optical bandpass filter 26 (used to suppress the spontaneous emission light component). A photodetector 27c monitors reflected light by Fresnel reflection from the output light connector and detects optical output connector open. An optical signal passes through the optical preamplifier 21 and then is amplified more by the optical post-amplifier 22 and outputted. The optical signal output of the optical preamplifier 21 is partially divided by an optical divider 23. By detecting this divided optical signal by a photodetector 27a, loss of signal to the optical postamplifier 22 can be detected. As mentioned above, the optical post-amplifier 22 controls the gain so as to keep the optical output constant, so that this detection of loss of signal prevents the pumping light of the optical postamplifier 22 from becoming excessive and the gain control from runaway. The noise figure of the optical repeater increases by the loss of the input part. However, according to the method of this embodiment, there is no need to install an optical divider in the input part of the optical repeater, so that the noise figure of the optical repeater is not increased by the loss of the optical divider.

Since both optical outputs of the optical preamplifier 21 and optical post-amplifier 22 are monitored, the output status of each optical amplifier can be monitored. The gain of the optical preamplifier 21 can be obtained by the pumping light power of the optical preamplifier 21 and optical signal output thereof and also the input optical signal level of the optical preamplifier 21 can be monitored. The gain of the optical post-amplifier 22 can be obtained from the difference in optical signal output between the optical pose-amplifier 22 and optical preamplifier 21.

Therefore, the gain status of each optical amplifier can be monitored individually. A supervisory optical signal with a wavelength which is different from that of a signal is transmitted from a supervisory light source 29 within the the amplification wavelength band of the optical amplifier and multiplexed with the signal in wavelength by a wavelength multiplexer 20 mounted between the optical preamplifier 21 and optical post-amplifier 22. In this case, no wavelength multiplexer is installed in the output part and input part of the optical repeater 100a, so that a reduction in the optical output and an increase in the noise figure due to a loss of the wavelength multiplexer are not generated. The above supervisory optical signal is amplified by the optical preamplifier 22, so that the optical output power of the supervisory light source 29 may be smaller by the gain of the optical post-amplifier 22. In this case, the optical signal which is multiplexed in wavelength by the wavelength multiplexer 20 is a supervisory optical signal. However, other optional information may be transmitted.

In all the embodiments following this embodiment, the structure that the optical dividing function and wavelength multiplexing function are provided at the middle position of the optical amplifiers or at a position other than the input and output parts is shown. However, even when only one of the functions is provided, the noise figure of the optical repeater is not increased and the optical output power is not reduced.

Figure 26:
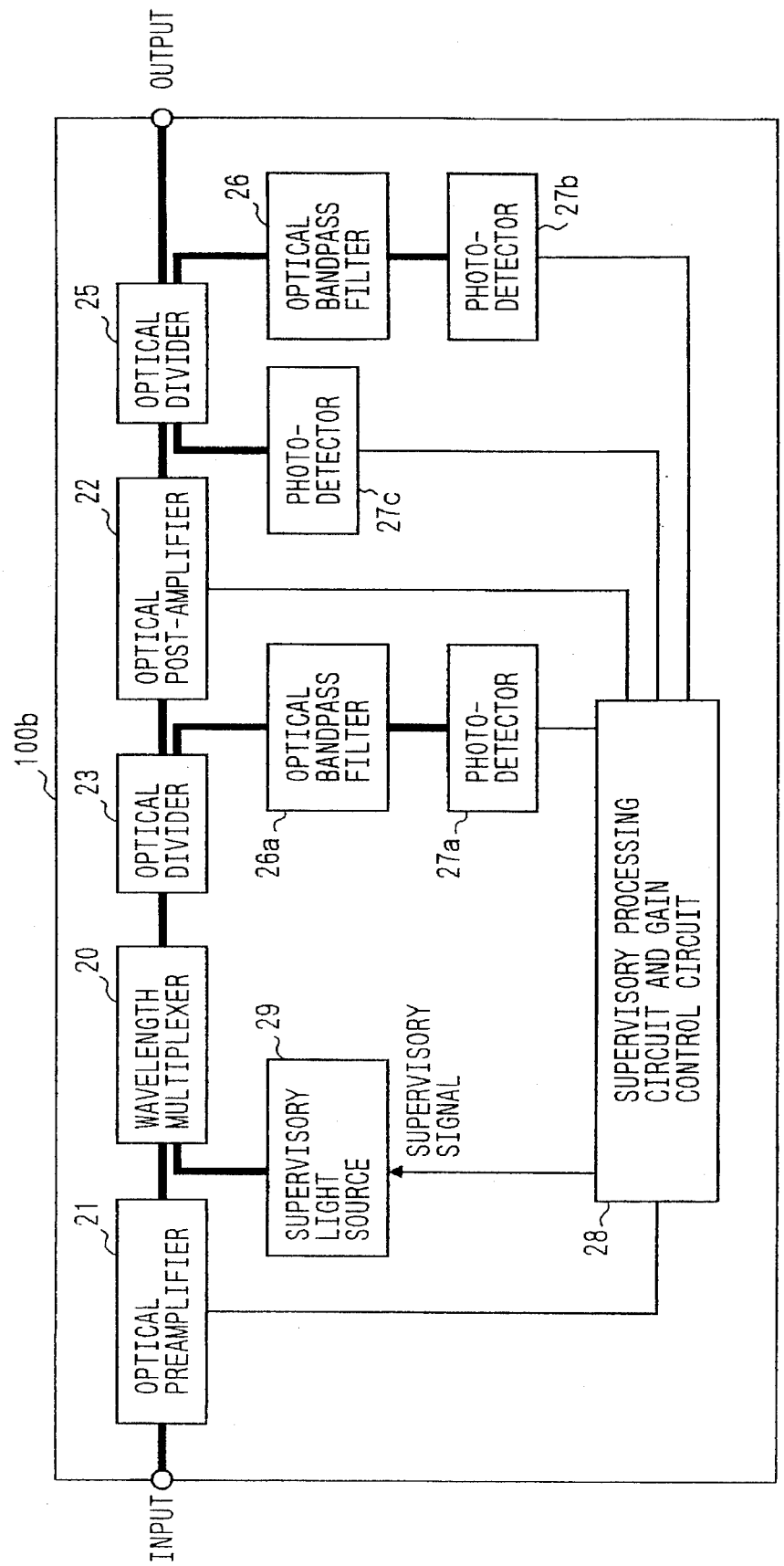
FIG. 26 is a block diagram of another embodiment of the optical repeater.

FIG. 26 is a block diagram of another embodiment of the optical repeater of the present invention. An optical repeater 100b is divided into two parts in the same way as with the aforementioned embodiment; that is, it has an optical preamplifier 21, optical post-amplifier 22, and optical parts. A supervisory optical signal with a wavelength which is different from that of a signal is transmitted from a supervisory light source 29 within the the amplification wavelength band of the optical amplifier and multiplexed with the signal in wavelength by a wavelength multiplexer 20 mounted between the optical preamplifier 21 and optical post-amplifier 22. In this case, no wavelength multiplexer is installed in the output part and input part of the optical repeater 100a, so that a reduction in the optical output and an increase in the noise figure due to a loss of the wavelength multiplexer are not generated. The above supervisory optical signal is amplified by the optical preamplifier 22, so that the optical output power of the supervisory light source 29 may be smaller by the gain of the optical post-amplifier 22.

The optical signal output of the optical preamplifier 21 is partially divided by an optical divider 23. By detecting this divided optical signal by a photodetector 27a via an optical bandpass filter 26a, loss of signal to the optical post-amplifier 22 can be detected. The optical bandpass filter 26a is installed so as to remove a supervisory optical signal transmitted from the supervisory light source 29. As mentioned above, the optical post-amplifier 22 controls the gain so as to keep the optical output constant, so that this detection of loss of signal prevents the pumping light of the optical post-amplifier 22 from becoming excessive and the gain control from runaway. According to the method of this embodiment, there is no need to install an optical divider in the input part of the optical repeater, so that the noise figure of the optical repeater is not increased by the loss of the optical divider. Since both optical outputs of the optical preamplifier 21 and optical post-amplifier 22 are monitored, the output status of each optical amplifier can be monitored. The gain of the optical preamplifier 21 can be obtained by the pumping light power of the optical preamplifier 21 and optical signal output thereof and also the input optical signal level of the optical preamplifier 21 can be monitored. The gain of the optical post-amplifier 22 can be obtained from the difference in optical signal output between the optical pose-amplifier 22 and optical preamplifier 21. Therefore, the gain status of each optical amplifier can be monitored individually.

Figure 27:
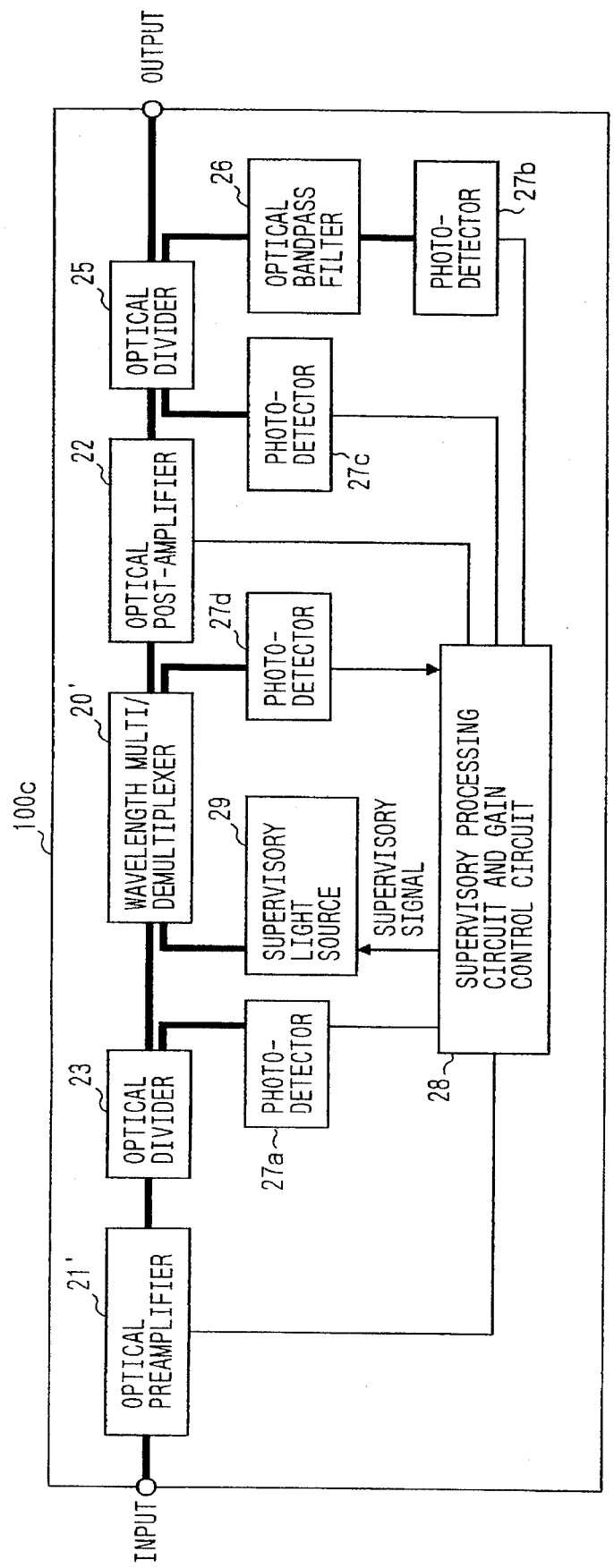
FIG. 27 is a block diagram of another embodiment of the optical repeater.

FIG. 27 is a block diagram of another embodiment of the optical repeater of the present invention. An optical repeater 100c is divided into two parts in the same way as with the aforementioned embodiment; that is, it has an optical preamplifier 21, optical post-amplifier 22, and optical parts. The optical signal output of the optical preamplifier 21 is partially divided by an optical divider 23. By detecting this divided optical signal by a photodetector 27a, loss of signal to the optical postamplifier 22 can be detected. As mentioned above, the optical post-amplifier 22 controls the gain so as to keep the optical output constant, so that this detection of loss of signal prevents the pumping light of the optical postamplifier 22 from becoming excessive and the gain control from runaway. According to the method of this embodiment, there is no need to install an optical divider in the input part of the optical repeater, so that the noise figure of the optical repeater is not increased by the loss of the optical divider. Since both optical outputs of the optical preamplifier 21 and optical post-amplifier 22 are monitored, the output status of each optical amplifier can be monitored. The gain of the optical preamplifier 21 can be obtained by the pumping light power of the optical preamplifier 21 and optical signal output thereof and also the input optical signal level of the optical preamplifier 21 can be monitored. The gain of the optical post-amplifier 22 can be obtained from the difference in optical signal output between the optical pose-amplifier 22 and optical preamplifier 21. Therefore, the gain status of each optical amplifier can be monitored individually.

A supervisory optical signal with a wavelength which is different from that of a signal is transmitted to the above optical repeater 100c from the optical preamplifier or optical transmitter within the amplification wavelength band of the optical amplifier and received by a photodetector 27d via the optical preamplifier 21, optical divider 23, and wavelength multi- and demultiplexer 20'. The above wavelength multi- and demultiplexer 20' is used so as to multiplex or demultiplex the supervisory optical signal with or from the optical signal in wavelength. The received signal is inputted to the supervisory processing circuit and gain control circuit 28 by the photodetector 27d, and the supervisory information creates a new supervisory information signal together with the supervisory information of the above optical repeater 100c, and the supervisory light source 29 is modulated using this new information. A supervisory optical signal with a wavelength which is different from that of a signal is transmitted from a supervisory light source 29 within the the amplification wavelength band of the optical amplifier and multiplexed with the signal in wavelength by a wavelength multi- and demultiplexer 20' mounted between the optical preamplifier 21 and optical post-amplifier 22. In this case, no wavelength multiplexer is installed in the output part and input part of the optical repeater 100a, so that a reduction in the optical output and an increase in the noise figure due to a loss of the wavelength multiplexer are not generated. The above supervisory optical signal is amplified by the optical preamplifier 22, so that the optical output power of the supervisory light source 29 may be smaller by the gain of the optical post-amplifier 22.

Figure 28:
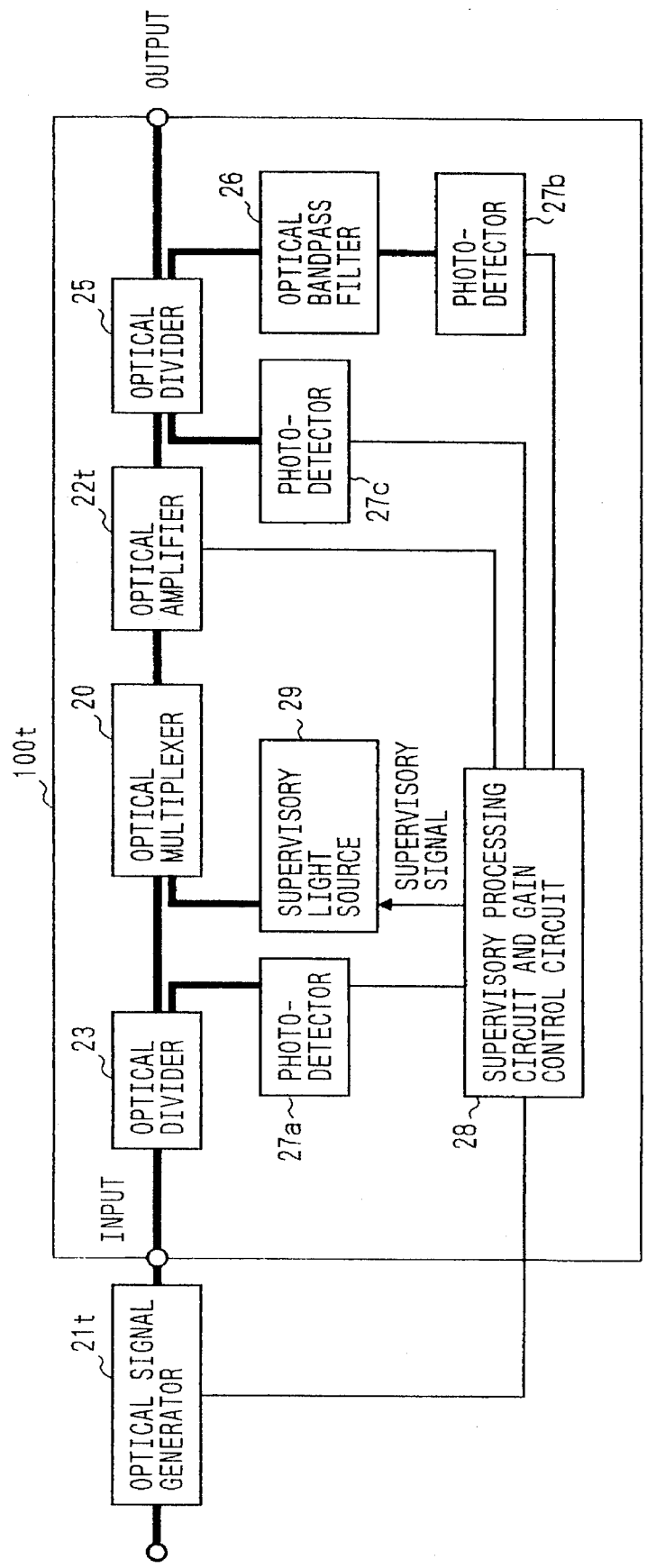
FIG. 28 is a block diagram of another embodiment of the optical repeater.

FIG. 28 is a block diagram of another embodiment of the optical transmitter using an optical amplifier of the present invention. The optical transmitter has an optical signal generator 21t and optical amplifier for transmitter 100t. In an optical amplifier 22t, to stabilize the optical output power, the pumping light power of the optical amplifier 22t is controlled so as to stabilize a part of the light output by a photodetector 27b via an optical divider 25 and optical bandpass filter 26. A photodetector 27c monitors reflected light by Fresnel reflection from the output light connector and detects optical output connector open. The optical signal output of the optical signal generator 21t is partially divided by an optical divider 23. By detecting this divided optical signal by a photodetector 27a, loss of signal to the optical amplifier 22t can be detected. The optical amplifier 22t controls the gain so as to keep the optical output constant, so that this detection of loss of signal prevents the pumping light of the optical amplifier 22t from becoming excessive and the gain control from runaway. Since both optical outputs of the optical signal generator 21t and optical amplifier 22t are monitored, the optical output status can be monitored individually.

A supervisory optical signal with a wavelength which is different from that of a signal is transmitted from a supervisory light source 29 within the the amplification wavelength band of the above optical amplifier 22t and multiplexed with the signal in wavelength by a wavelength multiplexer 20 mounted between the optical signal generator 21t and optical amplifier 22t. In this case, no wavelength multiplexer is installed in the output part of the optical amplifier for transmitter 100t, so that a reduction in the optical output due to a loss of the wavelength multiplexer is not generated. The above supervisory optical signal is amplified by the optical amplifier 22t, so that the optical output power of the supervisory light source 29 may be smaller by the gain of the optical amplifier 22t.

Figure 29:
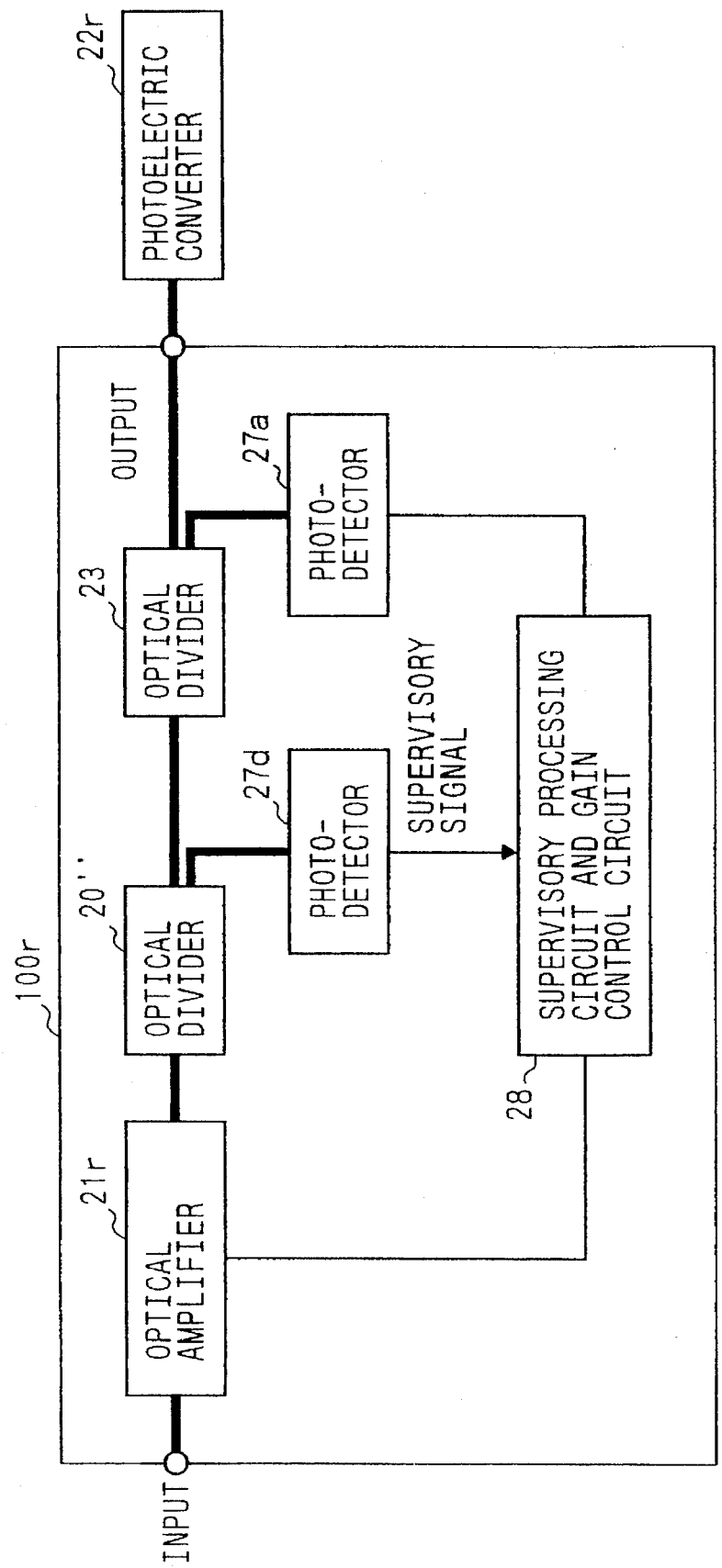
FIG. 29 is a block diagram of another embodiment of the optical repeater.

FIG. 29 is a block diagram of another embodiment of the optical receiver using an optical amplifier of the present invention. The optical receiver has an optical amplifier for receiver 100r and photoelectric converter 22r. A supervisory optical signal with a wavelength which is different from that of a signal is transmitted to the above optical amplifier for receiver 100r from the optical amplifier mounted on the optical transmission line within the amplification wavelength band of the optical amplifier 21r and received by a photodetector 27d via the optical amplifier 21r and wavelength demultiplexer 20". The above wavelength demultiplexer 20" is used so as to demultiplex the supervisory optical signal from the optical signal in wavelength. The received signal is inputted to the supervisory processing circuit and gain control circuit 28 by the photodetector 27d. In this case, no wavelength demultiplexer is installed in the input part of the optical amplifier for receiver 100r, so that an increase in the noise figure due to a loss of the wavelength demultiplexer is not generated. The above supervisory optical signal is amplified by the optical amplifier 21r, so that the supervisory optical signal receiving sensitivity by the photodetector 27d is improved.

The optical signal output of the optical amplifier 21r is partially divided by an optical divider 23. By detecting this divided optical signal by a photodetector 27a, the gain of the optical amplifier 21r can be controlled.

Figure 30:
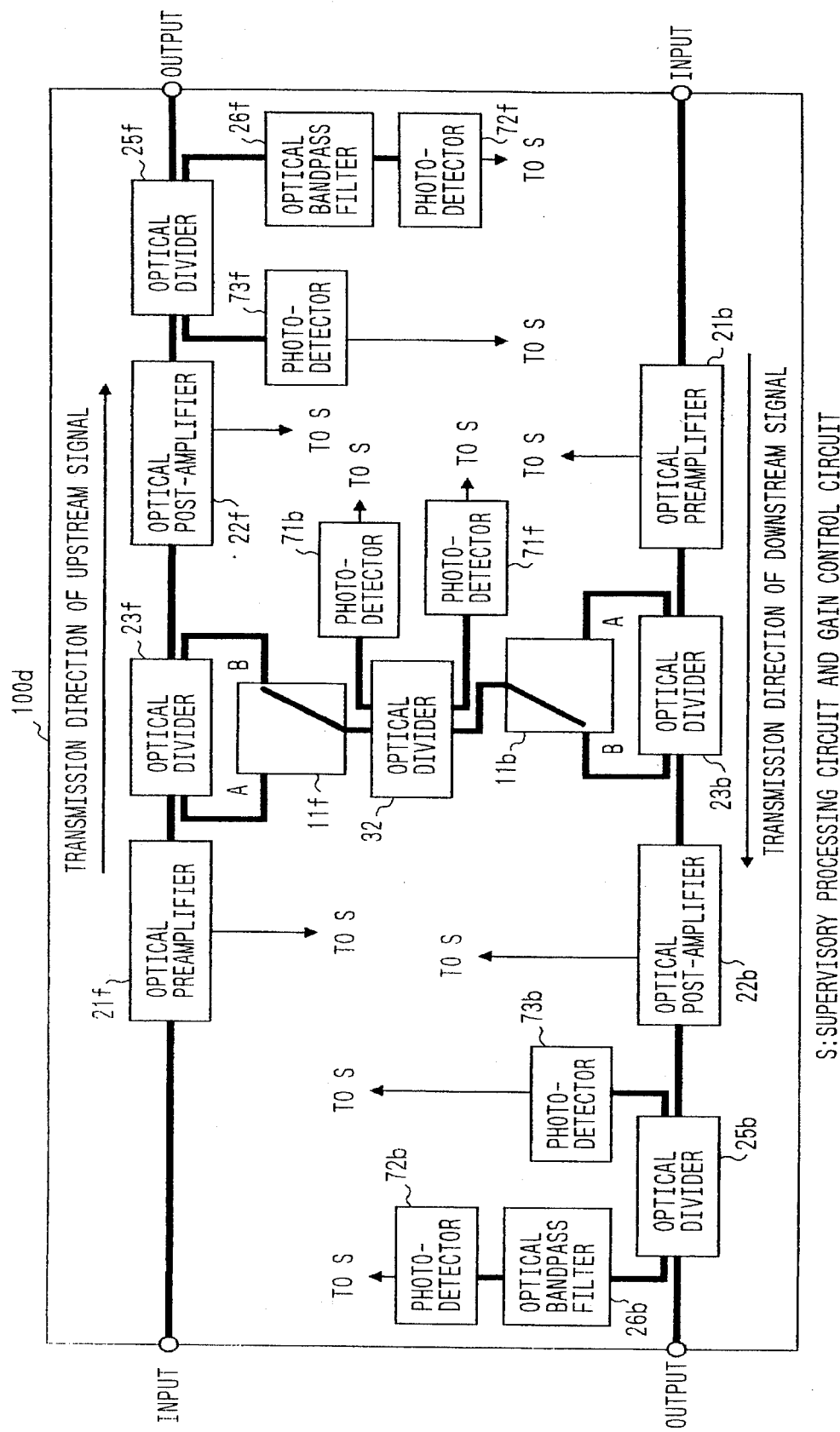
FIG. 30 is a block diagram of another embodiment of the optical repeater.

FIG. 30 is a block diagram of another embodiment of the optical repeater of the present invention. An optical repeater 100d has a pair of optical repeaters wherein the optical signal transmission directions are different from each other. Each optical repeater is divided into two parts; that is, it has an optical preamplifier 21f and optical post-amplifier 22f or optical preamplifier 21b and optical post-amplifier 22b. The optical signal output of the optical preamplifier 21f or 21b is partially divided by an optical divider 23f or 23b. Optical switches 11f and 11b are generally connected to the B side. By detecting this divided optical signal by photodetectors 71f and 71b, loss of signal to the optical post-amplifiers 22f and 22b can be detected. Outputs of the photodetectors 71f and 71b are connected to the supervisory processing circuit and gain control circuit (hereinafter abbreviated to S). As mentioned above, the optical post-amplifiers 22f and 22b control the gain so as to keep the optical output constant, so that this detection of loss of signal prevents the pumping light of the optical post-amplifiers 22f and 22b from becoming excessive and the gain control from runaway. The noise figure of the optical repeater increases by the loss of the input part. However, according to the method of this embodiment, there is no need to install an optical divider in the input part of the optical repeater, so that the noise figure of the optical repeater is not increased by the loss of the optical divider.

To loop back the optical signal in the reverse transmission direction (from top to bottom in this case), the optical switch 11f is connected to the B side and the optical switch 11b is connected to the A side. A part of an upstream signal is transmitted to the downstream output side via the optical divider 23f, optical switch 11f, optical divider 32, optical switch 11b, optical divider 23b, optical postamplifier 22b, and optical divider 25b. In this case, the optical preamplifier 21b in the downstream direction is interrupted, so that the above upstream signal does not interfere with an optical signal to be looped back. The same may be said with a case that the signal is looped back from the downstream direction to the upstream direction in FIG. 30. In this case, the optical switch 11f is connected to the A side and the optical switch 11b is connected to the B side. According to this embodiment, no optical divider for signal loopback is installed in the output and input parts of the optical repeater 100d, so that a reduction in the optical output and an increase in the noise figure due to a loss of the optical divider are not generated.

Figure 31:
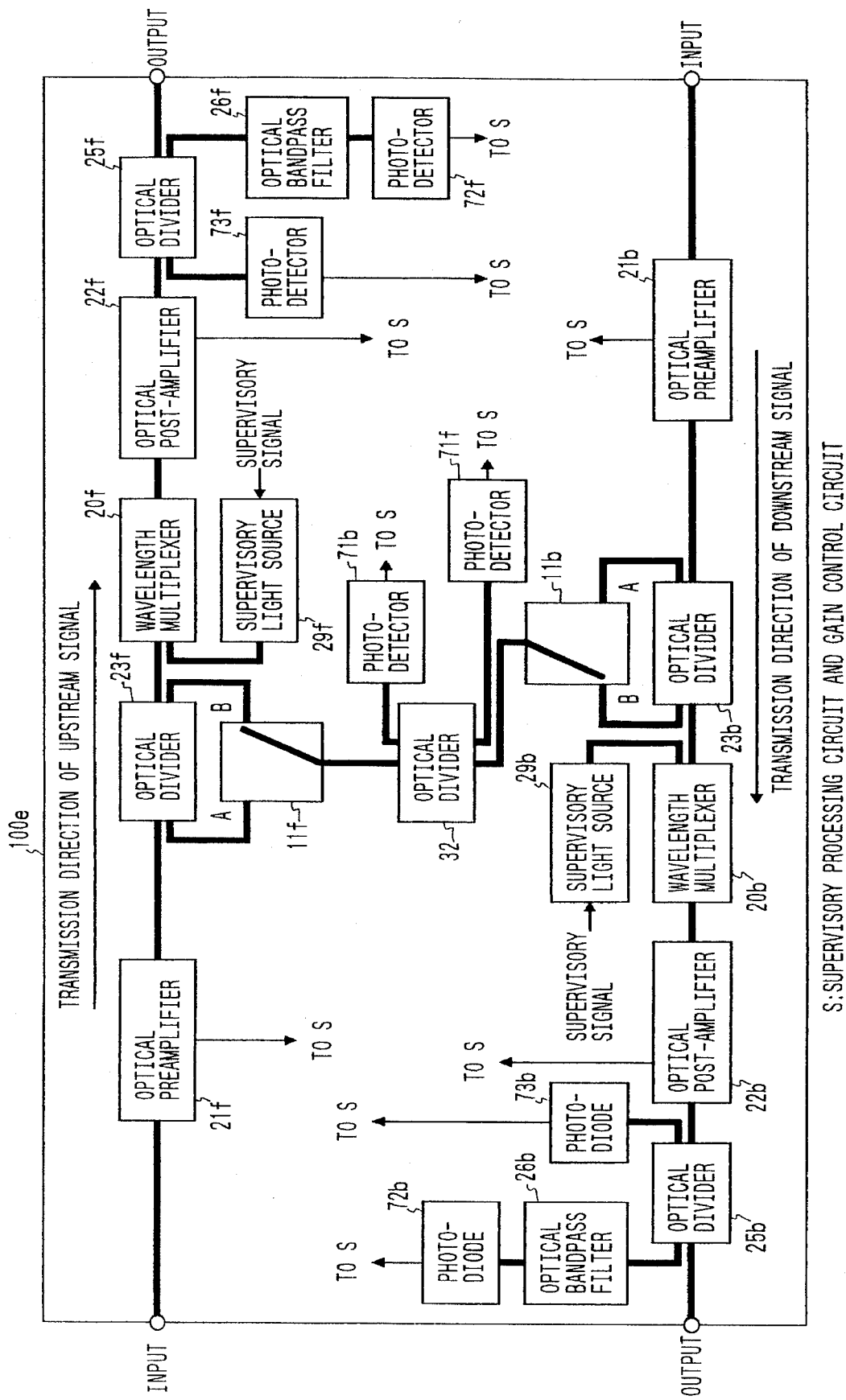
FIG. 31 is a block diagram of another embodiment of the optical repeater.

FIG. 31 is a block diagram of another embodiment of the optical repeater of the present invention. The basic structure is the same as the structure of the embodiment shown in FIG. 30 and an optical amplifier 100e is added with a wavelength multiplexers 20f and 20b and supervisory light sources 29f and 29b. Therefore, in the same way as with the embodiment shown in FIG. 24, by signals having supervisory information of the operation status of the above optical repeater 100e and of the optical signal input and output status, the above supervisory light sources 29f and 29b are modulated and the signals are outputted to the upstream and downstream optical transmission lines via the wavelength multiplexers 20f and 20b, optical post-amplifiers 22f and 22b, and optical dividers 25f and 25b. According to this embodiment, an optical divider for detecting loss of signal of the optical post-amplifier, a wavelength multiplexer for multiplexing a supervisory information optical signal in wavelength, and an optical divider for signal loopback are not installed in both the output and input parts of the optical repeater 100e, so that a reduction in the optical output and an increase in the noise figure due to a loss of each optical divider are not generated.

Figure 32:
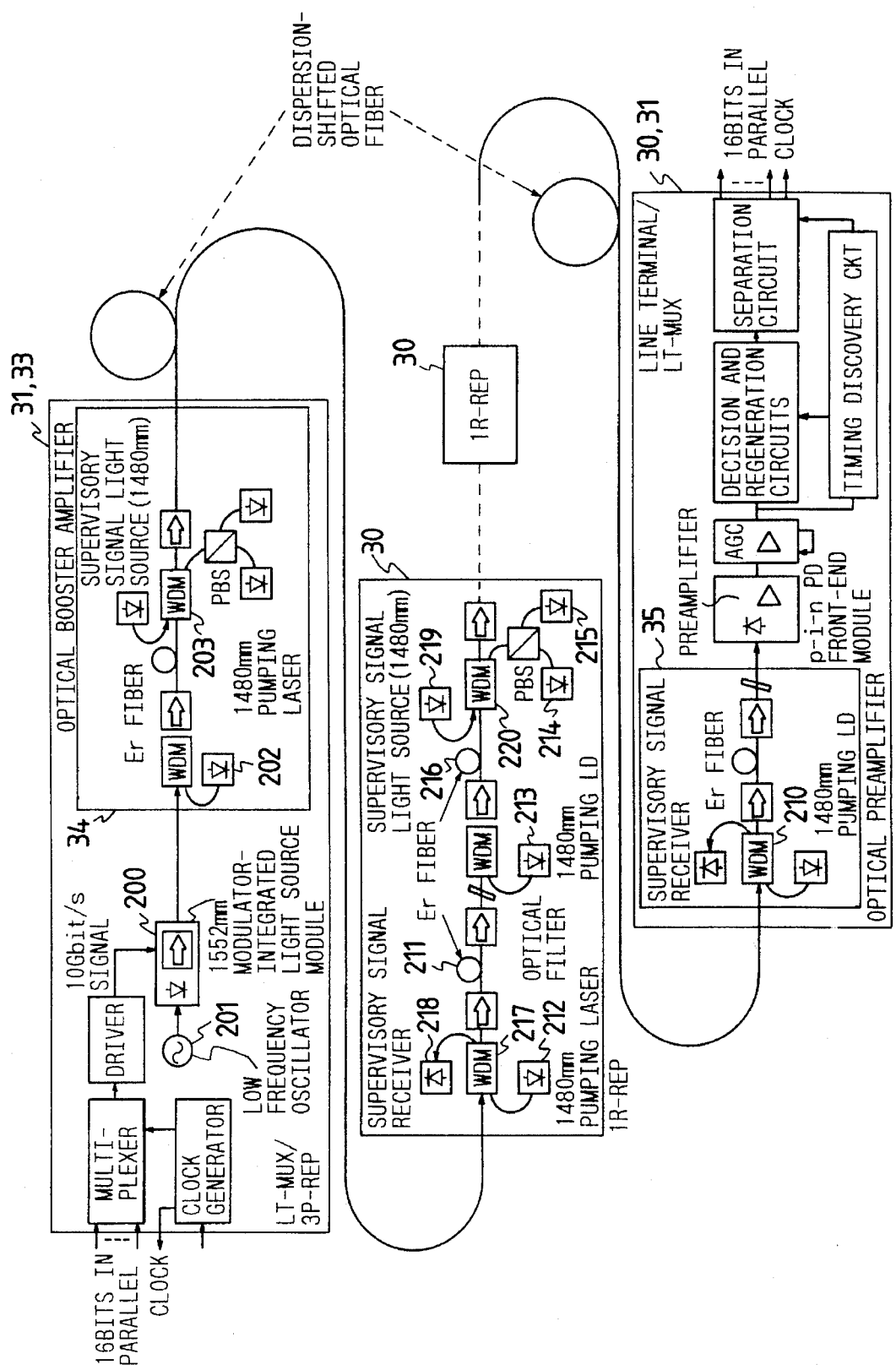
FIG. 32 is a block diagram showing the structure of the optical transmission system of a long distance system.

FIG. 32 shows the structure of an optical transmission system of the aforementioned long distance system. As shown in the drawing, this embodiment uses a modulator integrated light source 200 with a wavelength of 1552 nm and low chirping as a transmitting light source for LT-MUX31 or 3R-REP33. To suppress SBS (stimulated Burillouin Scattering) in the optical fiber, the spectrum spreading method is used and a signal from a lowfrequency generator 201 is applied to the laser unit of the modulator-integrated light source 200 so as to modulate the optical frequency. The two-way pumping method using a pumping light source with a wavelength of 1480 nm is used for an optical booster amplifier 34.

For transmission of a supervisory signal, a supervisory signal light source with a wavelength band of 1480 nm installed in the optical booster is used and the supervisory signal is multiplexed with a signal in wavelength and transmitted in the downstream direction. To prevent the output of the optical booster from decreasing, a wavelength multiplexing WDM (wavelength division multiplex) coupler 203 for a supervisory signal and signal serves as a pumping light WDM coupler.

By using an optical preamplifier with forward pumping 35 using a pumping light source with a band of 1480 nm, highsensitive reception is realized.

On the other hand, for reception of a supervisory signal, an Er (erbium) doped fiber pumping WDM coupler 210 is used so as to demultiplex the supervisory signal and the demultiplexed signal is received by a dedicated receiver. By doing this, the degradation of noise figure can be minimized. For 1R-REP30, two Er doped fibers 211 and 216 are used and a pumping light source with a wavelength band of 1480 nm is used. In the first stage, a pumping light source (212) performs forward pumping and in the subsequent stage, three pumping light sources (213, 214, 215) perform bidirectional pumping. By doing this, low noise figure and high output are realized simultaneously. For reception of a supervisory signal by 1R-REP, a pumping light WDM coupler 217 of the Er doped fiber 211 in the first stage is used and the supervisory signal is demultiplexed and received by a dedicated receiver 218. By doing this, the degradation of noise figure can be minimized (at most 0.2 dB) and reception of the supervisory signal is realized.

For transmission of a supervisory signal by 1R-REP30, a supervisory signal light source 219 with a wavelength band of 1480 nm is used and the supervisory signal is multiplexed with a signal in wavelength and transmitted in the downstream direction. To multiplex the supervisory signal and signal, a pumping WDM coupler 220 of the Er doped fiber 216 in the second stage is used to prevent output reduction. By demultiplexing a supervisory and control signal at the inlet and outlet of 1R-REP30 like this, when an input signal shutdown occurs or a fault occurs on the internal transmission line of 1R-REP30, the information can be transmitted in the downstream direction using a fiber cable between offices connected to the equipment.

Figure 33:
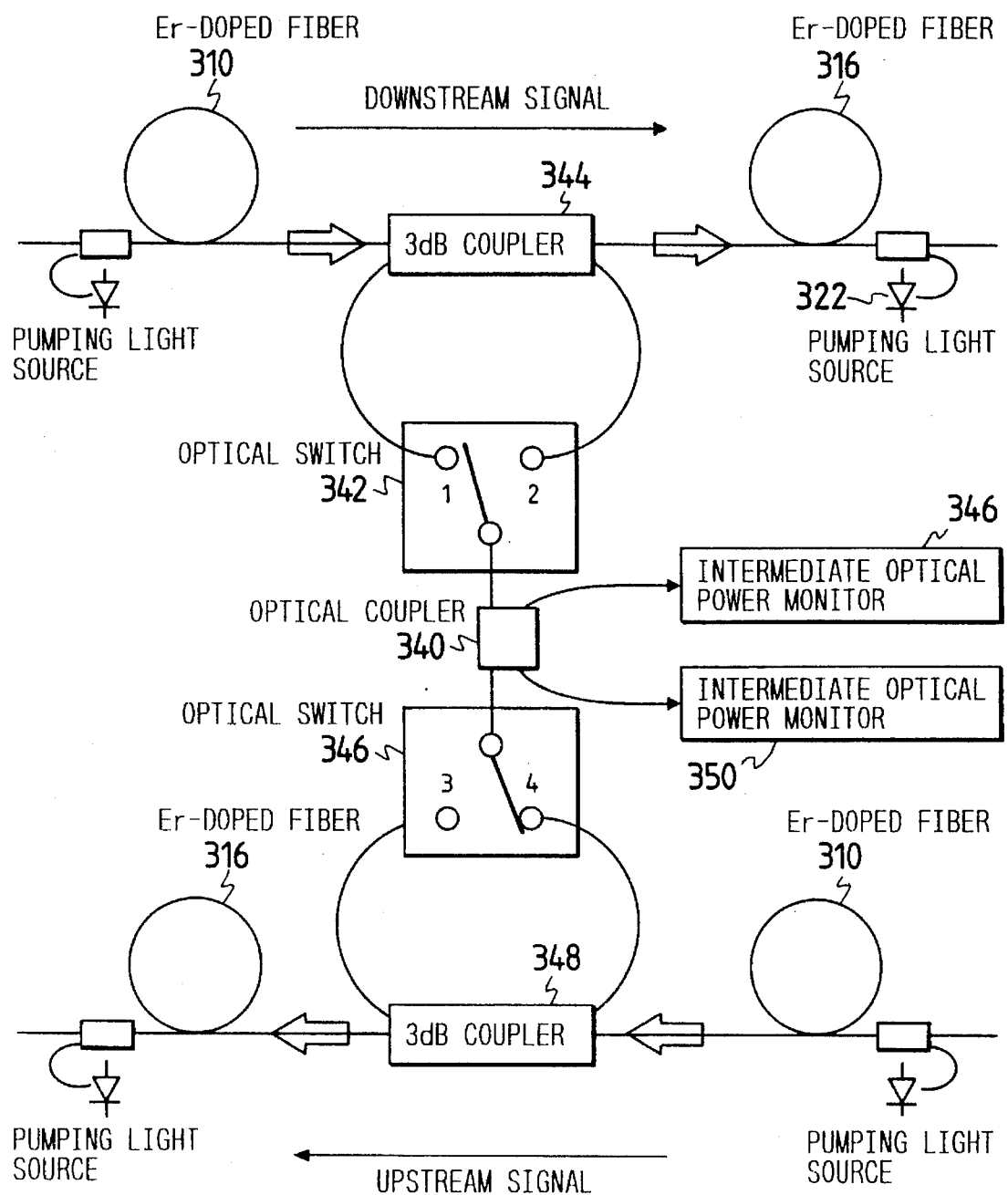
FIG. 33 is an illustration showing an example of the loopback method used in the present invention.

Next, the optical loopback method will be explained with reference to FIG. 33. The drawing shows only the part of the structure of the repeater which is necessary for loopback.

The procedure for looping back a downstream signal is as follows:

(1) The pumping light source output of the Er doped fiber 310 in the desired submarine optical repeater is dropped by remote control from the submarine optical terminating transmission equipment using the supervisory signal system.

(2) The optical switch 342 of the above submarine optical repeater is changed to the 2 position and the optical switch 346 is changed to the 4 position by remote control from the submarine optical terminating transmission equipment using the supervisory signal system.

(3) By this operation, the downstream signal passes through the 3-dB coupler 344 inserted in the downstream signal system, optical switch 342, optical switch 346, and 3-dB coupler 348 inserted in the upstream signal system and is looped back.

The procedure for looping back a upstream signal is the same as above.

(1) The pumping light source output of the Er doped fiber 310 in the desired submarine optical repeater is dropped from the submarine optical terminating transmission equipment using the supervisory signal system.

(2) The optical switch 342 of the above submarine optical repeater is changed to the 1 position and the optical switch 346 is changed to the 3 position from the submarine optical terminating transmission equipment using the supervisory signal system.

(3) By this operation, the upstream signal passes through the 3-dB coupler 348 inserted in the upstream signal system, optical switch 346, optical switch 342, and 3-dB coupler 344 inserted in the downstream signal system and is looped back.

In the normal service state, the optical switch 342 is set at the 2 position and the optical switch 346 is set at the 6 position.

In this case, the intermediate optical power monitor 350 monitors the output of a downstream signal of the Er doped fiber 310 and the intermediate optical power monitor 346 monitors the output of an upstream signal of the Er doped fiber 310.

The feature of this method is that a loopback signal is fetched from between the two optical amplifiers. By doing this, the following advantages can be obtained.

(1) The noise figure is not degraded compared with the method for fetching a loopback signal from the input side of the optical amplifier.

(2) High output power can be fetched compared with the method for fetching a loopback signal from the output side of the optical amplifier (compared at the same pumping power).

A network using the above optical transmitting equipment, optical repeater, optical receiving equipment, and optical fiber transmission system requires a transmission method of alarms and control signals.

Conventionally, supervision is controlled by using overheads for management provided in a signal. For example, according to the STM-1 (synchronous transfer module level 1, based on CCITT) frame shown in FIG. 40, the B1 byte is used for transmission line error rate supervision, the D1 to D3 bytes are used for data communication channels (DCC), and the E1 byte is used for an order wire. Supervisory and control information is transmitted between the repeaters using these plurality of overheads for management and processed by the repeaters.

According to the aforementioned prior art, an overhead for management is provided in a signal, and the signal is received by a conventional repeater (3R repeater), and the received optical signal is converted to an electric signal, and then the above overhead for management is processed so as to realize remote supervision and control. However, the optical repeater (1R repeater) directly amplifies a received optical signal instead of converting it to an electric signal, so that the optical repeater cannot process the above overhead for management. Therefore, it is difficult to realize the management functions (for example, the AIS function, failed point notification function (a function possessed by the F1 byte) which are possessed by the STM frame of SDH (synchronous digital hierarchy) specified by the CCITT recommendations G.707 to G.709.

Therefore, it is necessary to improve the management of a network using an optical amplifier to high level management in the SDH by using some means.

To solve the above problem, by using a supervisory and control signal which is multiplexed with a signal in wavelength and transmitted, the above optical repeater can be supervised and controlled.

Figure 34:
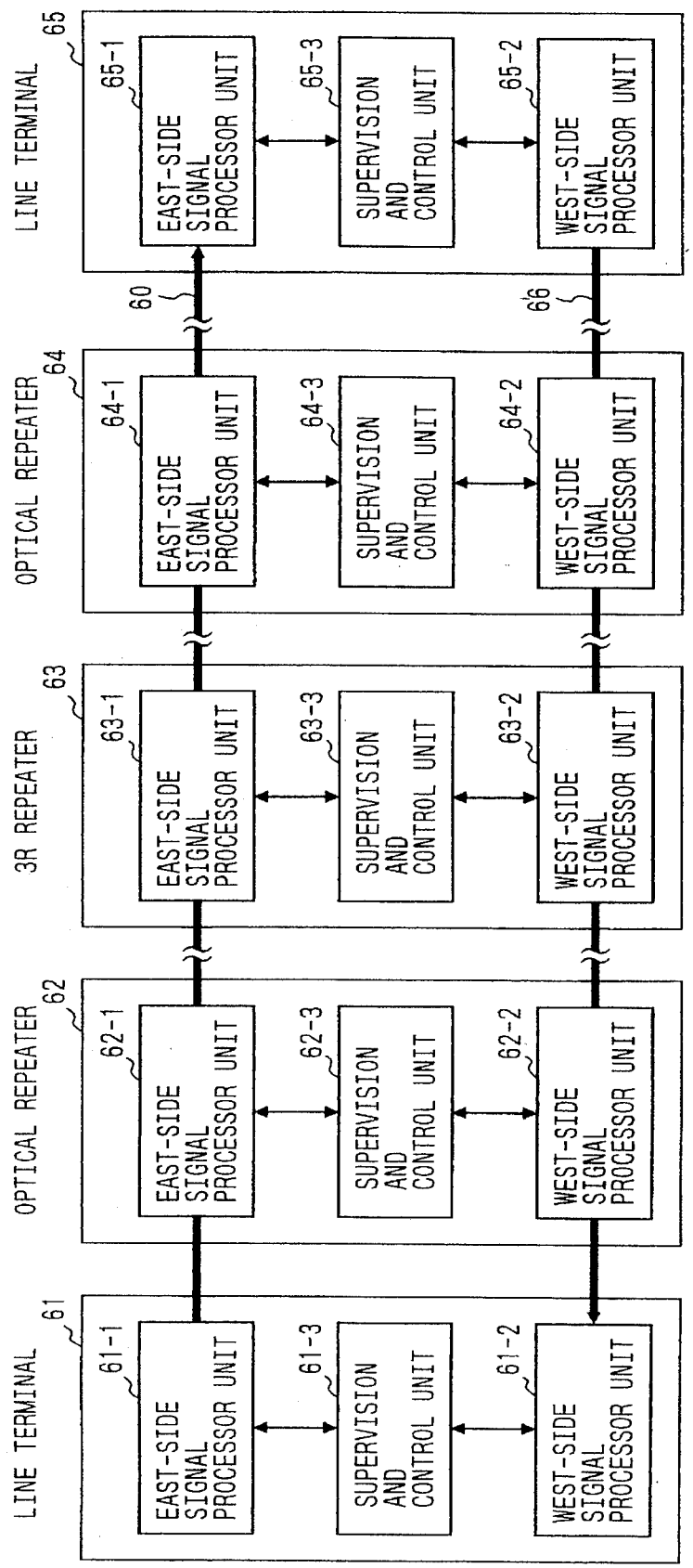
FIG. 34 is a drawing showing the network structure.

FIG. 34 shows the structure of a network. In the drawing, line terminals 61 and 65 are connected via a plurality of repeaters 62, 63, and 64. The repeaters are optical repeaters (1R repeaters). A signal travels in the network by being amplified by the fiber amplifier of each optical repeater. A supervisory and control signal is converted from an optical signal to an electric signal, processed, and converted to an optical signal by each optical repeater and then transmitted to the next repeater. A signal (wavelength of 1.55 μm) is generated in the line terminal 61 or 65, amplified optically by the optical repeaters, and travels in the network. In this network, the signal is wavelength-multiplexed with a supervisory and control signal (wavelength of 1.48 μm) and transmitted.

Next, the supervisory and control system of a network system relating to the present invention will be explained.

Figure 35:
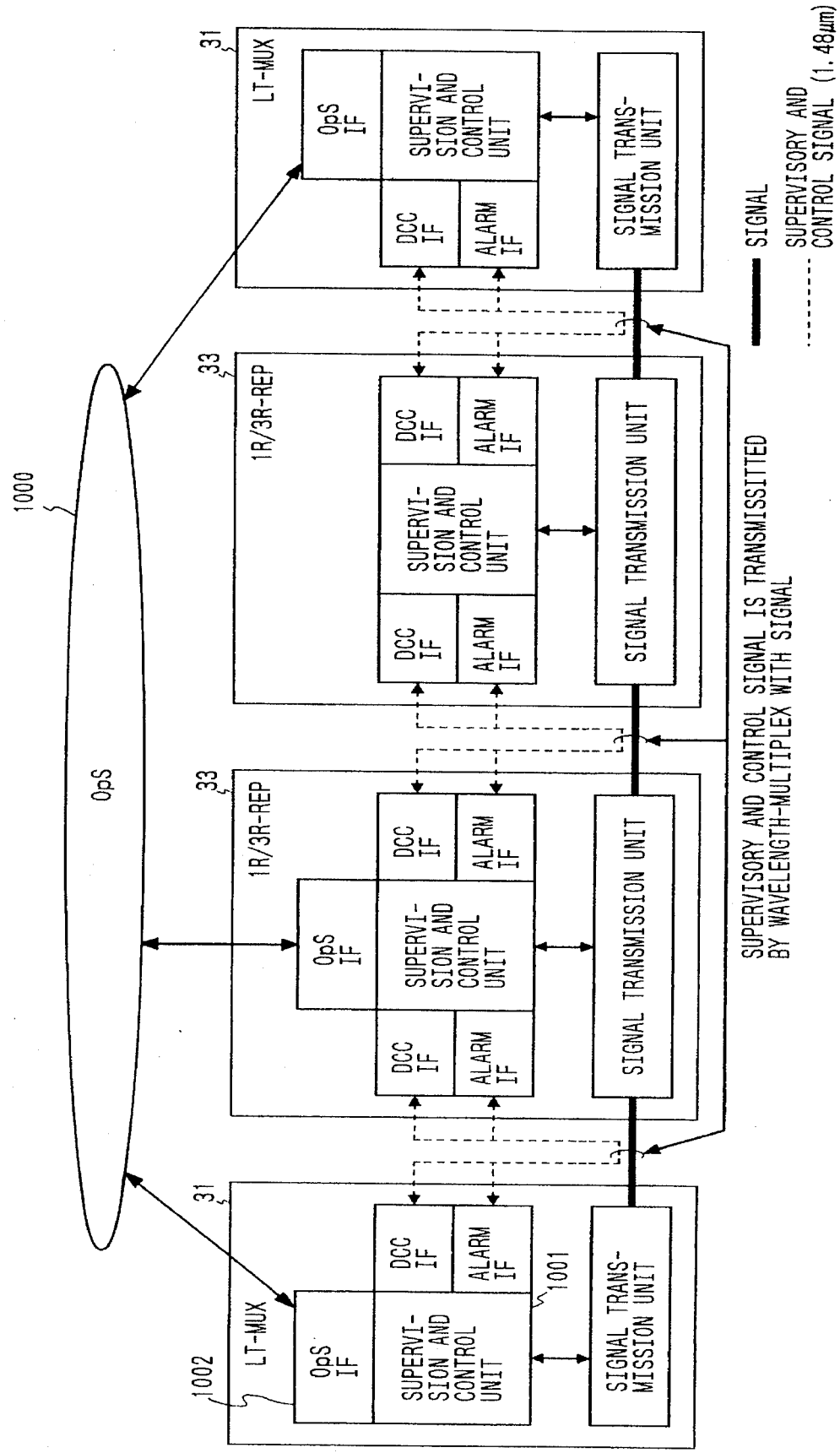
FIG. 35 is a block diagram showing the structure of the supervision and control system of a network system.

FIG. 35 shows the structure of the supervisory and control system of a network system relating to the present invention.

As shown in the drawing, LT-MUX31 and 1R-REP30 are provided with OpS-IF 1002 for connecting a supervision and control unit 1001 and OpS (operation system) 1000 and perform the supervision and control operation under control of OpS 1000 which manages the supervision and control of the system.

According to this embodiment, a signal on the STM-64 interface is wavelength-multiplexed with a supervisory and control signal in wavelength and transmitted. By doing this, 1R- or 3R-REP having no OpS-IF 1002 is supervised by remote control. Concretely, OpS 1000 issues an instruction to equipment having OpS-IF, and the equipment adds a relevant instruction to the supervisory and control signal or transmits an alarm, which is detected or generated by 1R- or 3R-REP having no OpS-IF 1002, to equipment having OpS-IF 1002. However, OpS-IF 1002 may be mounted in 1R- or 3RREP33 so as to supervise and control directly from OpS 1000.

Figure 36:
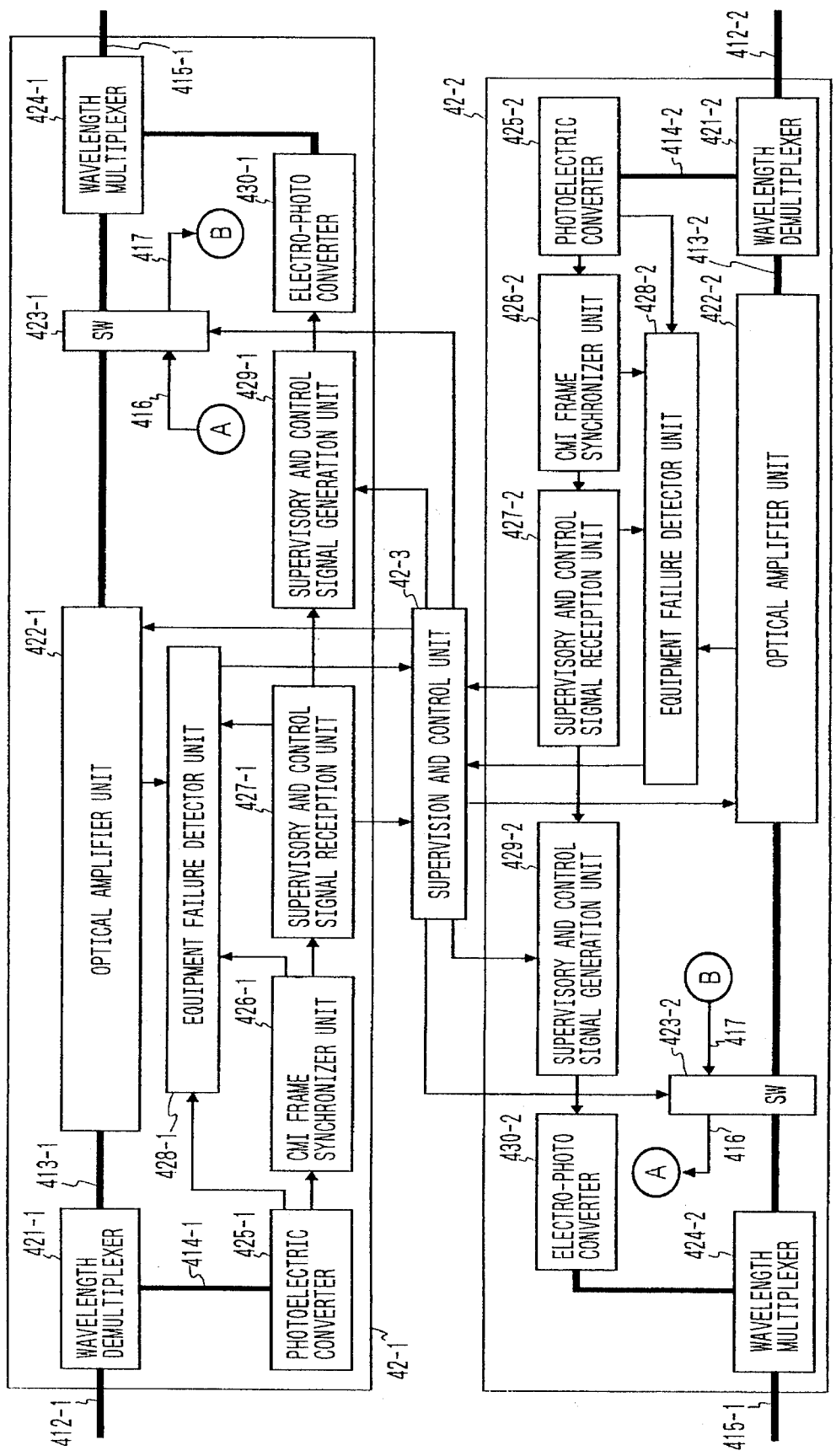
FIG. 36 is a drawing showing the structure of an optical repeater.

Next, FIG. 36 shows the structure of an optical repeater. The optical repeater receives a signal and a supervisory and control signal which is wavelength-multiplexed. A signal on the transmission line is an optical signal. A received signal 412-1 is wavelength-demultiplexed to a signal 413-1 and a supervisory and control signal 414-1 by a wavelength-demultiplexer 42-1 and the signal 413-1 is amplified in the optical state by an amplifier unit 422-1. The supervisory and control signal 413-1 is converted to an electric signal by a photoelectric converter 425-1. Thereafter, the supervisory and control signal is synchronized with the frame by CMI coding rule violation by a CMI frame synchronizer unit 426-1. Next, a supervisory and control signal reception unit 427-1 checks the destination display in the above supervisory and control signal and discriminates whether it is for the own repeater or not. When it is for the own repeater, the supervisory and control signal reception unit executes the indication given in the above supervisory and control signal. When it is for another repeater, the supervisory and control signal reception unit transmits it to a supervisory and control signal generation unit 429-1, stores it in the transmission buffer of the supervisory and control signal generation unit, and transmits it when the turn comes. When an equipment failure detector unit 428-1 of the above repeater detects a failure and issues an alarm, a supervision and control unit 2-3 commands the supervisory and control signal generation unit 429-1 to transmit a supervisory and control signal having failure information (failure type, ID of the own repeater, etc.).

The supervisory and control signal generation unit 429-1, which receives this command, generates a supervisory and control signal, stores it in the aforementioned transmission buffer, and transmits it when the turn comes.

The supervision and control unit keeps the alarm issue period equal to the supervisory period. When the supervision and control unit detects a serious failure such as loss of signal or fiber cut, it records the ID of the optical repeater, which detects the failure, in the supervisory and control signal and transmits it.

An order wire field is set in each supervisory and control signal fixedly. By doing this, engineers at a distance can talk with each other, so that the function possessed by the E1 byte of the CCITT STM frame can be realized.

A DCC (data communication channel) field is set in each supervisory and control signal fixedly. By doing this, the optical amplifier can be operated by remote control, so that the functions possessed by the D1 to D3 bytes of the CCITT STM frame can be realized.

When the supply voltage level of the repeater is measured and the measured level is lower than a predetermined one, a predetermined bit in the supervisory and control signal is turned on and power shutdown is transmitted to the subsequent stage.

An output-off indication is issued to an optional repeater by the above supervisory and control signal. By doing this, the repeater which receives the above output-off indication can stop output.

The order of changing of the output level is transmitted to an optional repeater by the above supervisory and control signal. The repeater which receives the above output level change instruction changes the output level. By doing this, the repeater can correspond to a change in the signal transmission speed.

The LD of the optical amplifier is duplexed beforehand and when one of the LDs in use fails, by commanding to change the LD to another by the supervisory and control signal, the reliability can be improved.

By the above control, high-level network management can be realized.

As shown in FIG. 36, the optical repeater receives a signal and a supervisory and control signal which is wavelength-multiplexed. A signal on the transmission line is an optical signal. A received signal 412-1 is demultiplexed to a signal 413-1 and a supervisory and control signal 414-1 by a wavelength demultiplexer 42-1 and the signal 413-1 is amplified in the optical state by an amplifier unit 422-1. The supervisory and control signal 413-1 is converted to an electric signal by a photoelectric converter 425-1. Thereafter, the supervisory and control signal is frame-synchronized by CMI coding rule violation by a CMI frame synchronizer unit 426-1. Next, a supervisory and control signal reception unit 427-1 checks the destination display in the above supervisory and control signal and discriminates whether it is for the own repeater or not. When it is for the own repeater, the supervisory and control signal reception unit executes the indication given in the above supervisory and control signal. When it is for another repeater, the supervisory and control signal reception unit transmits it to a supervisory and control signal generation unit 429-1, stores it in the transmission buffer of the supervisory and control signal generation unit, and transmits it when the turn comes. It is converted to an optical signal by a photoelectric converter 430-1 and multiplexed with an output (signal) of the optical amplifier 422-1 by a wavelength multiplexer 433-1. When the equipment failure detector unit 428-1 of the above repeater detects a failure and issues an alarm, the supervision and control unit 42-3 commands the supervisory and control signal generation unit 429-1 to transmit a supervisory and control signal having failure information (failure type, ID of the own repeater, etc.). The supervisory and control signal generation unit 429-1, which receives this command, generates a supervisory and control signal, stores it in the aforementioned transmission buffer, and transmits it when the turn comes.

Figure 37:
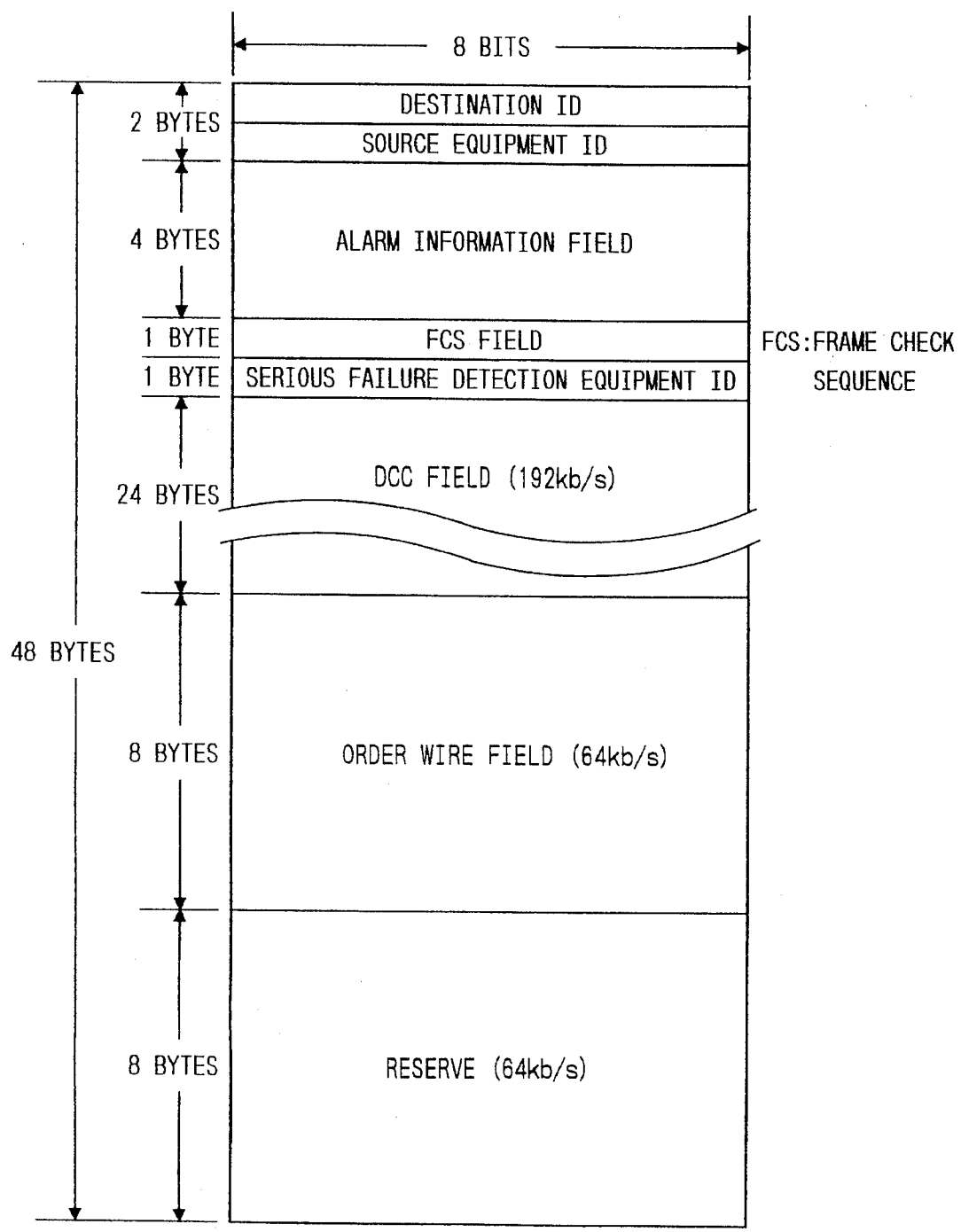
FIG. 37 is a drawing showing the frame structure of a supervisory and control signal.

FIG. 37 shows the frame structure of a supervisory and control signal. According to the supervisory and control signal shown in the drawing, the frame is 48 bytes long and the transmission speed is 384 kbits/s. The frame period is 1 ms. In the frame, destination ID, source equipment ID, an alarm information field, an FCS (frame check sequence) field, an optical repeater section AIS (alarm indication signal) field, an order wire field, and a DCC field exist. The order wire field is 8 bytes long, so that the transmission speed is 64 kb/s. The DCC field is 24 bytes long, so that the transmission speed is 192 kb/s. A supervisory and control signal is transmitted by a CMI (coded mark inversion) code. Thereafter, it can be synchronized with the frame by CMI coding rule violation.

Next, the alarm information field of a supervisory and control signal will be explained in detail with reference to FIG. 38. The first byte of the alarm information field is used to transmit supervisory information of the signal system. The contents of the byte are fiber cut, supervisory and control signal's loss of frame, occurrence of supervisory and control signal FCS test error, loss of signal, and loss of supervisory and control signal sequentially starting at the first bit. "Fiber cut" indicates that no signal and supervisory and control signal are inputted. "Loss of signal" indicates that although the supervisory and control signal is correctly received, no signal is inputted. "Loss of supervisory and control signal" indicates that although the signal is correctly received, no supervisory and control signal is inputted. The second and subsequent bytes indicate that an equipment failure occurs. When a failure is detected in the optical amplifier unit, the third byte sets bit 1 to 1 and indicates the failed part of the signal processor unit using 7 bits from bit 2 to bit 8. This can be easily realized by assigning ID to each part beforehand. The fourth byte is free.

When the supervisory period is set to 1 second in FIG. 37, the frame period is 1 ms. Therefore, when about 100 repeaters are used, all the repeaters can use supervisory and control signals.

In FIG. 34, a supervisory and control signal is transmitted via the transmission line 10 from the line terminal 1 or via the transmission line 11 from the line terminal 2.

Each repeater always receives the aforementioned supervisory and control signal and checks the destination ID in the supervisory and control frame. When it is for the repeater itself, the repeater fetches the received supervisory and control signal and executes the instruction written in the supervisory and control signal. When it is not for the repeater itself, the repeater transmits it to the supervisory and control signal generation unit, stores it in the transmission buffer in the supervisory and control signal generation unit, and outputs it when the turn comes.

Each repeater always transmits the aforementioned supervisory and control signal frame. When issuing an alarm or reporting the internal status, the supervision and control unit 2-3 outputs an indication to the supervisory and control signal generation unit 29-1 and records the line terminal ID in the destination ID and the ID, which is assigned to itself beforehand, in the source equipment ID.

Figure 38:
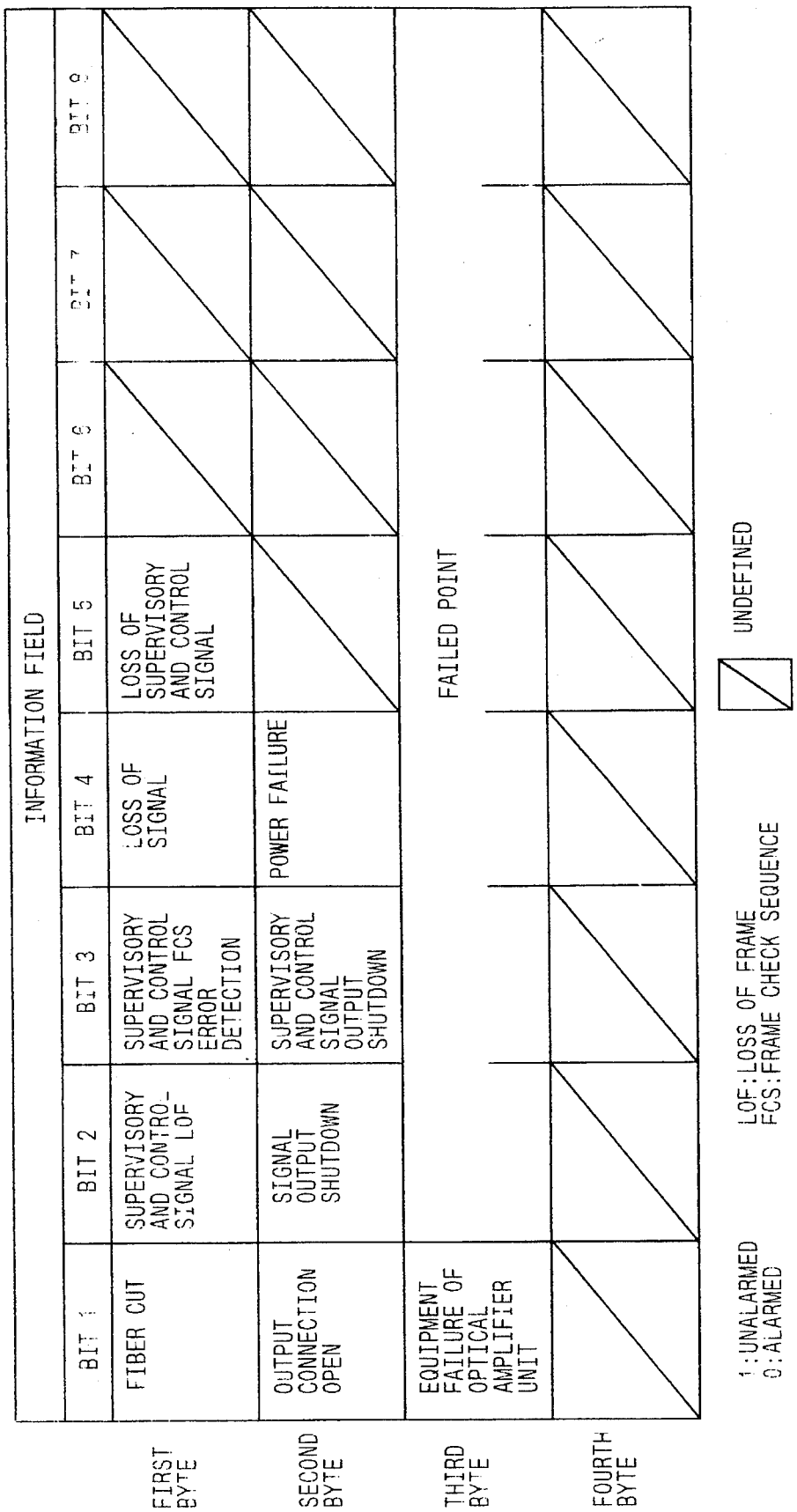
FIG. 38 is a drawing showing details of an alarm information field.

Furthermore, the supervision and control unit sets the relevant bit among the bits shown in the alarm information area of the supervisory and control signal shown in FIGS. 37 and 38 and the other bits to 0, stores the supervisory and control signal in the transmission buffer, and transmits it when the turn comes.

Or, it is possible that the supervision and control unit 62-3 issues an indication to the supervisory and control signal generation unit 429-2 and a supervisory and control signal is outputted to the West side. By doing this, it is possible that the East side receives the indication and outputs a supervisory and control signal to the West side.

Next, when the repeater detects a serious failure such as loss of signal, it records the ID of the repeater, which detects the failure, in the section AIS (alarm indication signal) shown in FIG. 37 and transmits the signal. By doing this, the function of AIS can be realized. In other words, the ID of the failure detection repeater is transmitted to the subsequent stage.

Next, the loop back-on control will be described. A loop back-on indication is transmitted to an optional repeater from the line terminal 1 using the DCC field in the supervisory and control signal. In FIG. 36, the supervision and control unit 62-3, which receives the loop back-on indication, loops back the signal from the East side to the West side (or reversely) by controlling switches 423-1 and 423-2. For example, the signal can be looped back from the East side to the West side by transmitting the output of the optical amplifier unit 422-1 from SW423-1 to SW423-2 (signal line 417 shown in FIG. 36).

Next, changing of the output level will be described. A signal output level change indication is transmitted to an optional repeater from the line terminal 1 using the DCC field in the supervisory and control signal and the supervision and control unit 62-3, which receives the indication, commands the optical amplifier 422-1 to change the output level.

Figure 39:
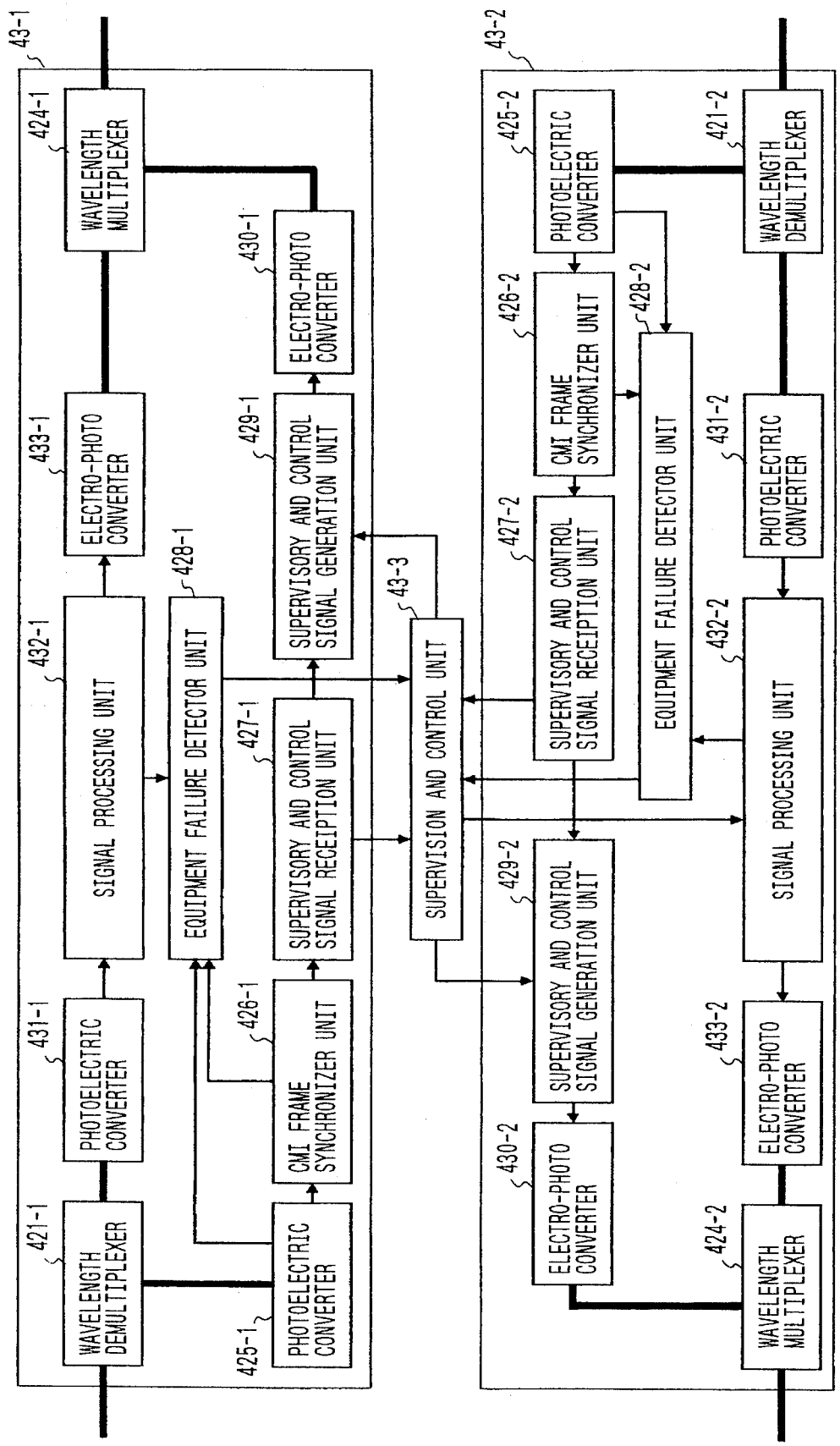
FIG. 39 is a drawing showing the structure of a 3R repeater.
Figure 40:
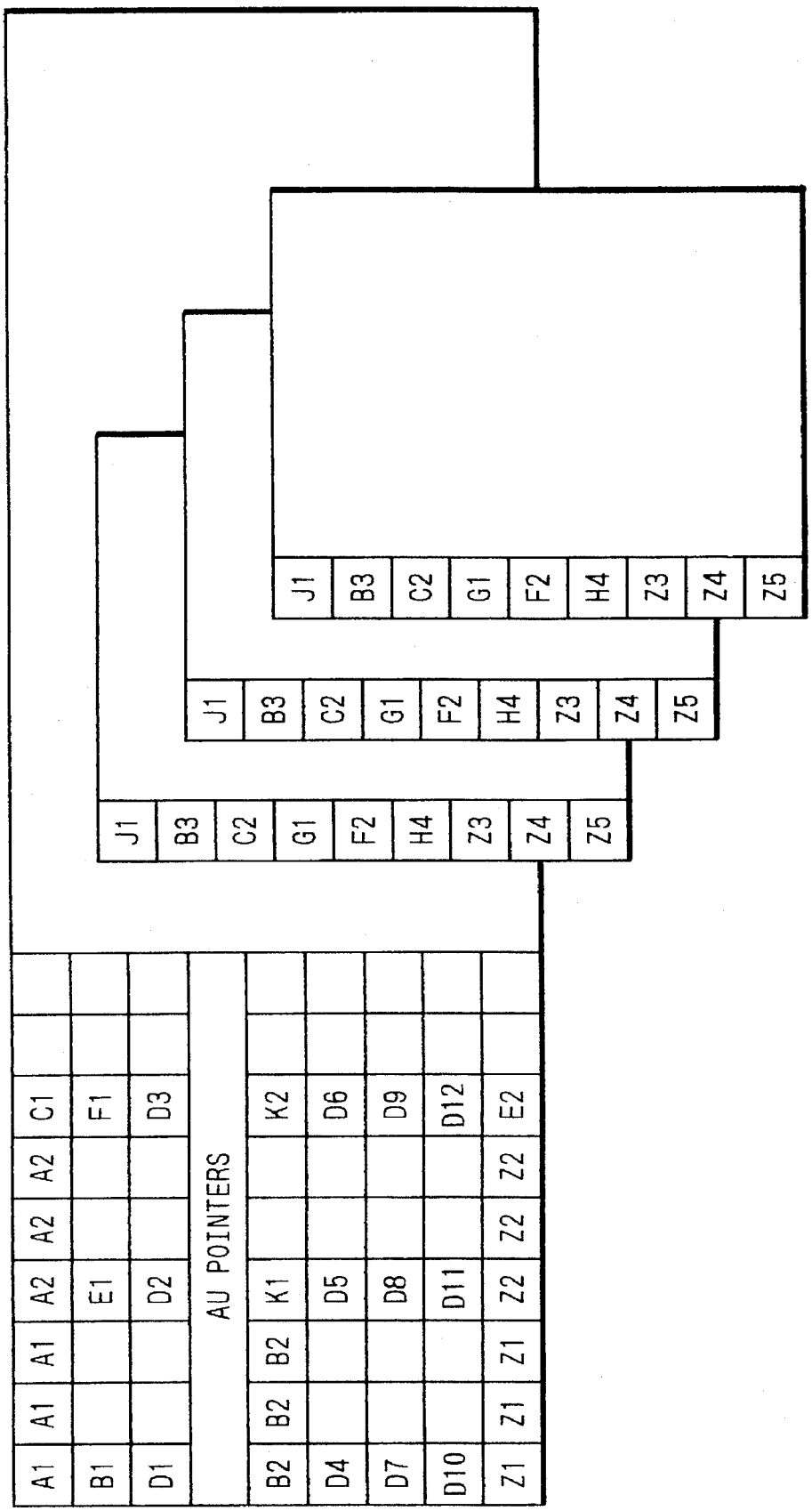
FIG. 40 is a drawing showing the structure of the STM-1 frame specified by the CCITT advices G.707, G.708, and G.709.

Next, the processing of a 3R repeater 63 having a function for changing an optical signal to an electric signal, processing it, changing the electric signal to an optical signal, and then transmitting it will be described. FIG. 39 shows the structure of the 3R repeater. According to the 3R repeater shown in the drawing, in addition to the aforementioned function on the supervisory and control signal processing which is possessed by the optical amplifier, a signal is converted from an optical signal to an electric signal by a photoelectric converter 431-1, frame-synchronized by a signal processor unit 432-1, and descrambled and the section overhead processing is performed. When the processing ends, the signal is scrambled, and it is converted to an optical signal and outputted by a photoelectric converter 433-1. FIG. 40 shows the frame structure of a signal which is handled by this embodiment. The signal shown in the drawing has the STM-1 frame specified by the CCITT recommendations G.707, G.708, and G.709.

When the aforementioned 3R repeater 63 receives a supervisory and control signal and detects an alarm notification in the supervisory and control signal, it processes the signal, generates an AIS (alarm indication signal) by the method specified by the above CCITT recommendations G.707, G.708, and G.709, and informs the subsequent stage of an occurrence of alarm.

Using the DCC field in a supervisory and control signal, an instruction related to the SDH such as a B1 error rate degradation detection threshold value, B2 error rate degradation detection threshold value, alarm detection inhibition, Section-FERF detection inhibition, Section-FEBE detection inhibition, or Path-AIS detection inhibition can be transmitted easily.

Figure 41:
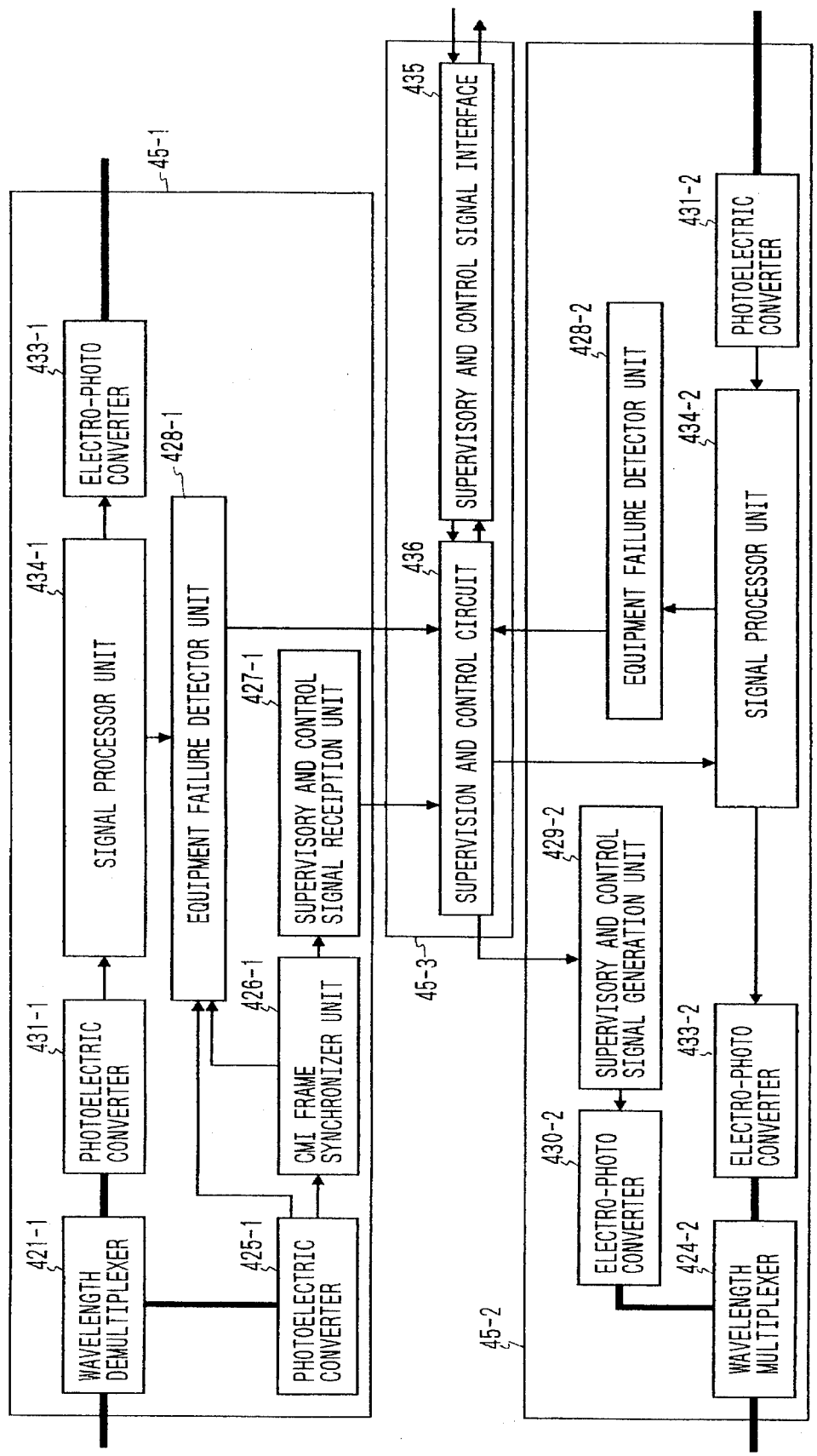
FIG. 41 is a drawing showing the structure of a line terminal.

Next, the processing by the line terminal will be described. FIG. 41 shows the structure of the line terminal 65. On the East side of the line terminal 65 shown in the drawing, in addition to the aforementioned function on the supervisory and control signal processing which is possessed by the optical amplifier, a signal is converted from an optical signal to an electric signal by a photoelectric converter 431-1, synchronized with the frame by a signal processor unit 433-1, and descrambled and the section overhead processing and path overhead processing are performed. When the processing ends, the signal is scrambled, and it is converted to an optical signal and outputted by a photoelectric converter 433-1.

On the West side, a signal is converted from an optical signal to an electric signal by a photoelectric converter 431-2, processed by a signal processor unit 434-2, converted to an optical signal by an electro-photo converter 433-2, and multiplexed with a supervisory and control signal by a wavelength multiplexer 424-2.

A supervision and control unit 65-3 has a supervisory and control signal interface 435 and supervision and control circuit 436. The supervisory and control signal interface 435 corresponds to access from the outside.

At the line terminal 1, the processing on the East side is reverse to the processing on the West side. When the aforementioned line terminal receives a supervisory and control signal and detects an alarm notification in the supervisory and control signal, it processes the signal, generates an AIS (alarm indication signal) by the method specified by the above CCITT recommendations G.707, G.708, and G.709, and informs the subsequent stage of an occurrence of alarm.

Another embodiment for realizing transmission of various alarms and instructions in a network will be explained with reference to FIG. 34. According to the network shown in the drawing, the line terminals communicate with each other using optical repeaters. A signal (at a wavelength of 1.55 µm) is generated at a line terminal, amplified by the optical repeaters, and travels in the network.

The network wavelength-multiplexes the signal with a supervisory and control signal (at a wavelength of 1.48 µm) and transmits the multiplexed signal.

The supervisory and control signal is transmitted via a transmission line 60 from the line terminal 61 or via a transmission line 66 from the line terminal 65.

Next, the structure of an optical repeater will be shown in FIG. 36. The optical repeater receives a signal and a supervisory and control signal which is multiplexed with it in wavelength. A signal on the transmission line is an optical signal. A received signal 412-1 is demultiplexed to a signal 413-1 and a supervisory and control signal 414-1 by a wavelength demultiplexer 42-1 and the signal 413-1 is amplified in the optical state by an amplifier unit 422-1. The supervisory and control signal 413-1 is converted to an electric signal by a photoelectric converter 425-1. Thereafter, the supervisory and control signal is synchronized with the frame by CMI coding rule violation by a CMI frame synchronizer unit 426-1.

Next, a supervisory and control signal reception unit 427-1 checks the destination display in the above supervisory and control signal and discriminates whether it is for the own repeater or not. When it is for the own repeater, the supervisory and control signal reception unit executes the indication given in the above supervisory and control signal. When it is for another repeater, the supervisory and control signal reception unit transmits it to a supervisory and control signal generation unit 429-1, stores it in the transmission buffer of the supervisory and control signal generation unit, and transmits it when the turn comes. It is converted to an optical signal by a photoelectric converter 430-1 and multiplexed with an output (signal) of the optical amplifier 422-1 by a wavelength multiplexer 433-1. When the equipment failure detector unit 428-1 of the above repeater detects a failure and issues an alarm, the supervision and control unit 42-3 commands the supervisory and control signal generation unit 429-1 to transmit a supervisory and control signal having failure information (failure type, ID of the own repeater, etc.). The supervisory and control signal generation unit 429-1, which receives this command, generates a supervisory and control signal, stores it in the aforementioned transmission buffer, and transmits it when the turn comes.

Figure 42:
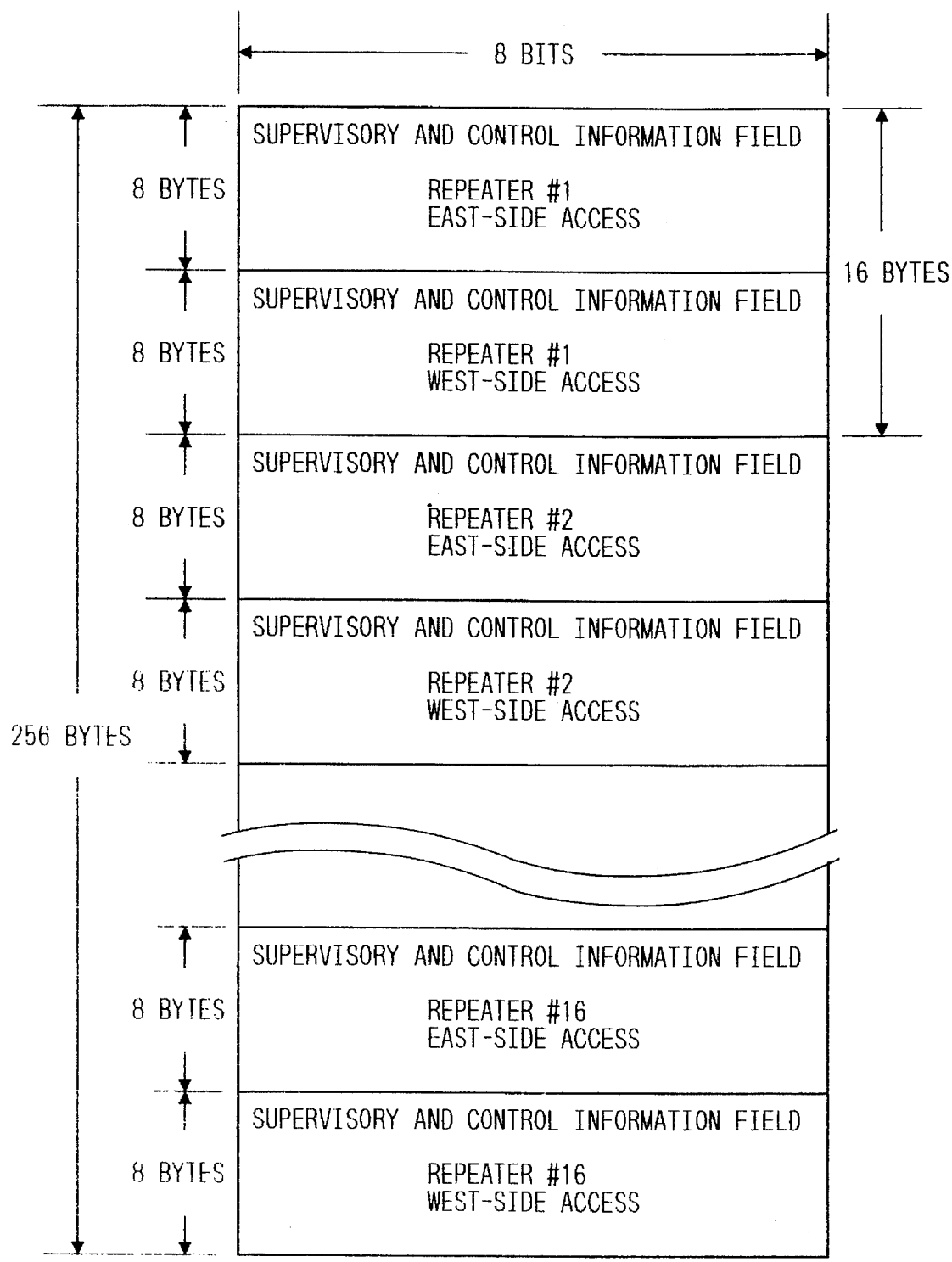
FIG. 42 is a drawing showing the frame structure of a supervisory and control signal.

FIG. 42 shows the frame structure of a supervisory and control signal. According to the supervisory and control signal shown in the drawing, the frame is 256 bytes long and the transmission speed is 128 kbits/s. The frame period is 16 ms. In the frame, a 16-byte information area is assigned to each repeater. Furthermore, the area is divided into two 8-byte parts for East access and West access so as to realize access from both the East and West sides. A supervisory and control signal is transmitted by a CMI (coded mark inversion) code. Thereafter, it is frame-synchronized by CMI coding rule violation.

Next, the supervisory and control information field of a supervisory and control signal will be explained in detail with reference to FIG. 43. The first byte of the supervisory and control information field is used to transmit supervisory information of the signal system. The contents of the byte are fiber cut, supervisory and control signal loss of frame, occurrence of supervisory and control signal FCS test error, loss of signal, and loss of supervisory and control signal sequentially starting at the first bit. "Fiber cut" indicates that no signal and supervisory and control signal are inputted. "Loss of signal" indicates that although the supervisory and control signal is correctly received, no signal is inputted. "Loss of supervisory and control signal" indicates that although the signal is correctly received, no supervisory and control signal is inputted. The second and third bytes indicate that an equipment failure occurs. When a failure is detected in the optical amplifier unit, the third byte sets bit 1 to 1 and indicates the failed part of the signal processor unit using 7 bits from bit 2 to bit 8. This can be easily realized by assigning ID to each part beforehand. The fourth byte is free. The fifth and subsequent bytes indicate instructions. The fifth byte indicates loop backoff. The sixth byte is an output level setting indication. Bit 1 to bit 4 indicate an instruction for changing the output level in accordance with the signal type (STM-1 (about 150 Mb/s), STM-4 (about 600 Mb/s), STM-16 (about 2.4 Gb/s), STM-64 (about 10 Gb/s)) which is transmitted via the transmission lines 10 and 11. The seventh byte indicates an instruction for changing one part of the optical amplifier unit, which is duplexed in mechanism beforehand, to another part forcibly when the one part fails. The eighth byte indicates an instruction for stopping the output of the optical amplifier unit forcibly.

In FIG. 34, the supervisory and control signal is transmitted via the transmission line 60 from the line terminal 61 or via the transmission line 66 from the line terminal 62.

Each repeater always receives the aforementioned supervisory and control signal. Then, the repeater executes the instruction recorded in the own supervisory and control information field in the supervisory and control frame. Each repeater always transmits the aforementioned supervisory and control signal frame. When issuing an alarm or reporting the internal status, the supervision and control unit 42-3 outputs an indication to the supervisory and control signal generation unit 429-1 and furthermore, sets the relevant bit among the bits shown in the alarm information area of the supervisory and control signal shown in FIG. 38 to 1 and the other bits to 0, stores the supervisory and control signal in the transmission buffer, and transmits it when the turn comes. Then, the supervision and control unit executes the instruction recorded in the own supervisory and control information field in the supervisory and control frame.

Next, the loop back-on control will be described. A loop back-on indication is transmitted by selecting an optional repeater by a supervisory and control signal from the line terminal and by setting a predetermined bit in the above supervisory and control signal to 1 and the loopback test is executed.

Next, changing of the output level will be described. A signal output level change indication is transmitted by selecting an optional repeater by a supervisory and control signal from the line terminal and by setting a predetermined bit in the above supervisory and control signal to 1 and the output level is changed by the optical repeater which receives the above indication.

Next, an output-off indication will be described. A signal output-off indication is transmitted by selecting an optional repeater by a supervisory and control signal from the line terminal and by setting a predetermined bit in the above supervisory and control signal to 1 and the output is stopped by the optical repeater which receives the above indication.

Next, the processing of a 3R repeater 63 having a function for changing an optical signal to an-electric signal, processing it, changing the electric signal to an optical signal, and then transmitting it will be described. FIG. 39 shows the structure of the 3R repeater. According to the 3R repeater shown in the drawing, in addition to the aforementioned function on the supervisory and control signal processing which is possessed by the optical amplifier, a signal is converted from an optical signal to an electric signal by a photoelectric converter 431-1, synchronized with the frame by a signal processor unit 4321, and descrambled and the section overhead processing is performed. When the processing ends, the signal is scrambled, and it is converted to an optical signal and outputted by a photoelectric converter 433-1. FIG. 40 shows the frame structure of a signal which is handled by this embodiment. The signal shown in the drawing has the STM-1 frame specified by the CCITT recommendations G.707, G.708, and G.709.

When the aforementioned 3R repeater 63 receives a supervisory and control signal and detects an alarm notification in the supervisory and control signal, it processes the signal, generates an AIS (alarm indication signal) by the method specified by the above CCITT recommendations G.707, G.708, and G.709, and informs the subsequent stage of an occurrence of alarm.

Next, the processing by the line terminal will be described. FIG. 41 shows the structure of the line terminal 65. On the East side of the line terminal 65 shown in the drawing, in addition to the aforementioned function on the supervisory and control signal processing which is possessed by the optical amplifier, a signal is converted from an optical signal to an electric signal by a photoelectric converter 431-1, synchronized with the frame by a signal processor unit 433-1, and descrambled and the section overhead processing and path overhead processing are performed. When the processing ends, the signal is scrambled, and it is converted to an optical signal and outputted by a photoelectric converter 433-1.

On the West side, a signal is converted from an optical signal to an electric signal by a photoelectric converter 431-2, processed by a signal processor unit 434-2, converted to an optical signal by an electro-photo converter 433-2, and multiplexed with a supervisory and control signal by a wavelength multiplexer 424-2.

A supervision and control unit 45-3 has a supervisory and control signal interface 435 and supervision and control circuit 436. The supervisory and control signal interface 435 corresponds to access from the outside.

At the line terminal 61, the processing on the East side is reverse to the processing on the West side.

When the aforementioned line terminal receives a supervisory and control signal and detects an alarm notification in the supervisory and control signal, it processes the signal, generates an AIS (alarm indication signal) by the method specified by the above CCITT recommendations G.707, G.708, and G.709, and informs the subsequent stage of an occurrence of alarm.

According to the above embodiment, the optical repeater can be supervised and controlled.

What is claimed is:

1. An optical repeater for amplifying a data optical signal (with a wavelength of $\lambda d$) comprising: an optical fiber amplifier including at least a doped fiber, first and second pumping light sources (with a wavelength of about $\lambda p$) for outputting first and second pumping lights, a first wavelength multi- and demultiplexer, which is mounted before said doped fiber, for demultiplexing a supervisory optical signal 1 (with a wavelength of about $\lambda p$) which is multiplexed with said data optical signal and for multiplexing the first pumping light in the same direction as that of said data optical signal simultaneously, and a second wavelength multi- and demultiplexer, which is mounted behind said doped fiber, for multiplexing the second pumping light in the opposite direction to that of said amplified data optical signal and for multiplexing a supervisory optical signal 2 (with a wavelength of about $\lambda p$) in the same direction as that of said data optical signal simultaneously; and a supervisory equipment including a supervisory optical receiver coupled to the first wavelength multi- and demultiplexer, for receiving said supervisory optical signal 1 and outputting a supervisory electric signal 1, a controller for adding supervisory information to said supervisory electric signal 1 and outputting a supervisory electric signal 2, and a supervisory optical transmitter coupled to the second wavelength multi- and demultiplexer, for convening said supervisory electric signal 2 to said supervisory optical signal.

2. An optical repeater according to claim 1, wherein said supervisory optical receiver detects the power Pw of said supervisory optical signal 1.

3. An optical repeater according to claim 2, wherein a power splitter is installed in the subsequent stage of said second wavelength multi- and demultiplexer and an optical filter for extracting only a data optical signal from one of the output lights from said power splitter and a power monitor for detecting power Pd of said extracted data optical signal are installed.

4. An optical repeater according to claim 3, wherein said controller measures said Pw and Pd and the measured results are said supervisory information.

5. An optical repeater for amplifying a data optical signal (with a wavelength of $\lambda d$), comprising: an optical fiber amplifier including at least a doped fiber, first and second pumping light sources for outputting first pumping light (with a wavelength of about $\lambda p'$) and second pumping light (with a wavelength of about $\lambda p''$), a wavelength demultiplexer for demultiplexing a supervisory optical signal 1 (with a wavelength of about $\lambda w$) which is multiplexed with said data optical signal and transmitted, a first wavelength multiplexer for multiplexing the first pumping light in the same direction as that of the data optical signal which is demultiplexed by said wavelength demultiplexer, and a second wavelength multiplexer, which is mounted behind said doped fiber, for multiplexing the second pumping light in the opposite direction to that of said amplified data optical signal, and a third wavelength multiplexer, which is mounted behind said second wavelength multiplexer, for multiplexing a supervisory optical signal 2 (with a wavelength of about $\lambda w$) in the same direction as that of the data optical signal; and a supervisory equipment including a supervisory optical receiver coupled to the wavelength demultiplexer, for receiving said supervisory optical signal 1 and outputting a supervisory electric signal 1, a controller for adding supervisory information to said supervisory electric signal 1 and outputting a supervisory electric signal 2, and a supervisory optical transmitter coupled to the third wavelength multiplexer, for converting said supervisory electric signal 2 to said supervisory optical signal.

6. An optical repeater for amplifying a data optical signal (with a wavelength of $\lambda d$), comprising: an optical fiber amplifier including at least a doped fiber, first and second pumping light sources for outputting first pumping light (with a wavelength of about $\lambda p'$) and second pumping light (with a wavelength of about $\lambda p''$), a first wavelength multi- and demultiplexer, which is mounted before the first doped fiber, for demultiplexing a supervisory optical signal 1 (with a wavelength of about $\lambda p$) which is multiplexed with said data optical signal simultaneously, a second doped fiber which is mounted behind the first doped fiber, second, third, fourth, and fifth pumping light sources (with a wavelength of $\lambda p$) for outputting second, third, fourth, and fifth pumping lights for pumping the second doped fiber, a first polarization prism for composing the second and third pumping lights in the orthogonally polarized state and outputting first composite pumping light, a wavelength multiplexer, which is mounted before said second doped fiber, for multiplexing said first composite pumping light and a data optical signal outputted from the first doped fiber, a second polarization prism for composing the fourth and fifth pumping lights in the orthogonally polarized state and outputting second composite pumping light, and a second wavelength multi- and demultiplexer, which is mounted behind the second doped fiber, for multiplexing said second composite pumping light in the opposite direction to that of said amplified data optical signal and for multiplexing a supervisory optical signal 2 (with a wavelength of about $\lambda p$) in the same direction as that of said data optical signal simultaneously; and a supervisory equipment including a supervisory optical receiver coupled to the first multi- and demultiplexer, for receiving said supervisory optical signal 1 and outputting a supervisory electric signal 1, a controller for adding supervisory information to said supervisory electric signal 1 and outputting a supervisory electric signal 2, and a supervisory optical transmitter coupled to the second multi- and demultiplexer, for converting said supervisory electric signal 2 to said supervisory optical signal 2.

7. An optical repeater for amplifying a data optical signal (with a wavelength of $\lambda d$), comprising: an optical fiber amplifier including at least a doped fiber, a first pumping light source for outputting first pumping light (with a wavelength of about $\lambda p'$), a second pumping light source for outputting second pumping light (with a wavelength of about $\lambda p$) which is multiplexed with said data optical signal and for multiplexing the first pumping light in the same direction as that of said data optical signal simultaneously, and a second wavelength multi- and demultiplexer, which is mounted behind said second doped fiber, for multiplexing the second pumping light in the opposite direction to that of said amplified data optical signal and for multiplexing a supervisory optical signal 2 (with a wavelength of about $\lambda p$) in the same direction as that of said data optical signal simultaneously; and a supervisory equipment including a supervisory optical receiver coupled to the first wavelength multi- and demultiplexer, for receiving said supervisory optical signal 1 and outputting a supervisory electric signal 1, a controller for adding supervisory information to said supervisory electric signal 1 and outputting a supervisory electric signal 2, and a supervisory optical transmitter coupled to the second wavelength multi- and demultiplexer, for converting said supervisory electric signal 2 to said supervisory optical signal 2.

8. An optical repeater for amplifying a data optical signal (with a wavelength of $\lambda d$), comprising: an optical fiber amplifier including at least first and second doped fibers coupling in series, a first pumping light source (with a wavelength of above $\lambda p'$) for outputting pumping light, a second pumping light source (with a wavelength of about $\lambda p$) for outputting pumping light, a first wavelength multi- and demultiplexer, which is mounted before the first doped fiber, for demultiplexing a supervisory optical signal 1 (with a wavelength of about $\lambda p$) which is multiplexed with said data optical signal and for multiplexing said pumping light (with a wavelength of about $\lambda p'$) in the same direction as that of said data optical signal simultaneously, and a second wavelength multi- and demultiplexer, which is mounted behind the second doped fiber, for multiplexing said pumping light (with a wavelength of $\lambda p$) in the opposite direction to that of said amplified data optical signal and for multiplexing a supervisory optical signal 2 (with a wavelength of about $\lambda p$) in the same direction as that of said data optical signal simultaneously; and a supervisory equipment including a supervisory optical receiver coupled to the first wavelength multi- and demultiplexer, for receiving said supervisory optical signal 1 and outputting a supervisory electric signal 1, a controller for adding supervisory information to said supervisory electric signal 1 and outputting a supervisory electric signal 2, and a supervisory optical transmitter coupled to the second wavelength multi- and demultiplexer, for converting said supervisory electric signal 2 to said supervisory optical signal 2.

9. An optical repeater for amplifying a data optical signal (with a wavelength of $\lambda d$), comprising: an optical fiber amplifier including at least a doped fiber, first and second pumping light sources (with a wavelength of about $\lambda p'$) for outputting first and second pumping lights, a first wavelength multi- and demultiplexer, which is mounted before said doped fiber, for demultiplexing a supervisory optical signal 1 (with a wavelength of about $\lambda p$) which is multiplexed with said data optical signal and for multiplexing the first pumping light in the same direction as that of said data optical signal simultaneously, and a second wavelength multi- and demultiplexer, which is mounted behind said doped fiber, for multiplexing the second pumping light in the opposite direction to that of said amplified data optical signal and for multiplexing a supervisory optical signal 2 (with a wavelength of about $\lambda p$) in the same direction as that of said data optical signal simultaneously; and a supervisory equipment including a supervisory optical receiver coupled to the first wavelength multi- and demultiplexer, for receiving said supervisory optical signal 1 and outputting a supervisory electric signal 1, a controller for adding supervisory information to said supervisory electric signal 1 and outputting a supervisory electric signal 2, and a supervisory optical transmitter coupled to the second wavelength multi- and demultiplexer, for converting said supervisory electric signal 2 to said supervisory optical signal.

10. An optical repeater according to claim 7, wherein said supervisory optical receiver detects the power Pw of said supervisory optical signal 1, and a power splitter is installed in the subsequent stage of said second wavelength multi- and demultiplexer, and an optical filter for extracting only a data optical signal from one of the output lights from said power splitter and a power monitor for detecting the power Pd of said extracted data optical signal are installed.

11. An optical repeater according to claim 10, wherein said controller measures said Pw and Pd and the measured results are said supervisory information.

12. An optical repeater wherein an optical filter for transmitting a wavelength of $\lambda p$ and removing a wavelength of $\lambda p'$ is installed between a first optical wavelength multi- and demultiplexer and a supervisory optical receiver stated in claim 7.

13. An optical repeater according to claim 11, wherein a modulation signal source for outputting a high-frequency modulation signal and a superposition circuit for superposing said modulation signal on said output supervisory electric signal are installed, and said supervisory optical transmitter is driven by the output supervisory electric signal on which the modulation signal is superposed, and said supervisory optical transmitter outputs a supervisory optical signal which is modulated in the light intensity at high frequency.

\* \* \* \* \*

UNITED STATES PATENT AND TRADEMARK OFFICE
CERTIFICATE OF CORRECTION

PATENT NO. : 5,500,756
DATED : 19 March 1996
INVENTOR(S) : Hideaki TSUSHIMA et al.

It is certified that error appears in the above-indentified patent and that said Letters Patent is hereby corrected as shown below:

| Column | Line | |
|---|---|---|
| 3 | 4 | Change "failure" to --in failure--. |
| 3 | 21 | Change "failure" to --in failure--. |
| 3 | 28 | Change "failure" to --in failure--. |
| 3 | 30 | Change "failure" to --in failure--. |
| 3 | 44 | Change "failure" to --in failure--. |
| 3 | 48 | Change "failure" to --in failure--. |
| 3 | 50 | Change "failure" to --in failure--. |
| 8 | 15 | Change "failure" to --in failure--. |
| 8 | 20 | Change "failure" to --in failure--. |
| 8 | 21 | Change "failure" to --in failure--. |
| 8 | 28 | Change "failure" to --in failure--; change "form" to --from--. |
| 10 | 55 | Change "multiand" to --multi- and--. |

UNITED STATES PATENT AND TRADEMARK OFFICE
CERTIFICATE OF CORRECTION

PATENT NO. : 5,500,756

DATED : 19 March 1996

INVENTOR(S) : Hideaki TSUSHIMA et al.

It is certified that error appears in the above-indentified patent and that said Letters Patent is hereby corrected as shown below:

| Column | Line | |
|---|---|---|
| 11 | 16 | Change "failure" to --in failure--. |
| 11 | 20 | Change "failure" to --in failure--. |
| 11 | 22 | Change "failure" to --in failure--. |
| 11 | 35 | Change "p," to --$\lambda$p,--. |
| 12 | 12 | Change "repeats" to --repeaters--. |
| 13 | 25 | Change "p" to --$\lambda$p--. |
| 14 | 65 | After "is" insert --equal--; change "(=p)" to --(=$\lambda$p)--. |
| 16 | 34 | Change "case" to --cases--. |
| 22 | 4 | After "structure" change "that" to --of--. |
| 22 | 53 | Change "pose-amplifier" to --post-amplifier--. |
| 25 | 23 | Before "wavelength" delete "a". |
| 25 | 65 | Change "highsensitive" to --highly sensitive--. |

UNITED STATES PATENT AND TRADEMARK OFFICE
CERTIFICATE OF CORRECTION

PATENT NO. : 5,500,756

DATED : 19 March 1996

INVENTOR(S) : Hideaki TSUSHIMA et al.

It is certified that error appears in the above-indentified patent and that said Letters Patent is hereby corrected as shown below:

| Column | Line | |
|---|---|---|
| 26 | 49 | Before "upstream" change "a" to --an--. |
| 35 | 25 | Change "convening" to --converting--. |
| 35 | 26 | Change "signal" to --signal 2--. |
| 35 | 51 | Delete "and". |
| 36 | 3 | Delete "and second". |
| 36 | 5-6 | Delete "and second pumping light (with a wavelength of about $\lambda p$")". |
| 36 | 45 | After "about $\lambda$)" insert --, a first wave-length multi- and demultiplexer, which is mounted before said doped fiber, for demultiplexing a supervisory optical signal 1 (with a wavelength of about $\lambda p$)--. |

UNITED STATES PATENT AND TRADEMARK OFFICE
CERTIFICATE OF CORRECTION

PATENT NO. : 5,500,756

DATED : 19 March 1996

INVENTOR(S) : Hideaki TSUSHIMA et al.

It is certified that error appears in the above-indentified patent and that said Letters Patent is hereby corrected as shown below:

| Column | Line | |
|--------|------|---|
| 36 | 49 | Delete "second". |
| 37 | 1 | Change "above" to --about--. |

Signed and Sealed this

Twenty-second Day of October, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,500,756
DATED : March 19, 1996
INVENTOR(S) : Hideaki TSUSHIMA et al.

It is certified that error appears in the above-indentified patent and that said Letters Patent is hereby corrected as shown below:

Column    Line

35         67         Change "signal" (2nd occurrence) to --signal 2--.

Signed and Sealed this

Twenty-fifth Day of February, 1997

Attest:

BRUCE LEHMAN

*Attesting Officer*      *Commissioner of Patents and Trademarks*